US010724976B2

(12) United States Patent
Rogers et al.

(10) Patent No.: US 10,724,976 B2
(45) Date of Patent: Jul. 28, 2020

(54) SYSTEMS AND METHODS FOR DETERMINING AT LEAST ONE PROPERTY OF A MATERIAL

(71) Applicant: Nevada Nanotech Systems Inc., Sparks, NV (US)

(72) Inventors: Benjamin S. Rogers, Reno, NV (US); Christopher J. Dudley, Reno, NV (US); Jesse D. Adams, Reno, NV (US); Ralph G. Whitten, Reno, NV (US); Alexander C. Woods, Reno, NV (US); Vaughn N. Hartung, Reno, NV (US)

(73) Assignee: Nevada Nanotech Systems Inc., Sparks, NV (US)

( * ) Notice: Subject to any disclaimer, the term of this patent is extended or adjusted under 35 U.S.C. 154(b) by 199 days.

(21) Appl. No.: 15/674,305

(22) Filed: Aug. 10, 2017

(65) Prior Publication Data
US 2018/0052124 A1    Feb. 22, 2018

Related U.S. Application Data

(60) Provisional application No. 62/376,675, filed on Aug. 18, 2016.

(51) Int. Cl.
*G01N 25/18* (2006.01)
*G01N 27/18* (2006.01)
(Continued)

(52) U.S. Cl.
CPC ............ *G01N 25/18* (2013.01); *G01N 27/18* (2013.01); *G01N 29/022* (2013.01);
(Continued)

(58) Field of Classification Search
CPC .. G01N 29/326; G01N 2223/64; G01N 25/18; G01N 27/18; G01N 29/022;
(Continued)

(56) References Cited

U.S. PATENT DOCUMENTS 4,944,035 A    7/1990 Aagardl et al.
5,038,304 A    8/1991 Bonne
(Continued)

FOREIGN PATENT DOCUMENTS

CN    101738420 A    6/2010
EP     0439950 B1    2/1996
(Continued)

OTHER PUBLICATIONS

Boskovic et al., Rheological measurements using microcantilevers, received Sep. 11, 2001, final revision received Feb. 25, 2002, pp. 891-899, The Society of Rheology, Inc.
(Continued)

*Primary Examiner* — Lisa M Caputo
*Assistant Examiner* — Philip L Cotey
(74) *Attorney, Agent, or Firm* — TraskBritt

(57) ABSTRACT

A system for determining one or more properties of one or more gases. The system comprises sensors configured to measure thermal conductivity and exothermic responses of a sample at multiple temperatures. Sensor responses to exposure to a gas sample at two or more temperatures are compensated and analyzed by a subsystem. The subsystem is configured to determine a thermal conductivity of the gas sample at each of the two or more temperatures and determine at least one component of the gas sample based at least in part on the thermal conductivity value of the sample at each of the two or more temperatures. Related systems and methods of determining one or more properties of a sample are also disclosed.

47 Claims, 25 Drawing Sheets

(51) Int. Cl.
*G01N 29/32* (2006.01)
*G01N 29/02* (2006.01)
*G01N 29/036* (2006.01)
G01N 27/16 (2006.01)
G01N 29/12 (2006.01)

(52) U.S. Cl.
CPC ......... *G01N 29/036* (2013.01); *G01N 29/326* (2013.01); *G01N 27/16* (2013.01); *G01N 29/12* (2013.01); *G01N 2291/0427* (2013.01)

(58) Field of Classification Search
CPC ...... G01N 29/036; G01N 27/16; G01N 29/12; G01N 2291/0427; G01N 33/00
See application file for complete search history.

(56) References Cited

U.S. PATENT DOCUMENTS

| | | | | |
|---|---|---|---|---|
| 5,258,929 | A | * 11/1993 | Tsuchida | G01N 25/18 374/44 |
| 5,311,447 | A | 5/1994 | Bonne | |
| 6,361,204 | B1 | * 3/2002 | Marzoli | G01N 27/18 374/10 |
| 7,928,343 | B2 | 4/2011 | King et al. | |
| 8,762,075 | B2 | 6/2014 | Loui et al. | |
| 8,931,950 | B2 | 1/2015 | King et al. | |
| 9,547,968 | B2 | 1/2017 | Adams et al. | |
| 9,599,495 | B2 | 3/2017 | Duraffourg et al. | |
| 2007/0098857 | A1 | * 5/2007 | Kohlstrung | G01K 1/026 426/233 |
| 2007/0169541 | A1 | * 7/2007 | Norbeck | G01N 25/18 73/25.03 |
| 2008/0038590 | A1 | 2/2008 | Nakakubo | |
| 2008/0291966 | A1 | 11/2008 | Engel et al. | |
| 2009/0277246 | A1 | 11/2009 | Ooishi et al. | |
| 2011/0077872 | A1 | * 3/2011 | Loui | G01N 25/18 702/24 |
| 2011/0185789 | A1 | * 8/2011 | Ooishi | G01N 33/225 73/25.03 |
| 2011/0257898 | A1 | * 10/2011 | Ooishi | G01F 1/6845 702/23 |
| 2011/0296910 | A1 | 12/2011 | Lopez et al. | |
| 2012/0073357 | A1 | * 3/2012 | Gatzmanga | G01N 27/18 73/25.03 |
| 2013/0209315 | A1 | 8/2013 | Kimura | |
| 2015/0075256 | A1 | * 3/2015 | Basham | G01N 33/0016 73/31.01 |
| 2015/0153294 | A1 | 6/2015 | Watanabe et al. | |
| 2015/0253265 | A1 | 9/2015 | Whitten et al. | |
| 2016/0025660 | A1 | 1/2016 | Hepp et al. | |
| 2016/0109396 | A1 | 4/2016 | Cai et al. | |
| 2017/0023503 | A1 | * 1/2017 | Rebinsky | G01N 25/18 |

FOREIGN PATENT DOCUMENTS

| | | |
|---|---|---|
| JP | 2002-509250 A | 3/2002 |
| JP | 2008-039658 A | 2/2008 |
| JP | 2011-012972 A | 1/2011 |
| WO | 2007/037209 A1 | 4/2007 |

OTHER PUBLICATIONS

De Groot et al., The Thermal Conductivity of Four Monatomic Gases as a Function of Density Near Room Termperature, Physica 92A, pp. 117-144, North-Holland Publishing Co.
Guildner, Leslie A., Thermal Conductivity of Gases. III. Some Values of the Thermal Conductivities of Argon, Helium, and Nitrogen from 0° C. to 75° C. at Pressures of 1 X 105 to 25 X 107 Pascals, Journal of Research of the National Bureau of Standards—A. Physics and Chemistry, Mar.-Apr. 1975, pp. 407-413, vol. 79A, No. 2.
Holland et al., A Correlation of the Viscosity and Thermal Conductivity Data of Gaseous and Liquid Propane, J. Phys. Chem. Ref. Data, vol. 8, No. 2, 1979, pp. 559-575.
Loui et al., Detection and Discrimination of Pure Gases and Binary Mixtures Using a Single Microcantilever, LLNL-JRNL-415479, Aug. 11, 2009, 21 pages, Lawrence Livermore National Laboratory, 7000 East Ave., Livermore, CA 94550, USA.
International Search Report for International Application No. PCT/US2017/046376, dated Nov. 22, 2017, 3 pages.
International Written Opinion for International Application No. PCT/US2017/046376, dated Nov. 22, 2017, 33 pages.
Canadian Requisition by the Examiner for Canadian Application No. 3032537, dated Feb. 10, 2020, 6 pages.
European Partial Search Report for European Application No. 17841899.2, dated Apr. 2, 2020, 16 pages.
Japanese Decision to Grant dated Mar. 2, 2020 for JP Application No. 2019530359, 5 pages with English translation.
Korean Notice of Reasons for Rejection for Korean Application No. 10-2019-7007339, dated May 21, 2020, 23 pages with English translation.

* cited by examiner

SYSTEMS AND METHODS FOR DETERMINING AT LEAST ONE PROPERTY OF A MATERIAL

CROSS-REFERENCE TO RELATED APPLICATION

This application claims the benefit under 35 U.S.C. § 119(e) of U.S. Provisional Patent Application Ser. No. 62/376,675, filed Aug. 18, 2016, the disclosure of which is hereby incorporated herein in its entirety by this reference.

TECHNICAL FIELD

Embodiments of the disclosure relate to systems and sensors for the detection, quantification, and/or identification of materials (e.g., vapors, gases, etc.), and to related methods. More particularly, embodiments of the disclosure relate to systems and sensors for determining a presence of one or more components in a sample, determining a concentration of one or more components of the sample, determining an identity of the one or more components in the sample, and determining one or more other properties of the sample, and to related methods of sample analysis.

BACKGROUND

Catalytic sensors have been used to detect flammable gases in some applications. However, catalytic sensors have several shortcomings that limit their performance and accuracy. Disadvantages of catalytic sensors include drift and deterioration due to ageing and poisoning of the catalyst, which may affect a magnitude of response therefrom and, therefore, an accuracy thereof.

Microcantilevers have been demonstrated as gas sensor devices, usually with coatings that attract specific gases. When mass is added to the cantilever, a shift in its resonant frequency can be detected. The change in resonant frequency is proportional to the mass change on the microcantilever. It is also known that an uncoated microcantilever can be used to sense the viscosity and density of a gas. Density and viscosity can be considered in composite by simply observing the resonant frequency shift, which may be proportional to viscous damping (VD), or density and viscosity can be deconvoluted by considering both resonant frequency and quality factor changes (Boskovic 2002).

Also known is the physical relationship between a thermal conductivity (TC) and a density of a gas. This can be exploited to identify certain gases (Groot 1977 & Loui LLNL 2014). However, some gases have overlapping, or nearly overlapping, TC versus density vectors, making it difficult to distinguish these gases from each other. Such a technique is also unable to detect multiple gases in a gas mixture since mixed gases may exhibit a thermal conductivity different than the thermal conductivity of the components of the mixture and can lead to erroneous or unreliable measurement results.

Some gases have TC versus VD vectors that are very similar to air, e.g., oxygen ($O_2$), carbon monoxide (CO), and nitric oxide (NO). Some gases, such as hydrogen sulfide ($H_2S$), cannot be detected at low enough concentrations using the TC versus VD vector alone. Metal oxide semiconductor (MOS) and coated microcantilevers frequently have gas cross sensitivities and may be unable to distinguish between several different gases. As one example, current sensors for flammable and other hazardous gases (e.g., catalytic bed sensors, nondispersive infrared (NDIR) sensors, thermal conductivity sensors) are unable to determine a single property of a given gas or gas mixture and are unable to self-correct an output thereof to determine, for example, a concentration of the gas. Accordingly, in some instances, such sensors may not be able to distinguish between, for example, a first gas having a concentration of 500 ppm and a second gas having a concentration of, for example, 5,000 ppm.

For the foregoing reasons, there is a need for a system and method that overcomes conventional sensor disadvantages and that can reliably detect, identify, and/or quantify gases.

BRIEF SUMMARY

The present invention is directed to a system and method that can reliably detect, identify, and/or quantify a sample (e.g., vapors, gases, liquids, combinations thereof, etc.). In one embodiment, the system includes a catalytic sensor, a thermal conductivity sensor, a damping sensor, one or more microcantilever sensors comprising a coating material, one or more metal oxide semiconductor (MOS) sensors, one or more environmental sensors (e.g., temperature, pressure, humidity (relative humidity, absolute humidity, or both), and flowrate), and a processing subsystem with software for interrogating, compensating, calibrating, analyzing, detecting faults, and reporting the results, for example.

DETAILED DESCRIPTION

Figure 1:
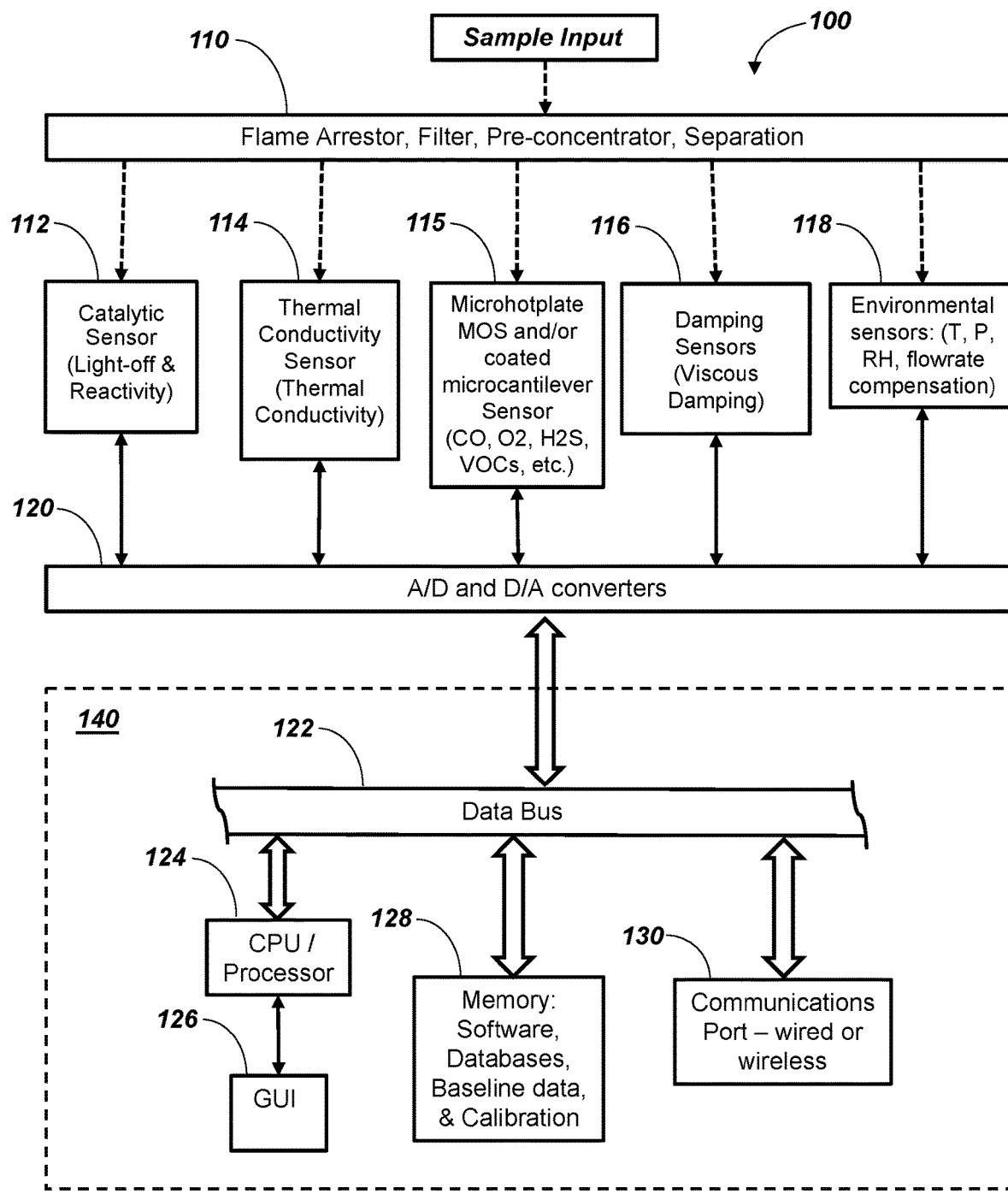
FIG. 1 illustrates an overall block diagram of a system for measuring gas properties, in accordance with embodiments of the disclosure.

Illustrations presented herein are not meant to be actual views of any particular material, component, or system, but are merely idealized representations that are employed to describe embodiments of the disclosure.

As used herein, the term "sample" means and includes a material that may include one or more gases, one or more vapors, one more liquids, and one or more solids for which at least one property is to be determined. By way of nonlimiting example, a sample may include a liquid and a gas in equilibrium.

As used herein, the terms "viscous damping" and "damping" may be used interchangeably.

As used herein, the term "catalytic response" means and includes a response (e.g., an output) of a catalytic sensor to exposure to a sample. A catalytic response at a particular temperature means and includes the response of a catalytic sensor to exposure to a sample when the catalytic sensor is at the particular temperature.

As used herein, the term "catalytic activity" means and includes a difference between a catalytic response of a catalytic sensor to exposure to a sample while the catalytic sensor is at a particular temperature and a baseline catalytic response of the catalytic sensor when the catalytic sensor is at the particular temperature.

As used herein, the term "vector" means and includes a quantity having a direction (e.g., slope, angle, ratio, etc.) and a magnitude based on two or more parameters (e.g., length, distance, size, dimension, etc.). A vector may have a dimension in a plurality of dimensions, such as two dimensions, three dimensions, four dimensions, five dimensions, six dimensions, or more dimensions. Two-dimensional vectors and three-dimensional vectors may be visualized graphically when graphing one parameter against one or two additional parameters. Although some vectors may be visualized graphically, the disclosure is not so limited. A vector may be multi-dimensional and contain three or more parameters. In some instances, a multi-dimensional vector may be simplified by defining each vector parameter as a ratio of two other parameters. Accordingly, a vector may include a relationship between one parameter with one or more additional parameters (e.g., a relationship between a change in thermal conductivity as a function of temperature, a relationship between a change in catalytic activity as a function of temperature, a relationship between a thermal conductivity and catalytic activity, etc.). In some embodiments, such relationships may be expressed in terms of a ratio.

According to embodiments described herein, a system, such as a detector, may be configured to determine one or more properties of a sample (e.g., a gas sample, a vapor sample, a liquid sample, or combinations thereof). The one or more properties may include one or more of a presence of one or more components (e.g., different gas components) in the sample, an identity of the one or more components in the sample, a concentration of the one or more components in the sample, a molecular property of the sample (e.g., an average molecular weight of the sample), whether the sample includes combustible gas and/or an explosive gas, a catalytic-reaction onset (also referred to herein as a "light-off" event) temperature of any combustible or explosive gases in the sample, another property, and combinations thereof.

The detector may include a thermal conductivity sensor, which may also be referred to herein as a thermal conductivity microhotplate sensor or a thermal conductivity microcantilever sensor. The detector may further include a processing subsystem configured to determine a thermal conductivity of the sample at two or more temperatures based on data obtained from the thermal conductivity sensor (e.g., based on a response (e.g., an output) of the thermal conductivity sensor at each of the two or more temperatures). The thermal conductivity sensor may be exposed to the sample while the thermal conductivity sensor is at each of a first temperature and at least a second temperature. A response (e.g., output) of the thermal conductivity sensor (e.g., a power to maintain each of the two or more temperatures) may be measured. A change in thermal conductivity of the sample relative to a baseline (e.g., a difference in thermal conductivity of the sample relative to a reference sample (e.g., a baseline such as air, nitrogen ($N_2$), oxygen ($O_2$), carbon monoxide (CO), methane ($CH_4$), ethane ($C_2H_6$), propane ($C_3H_8$), natural gas, a flammable gas, etc.)) at each of the two or more temperatures may be determined based on a difference in power to maintain the thermal conductivity sensor at each of the first and at least a second temperature relative to the power to maintain each of the first and at least a second temperature when the thermal conductivity sensor is exposed to the reference sample. The baseline values may be stored in a memory and may comprise values obtained in a laboratory. In some embodiments, the baseline values are obtained using a reference thermal conductivity sensor separate from the thermal conductivity sensor. In some embodiments, the baseline values are continuously updated during use and operation of the detector. The response of the thermal conductivity sensor may be compensated with the baseline values that are stored in memory, obtained from the baseline thermal conductivity sensor, obtained from the thermal conductivity sensor, or combinations thereof. A baseline value of the thermal conductivity sensor may also be referred to herein as a "thermal conductivity baseline" or a "baseline thermal conductivity."

An identity of the sample (e.g., one or more components thereof) may be determined based, at least in part, on a ratio of the thermal conductivity of the sample while the thermal conductivity sensor is at a first temperature to the thermal conductivity of the sample while the thermal conductivity sensor is at a second temperature. In some embodiments, the identity of the sample may be determined based on a ratio of the response of the thermal conductivity sensor to exposure to the sample while the thermal conductivity sensor is at the first temperature to the response of the thermal conductivity sensor to exposure to the sample while the thermal conductivity sensor is at the second temperature. In some embodiments, a concentration of different components (e.g., gases) in the sample may be determined based on at least one of the thermal conductivity at the first temperature and the thermal conductivity at the second temperature. As used herein, a thermal conductivity at a particular temperature (e.g., a first temperature) means and includes a thermal conductivity or a response of a thermal conductivity sensor to exposure to a sample when the thermal conductivity sensor is at the particular temperature (e.g., a first temperature) and exposed to a sample.

In some embodiments, the detector may include a catalytic sensor (e.g., a catalytic microhotplate sensor) configured to determine a reactivity of the sample (e.g., whether the sample includes a gas that may undergo an exothermic reaction, a temperature of such an exothermic reaction, an inert gas, or combinations thereof). The catalytic sensor may be configured to be exposed to the sample while the catalytic sensor is at the same first temperature and at least a second temperature described above with reference to the thermal conductivity sensor. A response (e.g., an output) of the catalytic sensor (e.g., a power to maintain the catalytic sensor) at each of the temperatures may be measured and compared to baseline catalytic responses for each temperature by the processing subsystem. The baseline catalytic response may include data stored in memory, baseline data from the catalytic sensor when exposed to a baseline sample, or a combination thereof. A difference between the baseline catalytic response and a measured response of the catalytic sensor (which difference may be referred to herein as "a catalytic activity") may be an indication of a reactivity of the sample (e.g., an exothermic event, also referred to herein as a "light-off" event or a reaction onset). In some embodiments, the measured response of the catalytic sensor may be an indication of a flammability of the sample at the temperature at which there is a difference. In some embodiments, a temperature at which there is a difference between the baseline catalytic response and the measured response of the catalytic sensor may be an indication of a presence of one or more components in the sample. In some embodiments, a ratio of the response of the catalytic sensor at the first temperature to the response of the catalytic sensor at the second temperature may be used to identify one or more components in the sample. The magnitude of the response of the catalytic sensor at the first temperature (e.g., when the catalytic sensor is at the first temperature), the second temperature (e.g., when the catalytic sensor is at the second temperature), or both may be an indication of the concentration of one or more gases or vapors in the sample. In other embodiments, the identity of the one or more components may be determined based on a ratio of the catalytic activity at the first temperature to the catalytic activity at the at least a second temperature and the concentration of the one or more components may be determined based on a magnitude of the catalytic activity at the first temperature, the magnitude of the thermal conductivity at the at least a second temperature, or both.

In some embodiments, data from the thermal conductivity sensor may be combined with the data from the catalytic sensor to determine the composition of the sample. In some such embodiments, the composition of the sample may be determined based on one or more of a ratio of the thermal conductivity of the sample at the first temperature to the thermal conductivity of the sample at the second temperature, a ratio of the catalytic sensor response at the first temperature to the catalytic sensor response at the second temperature, a ratio of the response of the catalytic sensor at one or more temperatures to a response of the thermal conductivity sensor at one or more temperatures, and combinations thereof.

The detector may further include a damping sensor (e.g., an inert microcantilever) configured to determine one or more of a change in damping (e.g., viscous damping), a change in resonant frequency, a change in quality factor, a change in bandwidth, a change in a parameter determined by using an equivalent circuit model (ECM) to interpret a response of the damping sensor (including, for example, a series resistance, a series capacitance, a series inductance, a parallel capacitance, or combinations thereof), or another property of the damping sensor dispersed in the sample. The change in the viscous damping, resonant frequency, quality factor, bandwidth, series resistance, series capacitance, series inductance, and parallel capacitance may be with reference to a baseline resonant property when the damping sensor is exposed to a baseline sample (e.g., air). The viscous damping, resonant frequency, quality factor, bandwidth, series resistance, series capacitance, series inductance, parallel capacitance, and combinations thereof of the damping sensor when exposed to the baseline sample may be referred to herein as a baseline resonant parameter. The one or more properties may be used to determine a composition of the sample. By way of nonlimiting example, a ratio of a change in the resonant frequency to a change in the quality factor may be an indication of the composition of the sample (e.g., a presence of one or more analytes of interest in the sample). In some embodiments, data obtained from the damping sensor, the thermal conductivity sensor, and the catalytic sensor may be combined to determine one or more of the identity of one or more components of the sample, the composition of the sample, and the concentration of components in the sample. In further embodiments, the detector may include one or more microcantilever sensors comprising a coating formulated to interact with specific analytes and one or more metal oxide semiconductor microhotplate sensors configured to interact with one or more specific analytes and may be used to further distinguish one or more properties of the sample. Responses from each of the thermal conductivity sensor, the catalytic sensor, the damping sensor, the one or more microcantilever sensors (e.g., coated microcantilever sensors), and the one or more metal oxide semiconductor microhotplate sensors may be compensated for effects of one or more of temperature, pressure, relative humidity, absolute humidity, and flowrate (e.g., of the sample).

In some embodiments, the processing subsystem periodically interrogates the catalytic sensor to measure a response thereof to exposure to a sample; if an exothermic light-off event is detected, indicating the presence of one or more flammable gases, the light-off temperatures are stored in memory and processing, as described in subsequent paragraphs. If an exothermic light-off event is not detected, the MOS and coated microcantilever sensors may be checked for non-flammable gas responses. The TC and VD may be checked (with the thermal conductivity sensor and the damping sensor, respectively) for a change relative to a baseline response, which may be stored in memory. These preliminary responses parse the responses into flammable gases with their associated light-off temperature(s), non-flammable gases, a change in TC and VD relative to air (i.e., whether the TC and VD of the sample is similar or not similar to air), MOS and coated microcantilevers with and without cross sensitivities.

In some embodiments, if no gases are detected, then the processing subsystem establishes new baselines for the catalytic sensor, the thermal conductivity sensor, and the damping sensor (e.g., the resonant frequency thereof) prior to the next interrogation of the sensors. Note that the sensors are only being utilized to detect and parse the gases up to this point. In other words, the magnitude of the responses may not be relied upon for identifying the components of the sample. Therefore, in some embodiments, deterioration, as well as drift, of the sensor response magnitudes may not affect the full analysis. The results of the subsequent processing can be used to compensate the magnitude responses and also determine if a sensor response has deteriorated to the point that a fault is reported.

Responsive to detection of a presence of at least one component (e.g., gas) in the sample, the processing subsystem may be triggered to measure a power shift of the thermal conductivity sensor relative to a stored baseline, which measurement is proportional to the thermal conductivity (TC) change of the sample. Note that the magnitude of the TC response typically increases with increasing temperature, so it is useful to use TC values measured at a high temperature in some embodiments, thus maximizing the sensitivity of the TC measurements. In other words, in some embodiments, the thermal conductivity of the sample may be measured at a high temperature (e.g., greater than about 50° C., such as greater than about 400° C.) to increase a sensitivity of the thermal conductivity sensor. The TC variation with temperature is unique by gas type and can be further used in subsequent processing as a gas identifier and quantifier.

For detection and identification of non-flammable gases, the resonant frequency of the damping sensor (which may be proportional to VD) and TC can be monitored and compared to baseline data from previous measurements. When a shift in VD or TC is detected, further processing can be triggered as described below.

The processing subsystem may compensate the sensors for temperature, pressure, humidity (relative humidity, absolute humidity, or both), and flowrate of the sample. Sensor calibration data may be stored in a non-volatile memory. Data from separate temperature, pressure, humidity, and flowrate sensors can be utilized to compensate the individual sensors. Alternately, another microcantilever can be used to sense temperature, pressure, humidity, and flowrate. In the case of the catalytic sensor, subtraction of the thermal conductivity sensor response from the response of the catalytic sensor compensates the catalytic sensor for the effects of thermal conductivity, temperature, pressure, humidity, as well as for the effects of gas flow.

With the data collected and processed as described thus far, the processing subsystem can determine the magnitude and slope of the power shift of the thermal conductivity sensor, (which may be proportional to TC) versus extracted parameters of resonant frequency shift of the damping sensor (e.g., quality factor (Q), and $R_m$ (proportional to VD and density)) vector; the vector magnitude being proportional to gas concentration and the vector slope being an indicator of the gas identity. In other words, the ratio of the change in power of the thermal conductivity sensor (i.e., the change in thermal conductivity of the sample relative to the baseline) to the change in resonant frequency or viscous damping of the damping sensor may be used to determine composition of the sample. Some gases have similar or overlapping TC versus viscous damping vectors, hence exothermic light-off temperatures and magnitudes, or lack thereof, together with the MOS and coated microcantilever responses, or lack thereof, are utilized to further differentiate gases. For instance, hydrogen and methane have similar slopes (i.e., the ratio of the change in power of the thermal conductivity sensor to the change in resonant frequency or damping (e.g., viscous damping)), but hydrogen has a light-off temperature typically below 100° C. while methane has a light-off temperature typically above 400° C., the exact temperatures being dependent on the catalyst composition used on the catalytic sensor. Furthermore, in some embodiments, it is contemplated that multiple light-off events at different temperatures indicate the presence of multiple flammable gases. Helium is an example of a non-flammable gas that has a similar TC vs. VD vector slope to hydrogen and methane, but is parsed by the fact that no exothermic light-off is detected since it is non-flammable. The unique TC versus temperature vector can be utilized to further quantify and identify both flammable and non-flammable gases.

Once one or more components of the sample are identified, the TC versus VD magnitude data can be calibrated by the component type to determine the concentration (e.g., gas concentration) of each component in the sample. In some embodiments, calibrating the sensor for each component may be beneficial since the magnitude response may be dependent on the gas type. In some embodiments, the memory may include calibration values that may be used for determining a concentration of one or more components in the sample based on the particular component identified. The concentration of the component may be determined based on the calibration value, the value of the damping (e.g., the viscous damping), and the value of the thermal conductivity of the sample. With the components of the sample identified and quantified, the processing subsystem can cross correlate individual sensor responses to detect faults, compensate sensors, and update calibration data as required. For example, the magnitude response of the catalytic sensor can be compared to the TC versus VD vector magnitude (gas concentration) to compensate for catalytic response degradation. If the magnitude response of the catalytic sensor compared to the magnitude of the TC versus VD vector is below a preset threshold, a fault of the catalytic sensor can be reported.

As a final analysis, all the sensor responses can be processed simultaneously in a multi-dimensional analysis and compared to a stored response database or fingerprint. If a gas separation device, such as a gas chromatograph (GC), is used ahead of the detector, the time sequence of the fingerprint response can be used to further parse the gas identification and quantification.

The processing described above in this embodiment can be repeated on a periodic basis as required by the application. Between processing, the system can be powered down or put into a sleep mode to conserve power. Results of the analysis can be reported and updated through a communications port or graphical user interface (GUI).

Accordingly, a multi-dimensional orthogonal data set including, for example, exothermic light-off temperature(s), exothermic heat, a ratio of a response of the catalytic sensor at a first temperature to the response thereof at a second temperature, a catalytic activity at a first temperature, a catalytic activity at a second temperature, a ratio of the catalytic activity at the first temperature to the catalytic activity at the second temperature, TC (e.g., thermal conductivity at two or more temperatures and a ratio of the thermal conductivity at a first temperature to the thermal conductivity at a second temperature), TC versus temperature, damping (e.g., viscous damping), resonant frequency shift of a damping sensor, quality factor, equivalent circuit model parameter shifts, and MOS and coated microcantilever responses is parsed and analyzed. The system and method described herein overcomes many of the individual sensor shortcomings. Combining and analyzing the data enables differentiating gases with similar two-dimensional characteristics. The resulting detector system is robust, sensitive, and accurate.

FIG. 1 is an overall block diagram of a detector 100, in accordance with some embodiments of this disclosure. In one example, sensor components of the detector 100 may include at least one catalytic sensor 112 (e.g., a catalytic microhotplate sensor), at least one thermal conductivity sensor 114, one or more of a metal oxide semiconductor (MOS) sensor and a coated microcantilever sensor 115, a damping sensor 116, and one or more environmental sensors 118. In some embodiments, the thermal conductivity sensor 114 comprises a reference thermal conductivity sensor configured to measure a baseline thermal conductivity of a sample and at least another thermal conductivity sensor separate from the reference thermal conductivity sensor. In some embodiments, each of the catalytic sensor 112, the thermal conductivity sensor 114, the one or more of the metal oxide semiconductor sensor and the coated microcantilever sensor 115, the damping sensor 116, and the one or more environmental sensors 118 are disposed on the same substrate (e.g., a silicon substrate). A processing subsystem 140 (also referred to herein as a "subsystem") may be interfaced to analog-to-digital (A/D) and digital-to-analog (D/A) converters 120 though a data bus 122 to the individual sensors 112, 114, 115, 116, and 118. The processing subsystem 140 may include a central processing unit (CPU) 124, a memory 128 (including software, databases, baseline data, calibration data, etc.), a communications port 130, and optionally a graphical user interface (GUI) 126. In some embodiments, flame arrestors, filters, gas-preconcentrators, and/or separation devices 110 may be used between some or all of the sensors 112, 114, 115, 116, 118 and the gas sample being analyzed. The flame arrestor may reduce a likelihood or even prevent a fire or explosion in flammable environments. The filter may be used to mitigate or eliminate known sensor contaminants and may be used to provide enhanced selectivity. The combined filter and flame arrestor may also be designed to regulate gas flow or diffusion of the sample to the sensors 112, 114, 115, 116, 118. In some embodiments, a gas pre-concentrator or a separation device, as indicated at 110, such as a gas chromatograph, a pump system, or both may be used ahead of the sensor devices to enhance selectivity of gases to which the sensors 112, 114, 115, 116, 118 are exposed, as illustrated at block 110.

As will be described herein, one or more components (e.g., sensors) of the detector 100 may be used to determine one or more properties of the sample (e.g., a presence of at least one analyte (e.g., a gas) of interest, a composition of the sample, a concentration of one or more analytes in the sample, an average molecular weight of the sample, etc.).

Figure 2A:
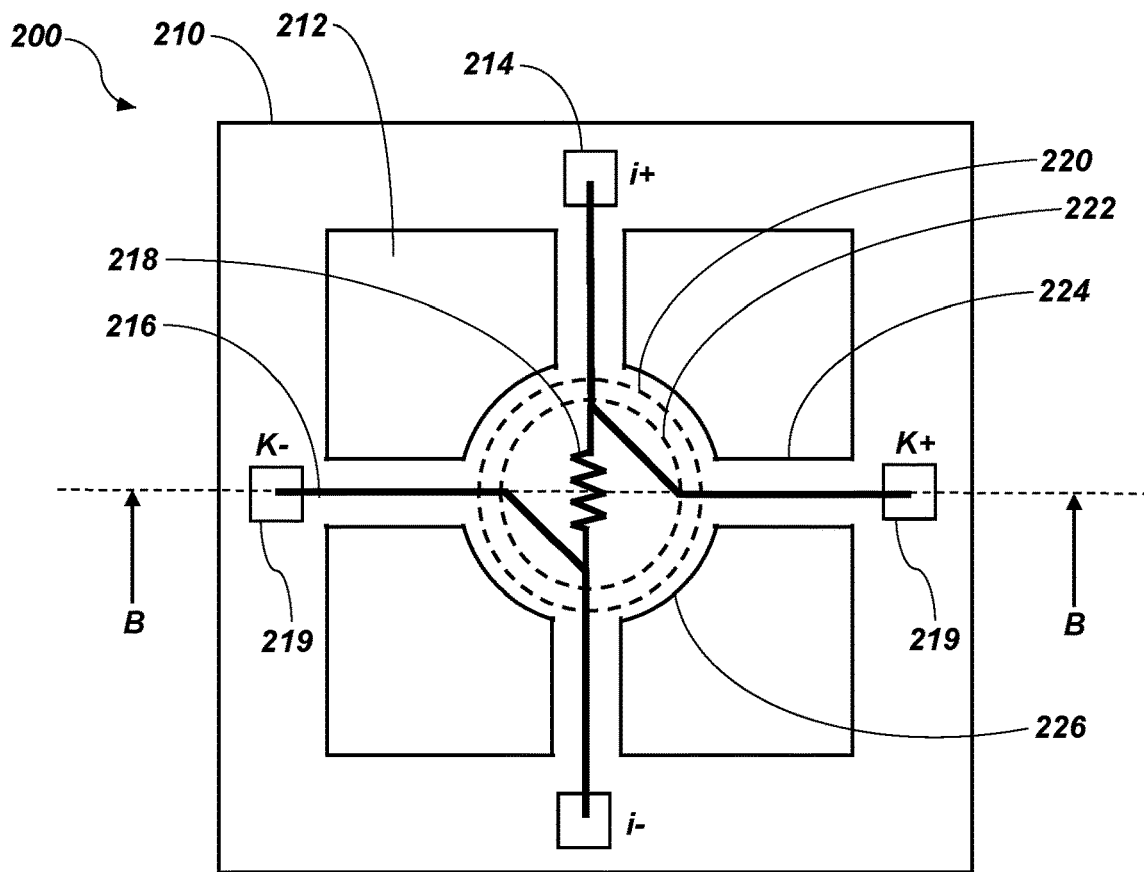
FIG. 2A illustrates a top view of a microhotplate of a detector, in accordance with embodiments of the disclosure.
Figure 2B:
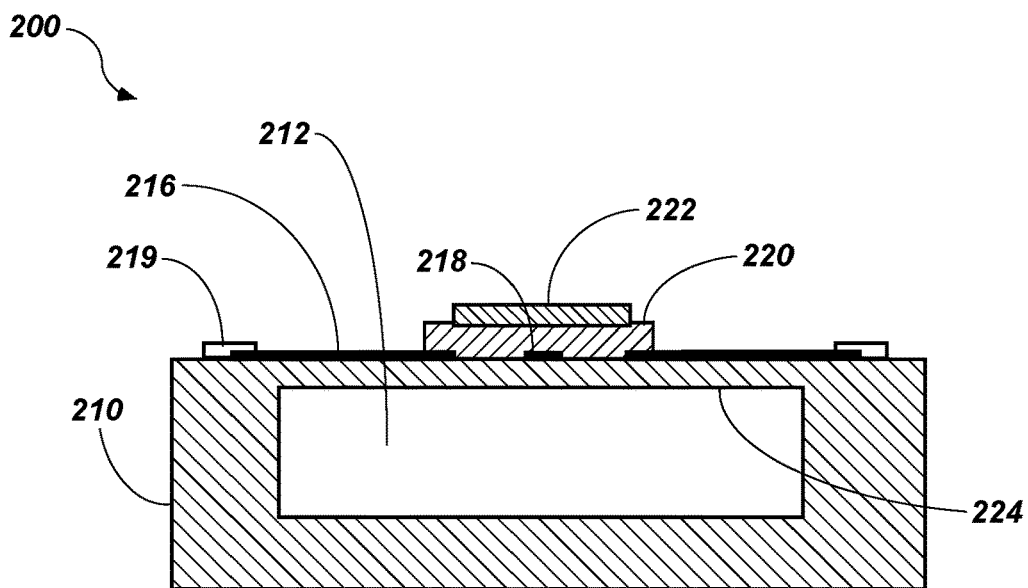
FIG. 2B illustrates a cutaway side view of FIG. 2A shown for clarity and taken along section line B-B of FIG. 2A.

FIGS. 2A and 2B are a top view and cross-sectional view, respectively, of a microhotplate sensor 200. FIG. 2B is a cross-sectional view of the microhotplate sensor 200 taken along section line B-B in FIG. 2A. The microhotplate sensor 200 may be used for both the at least one catalytic microhotplate sensor 112 (FIG. 1) and the at least one thermal conductivity sensor 114 (FIG. 1), which may also be referred to herein as a thermal conductivity microhotplate sensor. In other words, the detector 100 (FIG. 1) may include at least one microhotplate sensor 200 comprising the catalytic microhotplate sensor 112 (FIG. 1) and at least another microhotplate sensor 200 comprising the thermal conductivity sensor 114 (FIG. 1).

The microhotplate sensor 200 may be fabricated on a silicon substrate 210 using MEMS fabrication techniques. Tethers 224 may support a suspended microhotplate 226, which may be between 50 μm and about 1,000 μm in diameter. In some embodiments, the tethers 224 may comprise silicon nitride, silicon dioxide, silicon carbide, another material, or combinations thereof. A resistive heater 218 may be suspended over the microhotplate 226 and may be configured to provide heat to the microhotplate 226 to control a temperature thereof. A passivation coating 220 may overlie the resistive heater 218 and a coating material 222 may overlie the passivation coating 220. The coating material 222 may be isolated from electrical contact with the resistive heater 218 with a passivation coating 220. In embodiments where the microhotplate sensor 200 corresponds to a catalytic sensor 112 (FIG. 1), the coating material 222 may comprise a catalytic material, such as, for example, palladium, platinum, ruthenium, silver, iridium, another catalyst metal, or combinations thereof. The coating material 222 may further include a support material, such as aluminum oxide ($Al_2O_3$), magnesium oxide (MgO), zirconia ($ZrO_2$), ceria-stabilized zirconia (CSZ), another support material, or combinations thereof. In embodiments where the microhotplate sensor 200 comprises a thermal conductivity sensor 114 (FIG. 1), the coating material 222 may comprise an inert material. By way of nonlimiting example, the inert coating material 222 may comprise aluminum oxide ($Al_2O_3$). In other embodiments of the thermal conductivity sensor 114, the coating material 222 may not be present. In other embodiments, a membrane type microhotplate (without tethers; not shown) could be utilized.

The silicon substrate 210 may include a gap 212 between and under the silicon tethers 224 and the microhotplate 226. The gap 212 and the tethers 224 may be configured to minimize or reduce heat loss from the microhotplate 226 to the substrate. In other words, the gap 212 and the tethers 224 may provide thermal isolation of the microhotplate 226 and the resistive heater 218 from the substrate 210 and the tethers 224, which may increase heat transfer to a sample located proximate the microhotplate 226 and the resistive heater 218. The resistive heater 218 may be electrically coupled to bond pads 214 with interconnects 216 that may comprise an electrically conductive material.

The resistive heater 218 may be powered with a current provided between the bond pads 214, which may also be referred to as "i+" and "i−" bond pads 214. Voltage across the resistive heater 218 may be sensed via bond pads 219, which may also be referred to herein as "kelvin" bond pads 219, "K+" and "K−." The interconnects 216 associated with the bond pads 219 may be referred to as "kelvin sense lines." In other embodiments, the voltage across the resistive heater 218 may be measured elsewhere in the microhotplate sensor 200 without the kelvin sense lines, but additional compensation might be necessary to improve measurement accuracy.

Heater resistance, proportional to temperature, of the microhotplate 226, and the heater power may be calculated from the forced current value and measured voltage value. By way of nonlimiting example, the resistance of the resistive heater 218 may be determined according to Ohm's law, as shown in Equation (1) below:

$$R = V/I \quad (1),$$

wherein V is the voltage across the resistive heater 218 (measured with the bond pads 219) and I is the current applied to the resistive heater 218 through the bond pads 214. The power to the resistive heater may be determined according to Equation (2) below:

$$P = I \cdot V \quad (2),$$

wherein P is the power to the resistive heater 218, and I and V are the same as described above.

The described microhotplate structure may be optimized to operate at low power levels (e.g., from about 5 mW to about 50 mW) over a large temperature range with minimal conductive heat losses, minimal thermal-mechanical deformations, and good thermal symmetry and uniformity.

With further reference to FIG. 1, FIG. 2A, and FIG. 2B, the thermal conductivity sensor 114 (FIG. 1) may be fabricated on the same silicon wafer as the catalytic sensor 112 (FIG. 1), and may include identical features as the catalytic sensor 112 except that the thermal conductivity sensor 114 may not include the coating material 222 or may include a substantially inert coating material 222. The thermal conductivity sensor 114 may include a non-catalytic coating (e.g., a substantially inert coating material) that is used to match the thermal mass, emissivity, and/or thermal conductivity of the catalytic sensor and/or to further increase the surface area thereof.

In some embodiments, the resistive heater 218 of each of the catalytic sensor 112 (FIG. 1) and the thermal conductivity sensor 114 (FIG. 1) may be ramped in predetermined temperature steps by the processing subsystem 140 (FIG. 1) or a controller and the power to achieve each temperature step may be monitored by measuring the voltage and current to the resistive heater 218, as described above with reference to Equation (2). In some embodiments, the central processing unit 124 (FIG. 1) comprises a controller configured to ramp the temperature of the at least one thermal conductivity sensor 114 (FIG. 1) to a predetermined temperature while the at least one thermal conductivity sensor is exposed to the sample. The predetermined temperature may be at least about 400° C., at least about 600° C., at least about 800° C., at least about 1,000° C., or at least about 1,200° C., although the disclosure is not so limited.

The power at each temperature may be measured and may be correlated to a thermal conductivity of the sample to which the thermal conductivity sensor 114 is exposed. Accordingly, the thermal conductivity sensor 114 may be ramped according to predetermined temperature steps. In some embodiments, the predetermined temperature steps may include two or more temperatures. At each temperature, the voltage across the resistive heater 218 may be measured (e.g., with the bond pads 219 of the respective microhotplate sensors 200). From the known current provided to the microhotplate sensor 200, the resistance and the power of the microhotplate sensor 200 may be determined for each temperature (e.g., according to Equation (1) and Equation (2), respectively, above).

A thermal conductivity or a change in thermal conductivity relative to a reference gas (e.g., air) may be determined with the thermal conductivity sensor 114 (FIG. 1). A difference in the thermal conductivity between a sample (e.g., a sampled gas) and a reference (e.g., a baseline) gas may be determined according to Equation (3) below:

$$\Delta TC = TC(n) - TC(\text{baseline}) \quad (3),$$

wherein TC(n) is the response of the thermal conductivity sensor 114 (e.g., a power to the thermal conductivity sensor 114 to maintain a particular temperature) to exposure to a sample while the thermal conductivity sensor is at the particular temperature, TC(baseline) is one or more of the thermal responses of the thermal conductivity sensor 114 data from previous temperature ramps (e.g., the baseline data, such as an average of TC(n) at the particular temperature such as when the thermal conductivity sensor 114 is exposed to a baseline or a reference sample (e.g., air)), a response of a reference thermal conductivity sensor to exposure to a reference sample, and baseline data stored in memory, and ΔTC is the relative change in the response of the thermal conductivity sensor 114 at the particular temperature relative to the baseline value (TC(baseline)) at the particular temperature and may be referred to herein as a change in thermal conductivity at a particular temperature. The baseline data (TC(baseline)), typically stored in memory, may be determined in a laboratory or may comprise an average value of the response of the thermal conductivity sensor or a reference thermal conductivity sensor from previous measurements for each temperature of interest. The baseline or reference sample may include air, oxygen, nitrogen, carbon monoxide, methane, natural gas, ethane, propane, another gas, or combinations thereof. A change in the power to maintain each temperature relative to the baseline (e.g., the value of ΔTC) may be an indication of a change in the thermal conductivity of the sample relative to a baseline (e.g., air). In some embodiments, ΔTC may be determined at two or more temperatures. In some embodiments, ΔTC may be determined during the temperature ramp and at temperature intervals (e.g., about every 100° C., about every 50° C., about every 25° C., about every 10° C., about every 5° C., or even every about 1° C.). In some embodiments, the baseline or reference sample may be selected based on a desired use of the detector. By way of nonlimiting example, a detector may be used to determine a content of natural gas and the baseline of such sensor may comprise methane or natural gas. Changes in the thermal conductivity relative to the baseline may correspond to changes in a composition of natural gas. Accordingly, the baseline may be selected based on a desired use of the detector.

In some embodiments, baseline historical data from the thermal conductivity sensor 114, stored in memory 128, from previous reference ramps may be subtracted from the current reference ramp to produce a signal representative of the thermal response ($\Delta TC$). The $\Delta TC$ power measurements from the thermal conductivity sensor 114 may be directly proportional to the TC of the gas and may be measured at two or more temperatures. It can be advantageous to measure TC at relatively low temperatures (e.g., from about 50° C. to about 250° C.) and also at relatively high temperatures (e.g., from about 400° C. to about 800° C.).

Figure 3A:
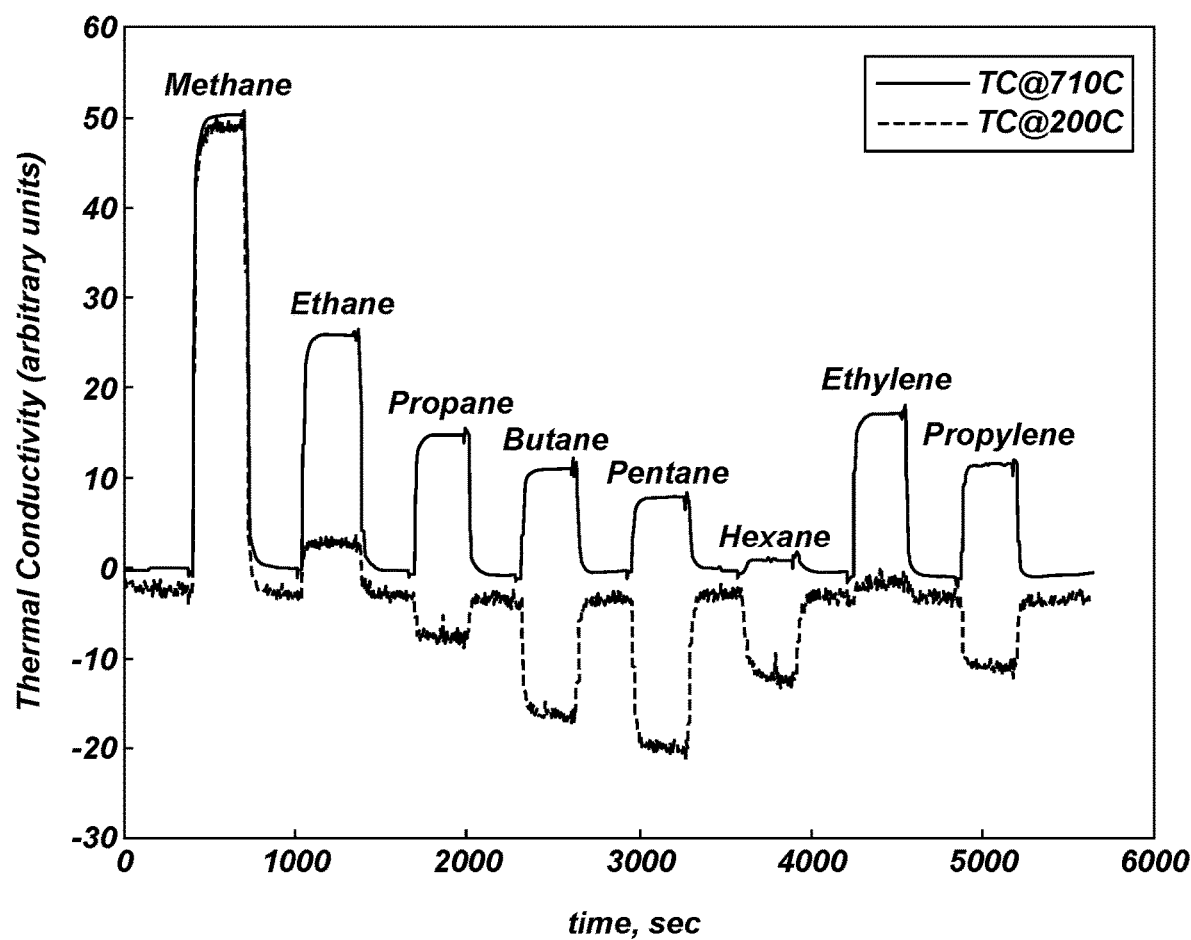
FIG. 3A is a graph illustrating a thermal conductivity of several gases at two temperatures.

FIG. 3A is a graph illustrating a change in thermal conductivity of several gases at a first temperature and the change in thermal conductivity of the gases as a second temperature relative to a baseline (e.g., air). A thermal conductivity of 0 corresponds to the thermal conductivity of air at the plotted temperature. A negative thermal conductivity indicates a negative shift (i.e., a decrease) in thermal conductivity relative to air and a positive thermal conductivity indicates a positive shift (i.e., an increase) in thermal conductivity) relative to air. A thermal conductivity sensor 114 (FIG. 1) was exposed to the gases and the thermal conductivity change relative to air of each gas was determined according to Equation (3) above. FIG. 3A shows the thermal conductivity sensor 114 responses to various gases at a first temperature (200° C.) and a second temperature (710° C.). As indicated in FIG. 3A, the thermal conductivity change relative to air for the gases illustrated increases with increasing temperature.

Figure 3B:
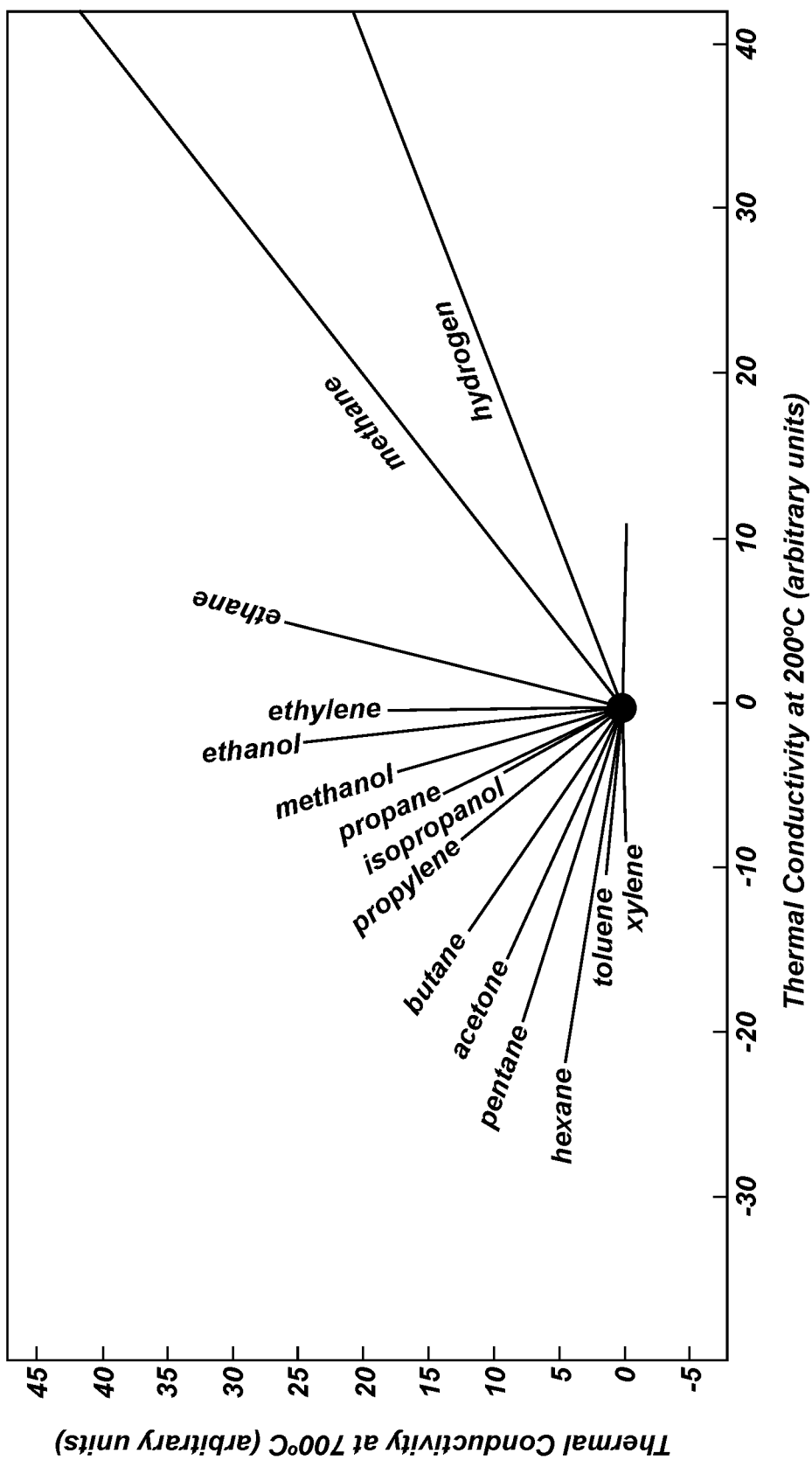
FIG. 3B is a graph illustrating a relationship between a ratio of the thermal conductivity of several gases at a first temperature to the thermal conductivity of the gases at a second temperature.

FIG. 3B is a plot illustrating a change in a thermal conductivity at a first temperature (at 200° C.) versus a change in a thermal conductivity at a second temperature (at 700° C.) of the same gases of FIG. 3A. The data illustrated in FIG. 3B is normalized to methane at a concentration of 50% lower explosive limit (LEL). The point (0,0) corresponds to the TC of air without any analytes. Each gas plotted is for a relative density exposure of 50% LEL. Since the measurements are normalized to 50% LEL for methane, the methane endpoint appears at the coordinates of (50, 50). Intermediate points between the origin and the endpoints for each gas are representative of the sensor's response (e.g., the power to maintain each of the two temperatures) over time when it is exposed to the gas being measured. Each gas exhibits a unique slope of change in thermal conductivity relative to the baseline (air) at the first temperature to the change in thermal conductivity relative to the baseline at the second temperature. As used herein, the terms "change in thermal conductivity relative to the baseline" and "change in thermal conductivity" are used interchangeably. As used herein, reference to a thermal conductivity at a particular temperature includes the change in thermal conductivity relative to the baseline at the particular temperature.

Accordingly, the ratio of the change in thermal conductivity at the first temperature (i.e., the response of the thermal conductivity sensor to exposure to the sample when the thermal conductivity sensor is at the first temperature relative to the thermal conductivity baseline at the first temperature (e.g., $\Delta TC$ at the first temperature)) to the change in thermal conductivity at the second temperature (i.e., the response of the thermal conductivity sensor to exposure to the sample when the thermal conductivity sensor is at the second temperature relative to the thermal conductivity baseline at the second temperature (e.g., $\Delta TC$ at the second temperature)) may be unique by gas type. Accordingly, in some embodiments, a composition of a sample may be determined based, at least in part, on the ratio of the change in thermal conductivity at the first temperature to the change in thermal conductivity at the second temperature. In some embodiments, the thermal conductivity sensor 114 may be exposed to a first, relatively lower temperature and a second, relatively higher temperature and a thermal conductivity (or a change in thermal conductivity relative to the reference) of the sample may be determined at each temperature.

Figure 3C:
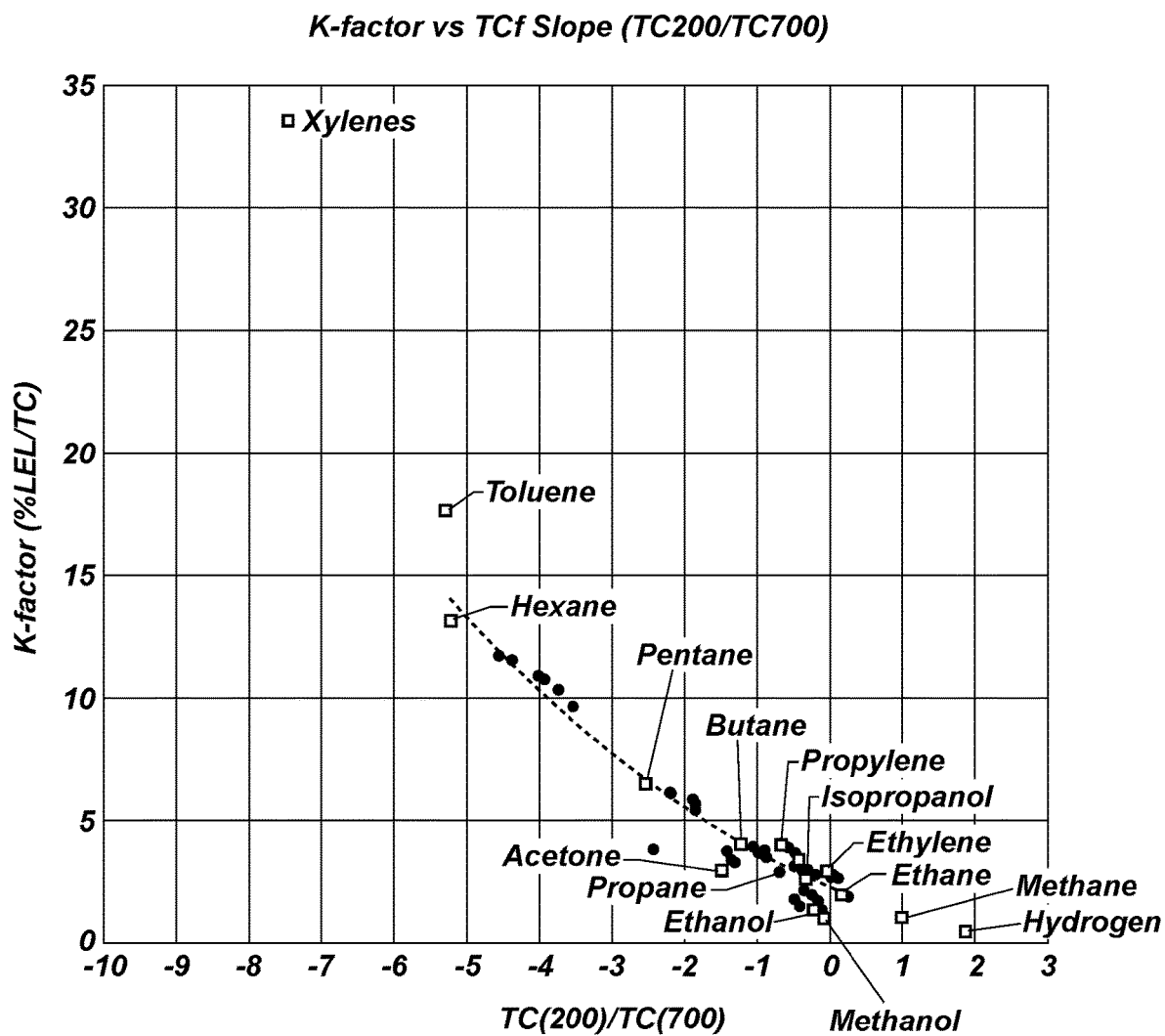
FIG. 3C is a graph illustrating a relationship between a ratio of thermal conductivity at two temperatures to a ratio of thermal conductivity to concentration for various gases.

FIG. 3C is a graph showing a relationship between a so-called "k-factor" and the ratio of the change in thermal conductivity at the first temperature (when the thermal conductivity sensor 114 is at the first temperature and exposed to a sample) to the change in thermal conductivity at the second temperature (when the thermal conductivity sensor 114 is at the second temperature and exposed to the sample) for a plurality of gases. For each gas, the k-factor may be equal to a concentration of a gas (for example, in percent of lower explosive limit (LEL), in parts per million (ppm), etc.) to which the thermal conductivity sensor is exposed divided by the magnitude of the response of the thermal conductivity sensor (e.g., at the second temperature, such as 700° C.). The k-factor may be determined in a laboratory and the k-factor for each of a plurality of gases may be stored in the memory 128 (FIG. 1). In some embodiments, a composition of the sample may be determined based on the ratio of the change in the thermal conductivity of the sample at the first temperature to the change in the thermal conductivity at the second temperature and the k-factor, which may be stored in the memory 128 (FIG. 1). In some embodiments, after an identity of a gas is identified, a concentration thereof may be determined by multiplying its respective k-value by the thermal conductivity at a particular temperature (e.g., the response of the thermal conductivity sensor to exposure to the sample while the thermal conductivity sensor is at the particular temperature).

After identification of the gas in the sample, in some embodiments, a concentration of the gas in the sample may be estimated based on a magnitude of the change in the thermal conductivity relative to the baseline at the first temperature, the magnitude of the change in the thermal conductivity relative to the baseline at the second temperature, or both. In some embodiments, the concentration of the gas may be determined based on the magnitude of the change of the thermal conductivity at the first temperature and the magnitude of the change in thermal conductivity at the second temperature. With reference to FIG. 3B, each gas may exhibit a specific magnitude for a given concentration. Accordingly, the length of the vector in FIG. 3B may be multiplied by the calibration data (i.e., the k-factor) stored in memory 128 (FIG. 1) to determine the concentration of the sample.

Figure 3D:
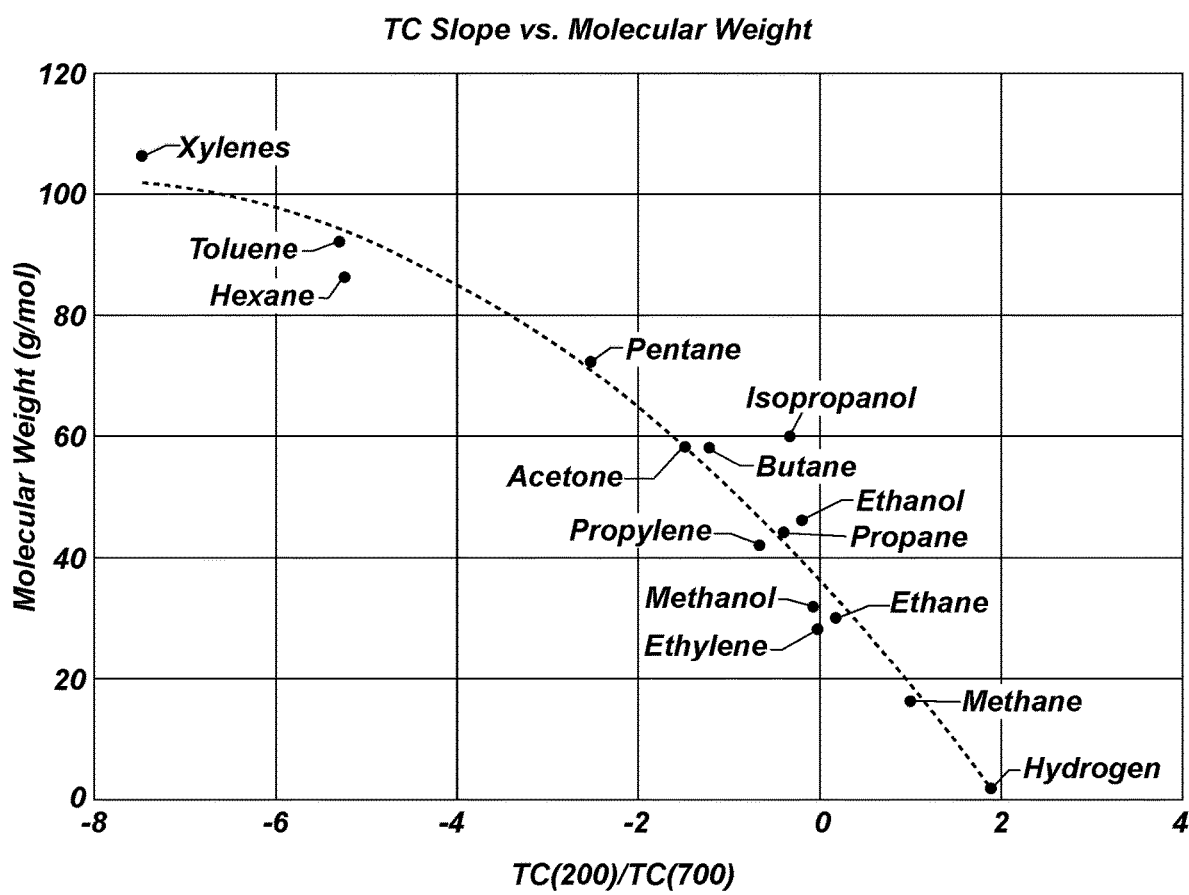
FIG. 3D is a graph illustrating a relationship between a ratio of the thermal conductivity of the sample at a first temperature to the thermal conductivity of the gas at the second temperature and an average molecular weight of the sample.

FIG. 3D is a graph illustrating a relationship between a ratio of the change in thermal conductivity of the sample at a first temperature (e.g., a difference in a response of the thermal conductivity sensor to exposure to the sample when the thermal conductivity sensor is at the first temperature and a baseline response of the thermal conductivity sensor to exposure to a reference when the thermal conductivity sensor is at the first temperature) to the change in the thermal conductivity of the sample at the second temperature (e.g., a difference in a response of the thermal conductivity sensor to exposure to the sample when the thermal conductivity sensor is at the second temperature and a baseline response of the thermal conductivity sensor to exposure to a reference when the thermal conductivity sensor is at the second temperature) and an average molecular weight of the sample. Accordingly, in some embodiments, an average molecular weight of the sample may be determined based on the ratio. In some embodiments, one or both of a presence of one or more gases and a concentration of one or more gases in the sample may be determined based, at least in part, on the average molecular weight. In FIG. 3D, the first temperature is 200° C. and the second temperature is 700° C.

Figure 4:
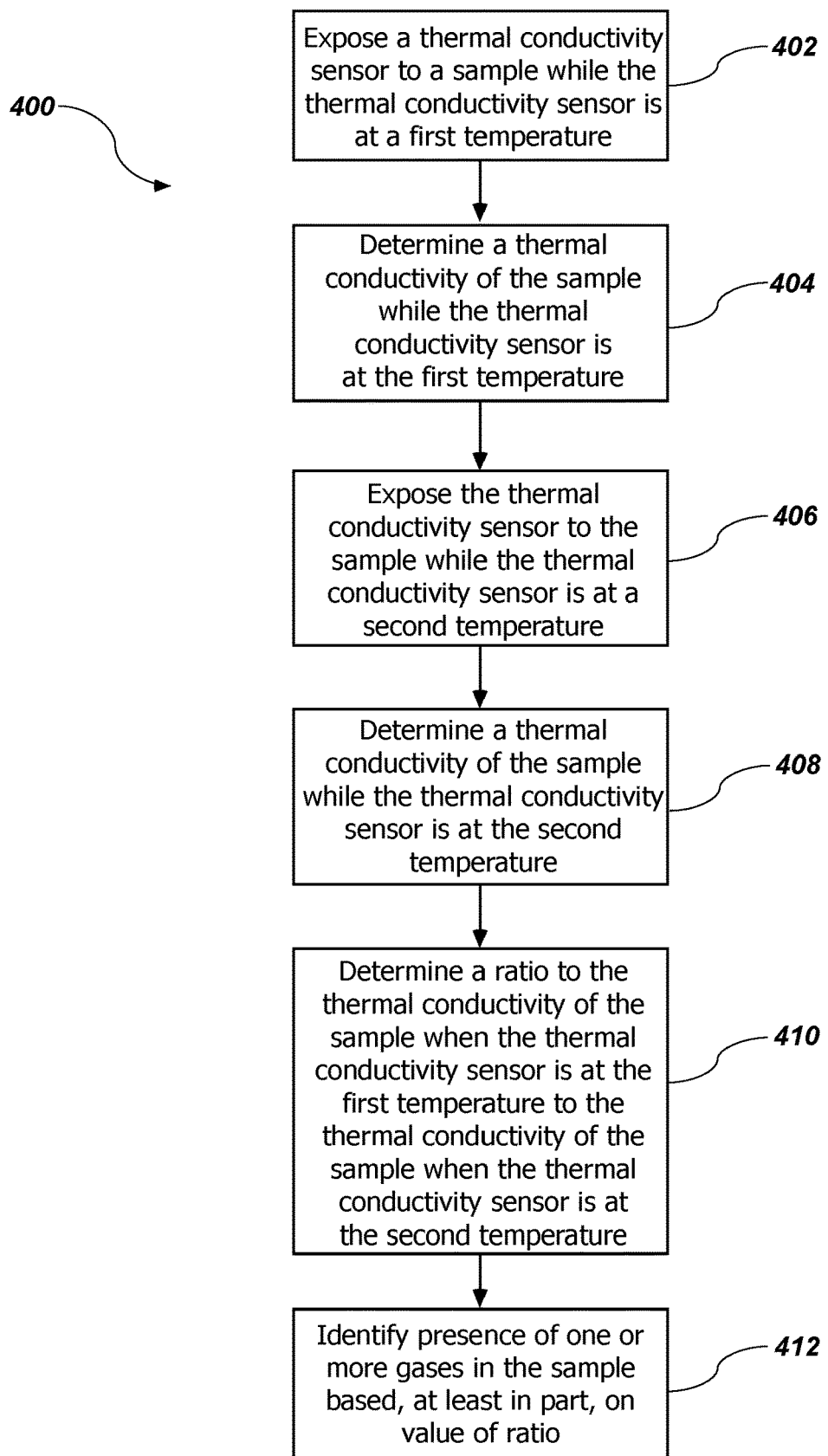
FIG. 4 is a simplified flow diagram of a method of determining one or more properties of a sample, in accordance with embodiments of the disclosure.

FIG. 4 is a simplified flow diagram illustrating a method 400 of using the thermal conductivity sensor 114 (FIG. 1) to determine one or more properties of a sample (e.g., a composition of the sample). The method 400 includes act 402 including exposing a thermal conductivity sensor to a sample while the thermal conductivity sensor is at a first temperature; act 404 including determining a thermal conductivity of the sample while the thermal conductivity sensor is at the second temperature; act 406 including exposing the thermal conductivity sensor to the sample while the thermal conductivity sensor is at a second temperature higher than the first temperature; act 408 including determining a thermal conductivity of the sample while the thermal conductivity sensor is at the second temperature; act 410 including determining a ratio of the thermal conductivity of the sample when the thermal conductivity sensor is at the first temperature to the thermal conductivity of the sample when the thermal conductivity sensor is at the second temperature; and act 412 including identifying a presence of one or more gases in the sample based, at least in part, on the value of the ratio.

Act 402 may include exposing a thermal conductivity sensor to a sample while the thermal conductivity sensor is at a first temperature. In some embodiments, the thermal conductivity sensor may be substantially the same as the microhotplate sensor 200 described above with reference to FIG. 2A and FIG. 2B. The thermal conductivity sensor at the first temperature may be exposed to a sample including an analyte of interest. At a temperature between about 150° C. and about 250° C. a first desorbing of the physiosorbed species, especially $H_2O$, is affected before ramping to higher temperatures where poisoning chemical reactions can take place, thus preserving the catalytic coating. In some embodiments, it can be advantageous to measure TC while the thermal conductivity sensor 114 is at relatively low temperatures (about 50° C. to about 250° C.) and also at relatively high temperatures (about 300° C. to about 800° C., such as between about 400° C. and about 800° C.). The first temperature may be selected to be above a temperature at which water may physisorb on the thermal conductivity sensor 114. In some embodiments, the first temperature may be selected to be between about 200° C. and about 250° C., such as about 200° C. In some such embodiments, the first temperature is selected to be above the boiling point of water.

Act 404 may include determining a thermal conductivity of the sample while the thermal conductivity sensor is at the first temperature. The thermal conductivity (e.g., the change in thermal conductivity relative to a baseline) may be determined based on Equation (3) above. By way of non-limiting example, the power of the thermal conductivity sensor to maintain the first temperature may be measured. The power to maintain the first temperature when the thermal conductivity sensor is exposed to a reference sample (e.g., the baseline value) may be subtracted from the power to maintain the first temperature when the thermal conductivity sensor is exposed to the sample. The difference may be proportional to the change in thermal conductivity of the sample relative to the baseline (e.g., air). In other words, the difference may correspond to the difference in thermal conductivity of the sample relative to the thermal conductivity of the reference.

Act 406 may include exposing the thermal conductivity sensor to the sample while the thermal conductivity sensor is at a second temperature higher than the first temperature. TC generally increases with increasing temperatures; therefore measurements made at high temperatures will give larger responses, thus increasing the system sensitivity. Accordingly, in some embodiments, the second temperature may be selected to be greater than about 400° C. The second temperature may be selected to be between about 300° C. and about 800° C., such as between about 300° C. and about 400° C., between about 400° C. and about 600° C., between about 600° C. and about 700° C., or between about 700° C. and about 800° C.

Act 408 may include determining a thermal conductivity of the sample while the thermal conductivity sensor is at the second temperature. Determining the thermal conductivity of the sample while the thermal conductivity sensor is at the second temperature may be performed in substantially the same manner as determining the thermal conductivity of the sample while the thermal conductivity sensor is at the first temperature described above with reference to act 404. For example, the power of the thermal conductivity sensor to maintain the second temperature may be measured and compared to the power to maintain the second temperature when the thermal conductivity sensor is exposed to a reference sample (e.g., the baseline value). The difference may be proportional to the change in thermal conductivity of the sample relative to the baseline (e.g., air).

Act 410 may include determining a ratio of the change in the thermal conductivity of the sample relative to the baseline when the thermal conductivity sensor is at the first temperature to the change in the thermal conductivity of the sample relative to the baseline when the thermal conductivity sensor is at the second temperature. The ratio may be determined according to Equation (4) below:

$$R_{TC} = TC_{T1}/TC_{T2} \qquad (4),$$

wherein $R_{TC}$ is the ratio, $TC_{T1}$ is the change in the thermal conductivity at the first temperature, and $TC_{T2}$ is the change in the thermal conductivity at the second temperature. In some embodiments, $TC_1$ is equal to $\Delta TC$ at the first temperature and $TC_2$ is equal to $\Delta TC$ at the second temperature according to Equation (3) above.

Act 412 includes identifying an identity of one or more analytes in the sample based, at least in part, on the value of the ratio. In some embodiments, and with reference to FIG. 3B, the value of the ratio may be indicative of a presence of one or more components (e.g., gases) in the sample. In some embodiments, the method 400 further includes determining a concentration of one or more gases in the sample. The concentration of the one or more gases may be determined based on one or more of the change in the thermal conductivity at the first temperature, the change in the thermal conductivity at the second temperature, or both. In some embodiments, the concentration of the gas may be determined based on Equation (5) below:

$$C = k \cdot ((TC_{T1})^2 + (TC_{T2})^2)^{1/2} \qquad (5),$$

wherein k is an empirically determined k-factor as described above, C is the concentration of the gas, $TC_{T1}$ is the change in the thermal conductivity of the sample at the first temperature, and $TC_{T2}$ is the change in the thermal conductivity of the sample at the second temperature. More generally, when using magnitudes of n parameters, P, the concentration can be determined according to Equation (6) below:

$$C = k \cdot ((P_1)^2 + (P_2)^2 + \ldots (P_n)^2)^{1/2} \quad (6),$$

Therefore, if using only the single parameter, $TC_{T1}$, the concentration may be determined by $C=k((TC_{T1})^2)^{1/2}=kTC_{T1}$. In some embodiments, parameters that may be used to determine a concentration of one or more gases in the sample include a change in resonant frequency of a damping sensor, a change in quality factor of a damping sensor, a change in series resistance ($\Delta R_m$) of a damping sensor, a change in thermal conductivity at a first temperature, a change in thermal conductivity at a second temperature, a catalytic activity at the first temperature, a catalytic activity at the second temperature, a reactivity at a first temperature, a reactivity at a second temperature, another parameter, or combinations thereof.

Figure 5A:
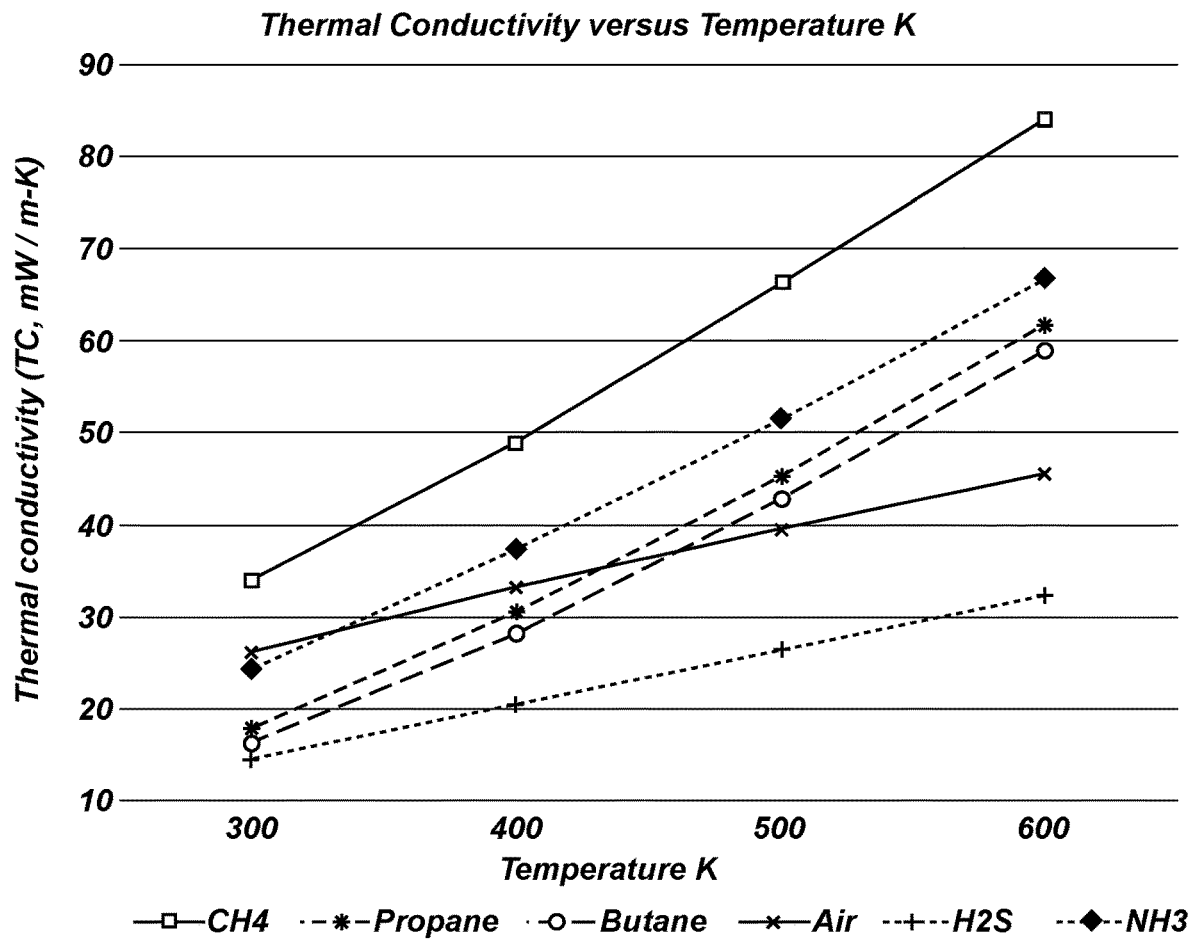
FIG. 5A is a plot of thermal conductivity versus temperature for various gases.
Figure 5B:
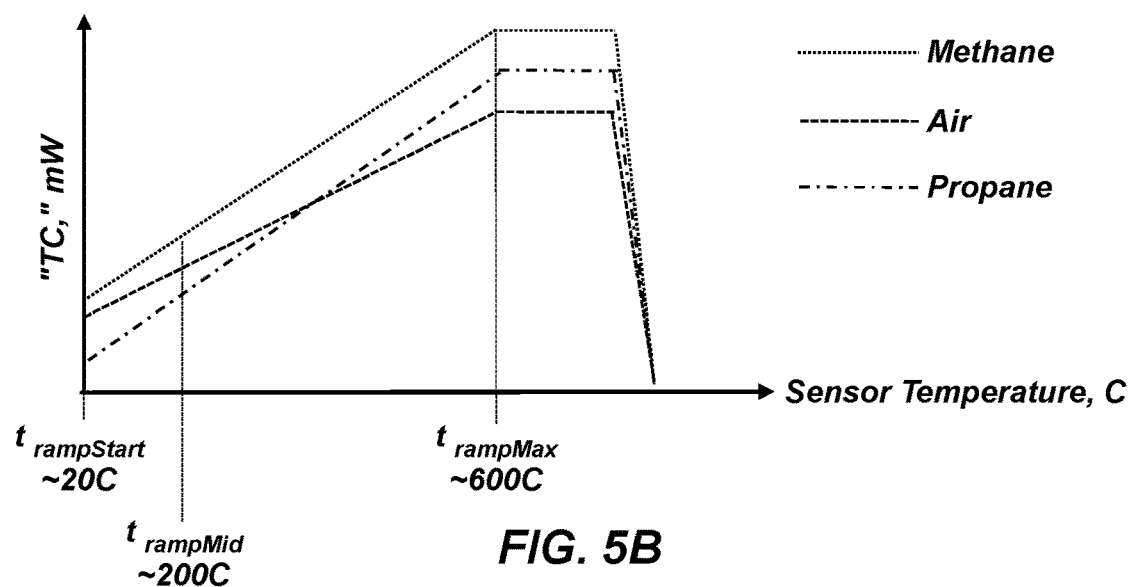
FIG. 5B is a gas specific ramped response of thermal conductivity versus temperature.

In some embodiments, a presence of one or more gases in a sample may be determined by a change of the thermal conductivity of the sample as a function of temperature. For example, referring to FIG. 5A, a graph of TC versus temperature is illustrated showing TC versus temperature vectors for several gases, which is unique by gas type. In some embodiments, some gases may be differentiated based on a ratio of their thermal conductivity to temperature, the thermal conductivity at one or more temperatures, or both. The data for TC versus temperature may be collected from the thermal conductivity sensor 114 (FIG. 1) during the temperature ramp, previously discussed with reference to Equation (3) above. The slope and magnitude of the TC versus temperature vector, unique by gas, can be used as an additional analysis dimension for identifying and quantifying the sampled gas. FIG. 5B is another graph illustrating a relationship between thermal conductivity of some gases and temperature. In FIG. 5B, it can be seen that the methane trace remains above that of air at all temperatures tested, whereas the propane trace starts below air at lower temperatures but crosses over air midway up the ramp. The temperature associated with this crossover feature and other such features can be used to identify gases, while the magnitude of the TC measurement (usually relative to a change from a baseline TC value of pure air) can be used to quantify the concentration of gases present in the air.

There are multiple ways to measure the TC of a sample. One method is to hold the sensor (e.g., the thermal conductivity sensor 114 (FIG. 1)) at a target temperature (e.g., 700° C.) and measure the power required to maintain this temperature—where higher power correlates to higher thermal conductivity due to the higher energy lost due to conduction from the sensor to the gas, and vice versa. Another method entails ramping the sensor temperature while measuring TC. As shown in FIG. 5A and FIG. 5B, the TC variation with temperature is unique by gas type. As such, measuring the TC at multiple temperatures can yield gas-specific sensor outputs like those shown in FIG. 3A, FIG. 3B, FIG. 5A, and FIG. 5B.

The temperature at which a thermal conductivity of a gas crosses the TC of air can be leveraged in additional ways. For instance, the TC of water vapor crosses the TC of air at about 290° C. (563K in FIG. 5A). Making TC measurements at 290° C. may reduce or even substantially eliminate the effect of humidity in the TC measurements. Alternatively, a separate humidity measurement can be used to compensate measurements made at other temperatures, and thus the air to air-gas mixture TC crossing temperature can be used as a gas identifier.

It is contemplated that, in some embodiments, some gases may exhibit similar ratios of a change in thermal conductivity at a first temperature to a change in thermal conductivity at a second temperature, magnitudes of change in thermal conductivity at the first temperature and/or second temperature, k-factors, or relationship between temperature and thermal conductivity. In some such embodiments, at least one property of the sample may be determined based on one or more responses received from the catalytic sensor 112 (FIG. 1). In some embodiments, the catalytic sensor 112 (FIG. 1) may be exposed to a temperature ramp including the same temperatures to which the thermal conductivity sensor 114 (FIG. 1) is exposed, as described above with reference to FIG. 4. Baseline data from the catalytic sensor 112 may be subtracted from each new measurement to produce a signal representing changes in the response of the catalytic sensor (e.g., change in a catalytic thermal response (Delta Cat)) relative to a baseline response of the catalytic sensor 112 for each temperature of a plurality of temperatures, according to Equation (7) below:

$$\text{Delta Cat} = \text{Cat}(n) - \text{Cat(baseline)} \quad (7),$$

wherein Delta Cat is the relative change in response of the catalytic sensor 112 (e.g., a change in the power to the catalytic sensor 112 relative to the baseline), Cat(n) is the response of the catalytic sensor 112 to exposure to the sample (e.g., the power to maintain a predetermined temperature while the catalytic sensor 112 is exposed to the sample), and Cat(baseline) is one or more of the response of the catalytic sensor 112 to exposure to a baseline or a reference gas (e.g., air) and data stored in memory (e.g., calibration data). Delta Cat may be referred to herein as a "catalytic activity" of the catalytic sensor 112 at a particular temperature responsive to exposure to the sample. Cat(n) may be referred to herein as the "catalytic response" of the catalytic sensor 112 or a response of the catalytic sensor 112 to exposure to the sample at a particular temperature. Baseline data from the catalytic sensor 112 may be referred to herein as a "catalytic baseline" or a "baseline catalytic response." The Cat (baseline) may comprise a historic average value of the power to maintain a temperature of the resistive heater 218 (FIG. 2A, FIG. 2B) of the catalytic sensor 112 at the temperature of interest when the catalytic sensor 112 is exposed to the reference sample and may be continuously updated during each temperature ramp. The Delta Cat, Cat(n), and Cat(baseline) values may be determined for each temperature of a plurality of temperatures. The baseline data may include values of power to maintain each temperature of the temperature ramp, for each of the thermal conductivity sensor 114 and the catalytic sensor 112. Accordingly, the baseline data may be stored in memory 128 (FIG. 1) and may consist of historical power versus temperature data from previous temperature ramps of the catalytic sensor 112.

The Delta Cat (the catalytic activity of the catalytic sensor 112) value may be determined at each temperature during the temperature ramp. Accordingly, Delta Cat may correspond to a difference in power to maintain a given temperature of the catalytic sensor 112 while the catalytic sensor 112 is exposed to the sample relative to the catalytic baseline or the power to maintain the given temperature when the catalytic sensor 112 is exposed to the reference gas. In some embodiments, a Delta Cat value that deviates from zero or has a magnitude greater than a predetermined threshold may be an indication of a reactivity of the sample and may correspond to, for example, a reaction on the catalytic sensor 112 (i.e., an exothermic reaction), a reaction onset (e.g., an ignition) temperature of an analyte in contact with the catalytic sensor 112, or both. Multiple catalytic sensors, some having different catalyst formulations with differing sensitivities, can also be utilized.

The catalytic sensor 112 and thermal conductivity sensor 114 (FIG. 1) may be ramped simultaneously to obtain measurements that are correlated in time for improved sensor measurement accuracy.

The $\Delta TC$ measurement (Equation (3)) may be subtracted from the Delta Cat measurement (Equation (7)), the resultant difference producing a signal response proportional to the reactivity of the sample (e.g., the exothermic heat generated on the catalytic sensor), as shown in Equation (8) below:

$$Exo(new) = Delta\ Cat - \Delta TC \qquad (8),$$

wherein Exo(new) is the signal response that is proportional to the heat generated on or removed from the catalytic sensor and Delta Cat and $\Delta TC$ are as previously described. Exo (new) may be referred to herein as a reactivity of the sample or an exothermic response of the catalytic sensor 112. As used herein, the term "exothermic response" means and includes a difference between a catalytic activity of a catalytic sensor and a change in a response of a thermal conductivity sensor to exposure to a sample when the thermal conductivity sensor is at a first temperature compared to a baseline response of the thermal conductivity sensor when the thermal conductivity sensor is at the first temperature.

Subtracting the $\Delta TC$ signal from the Delta Cat signal may compensate the Delta Cat signal for the effects of temperature, pressure, humidity (absolute humidity and relative humidity), and flow variations of the gas under test. Exo (new) may correspond to a difference in response (e.g., signal) between the thermal conductivity sensor 114 and the catalytic sensor 112 at each temperature for which it is determined. Accordingly, a deviation in the value of Exo (new) from its nominal value (e.g., an Exo(new) value different than 0 or greater than a predetermined threshold) may correspond to an exothermic reaction, a reaction onset, or both. In some embodiments, the temperature of the light-off is another identifier of the gas type detected. Multiple light-offs at differing temperatures is an indication of multiple flammable gases present in the sample.

The detection of an exothermic reaction (e.g., an exothermic event) or reaction onset may be used as a flammable gas trigger, establishing a time zero ($T_O$), for the subsequent processing and analysis. As previously noted, in a conventional sensor, the magnitude of response of the catalytic sensor 112 (FIG. 1) may deteriorate with time and poisoning. In some embodiments, determining a presence of a flammable gas according to the methods described above may be independent of catalyst poisoning. In other words, the trigger from the catalytic sensor may be independent of a response magnitude therefrom and may correspond to a binary yes/no trigger from light-off, along with the light-off temperature data, that is used in the subsequent processing. Stated another way, responsive to determining a presence of a flammable gas, such as by determining an Exo(new) (Equation (8)) value greater than a predetermined threshold (e.g., a non-zero value) or a difference between a response of the catalytic sensor 112 and a response of the thermal conductivity sensor 114, the processing subsystem 140 (FIG. 1) may be triggered to perform analysis of the sample.

In some such embodiments, the processing subsystem 140 may determine that the baseline thermal conductivity and the baseline catalytic response (e.g., Cat(baseline)) are the most recent measurements (outputs) from the respective thermal conductivity sensor 114 and catalytic sensor 112 measured immediately prior to detection of the difference in the response of the catalytic microhotplate 112 and the thermal conductivity sensor 114. In some such embodiments, analysis by the processing subsystem 140 may be substantially unaffected by catalyst poisoning, since the baseline data is continuously updated. It will be shown later how the magnitude of the catalytic response can be compensated and calibrated with data from the subsequent processing.

Figure 6:
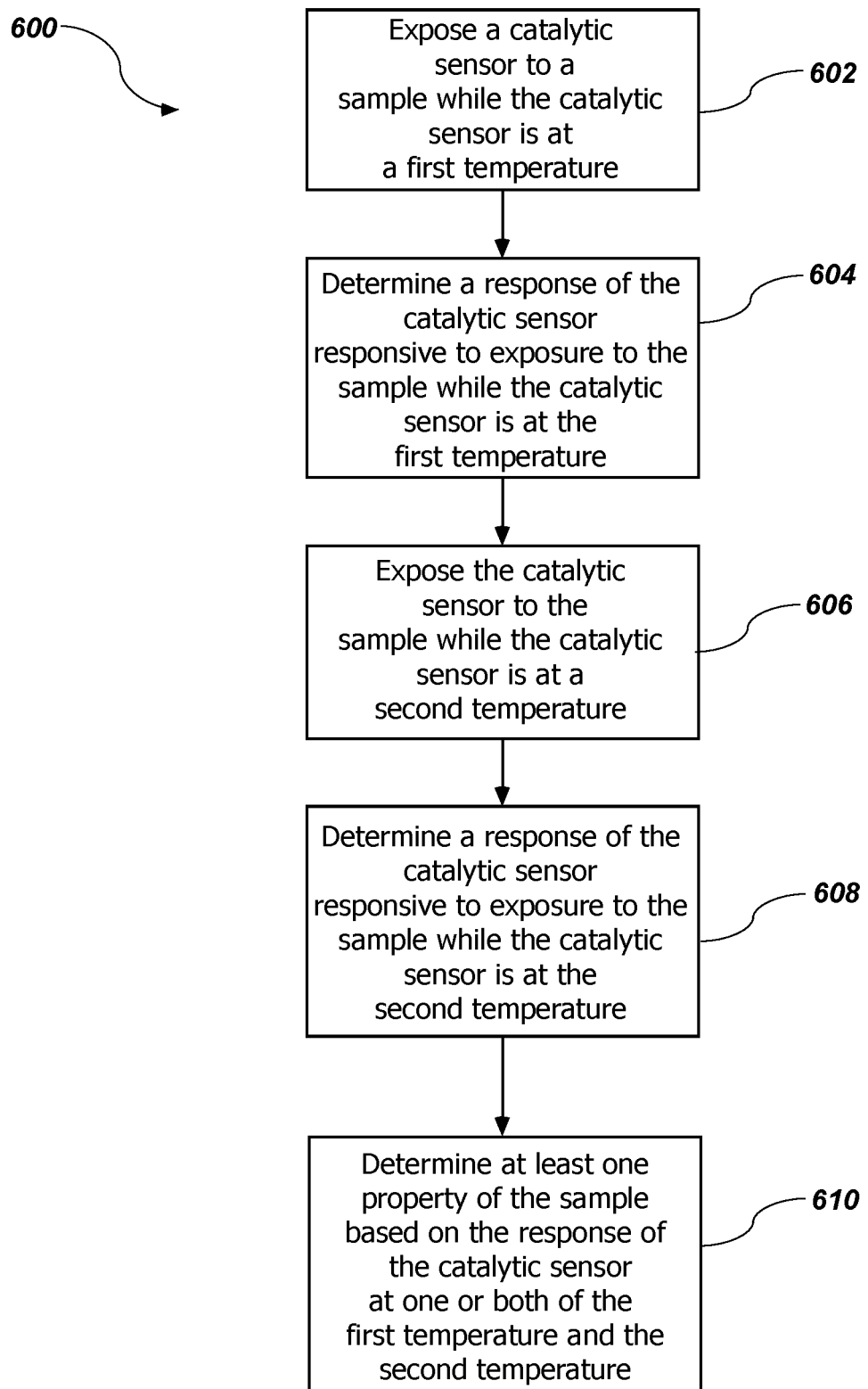
FIG. 6 is a simplified flow diagram of a method of determining one or more properties of a sample, in accordance with embodiments of the disclosure.

FIG. 6 is a simplified flow diagram illustrating a method 600 of determining a composition of a sample, according to some embodiments of the disclosure. In some embodiments, the method 600 may be performed simultaneously with the method 400 described above with reference to FIG. 4. The method 600 includes determining a response of the catalytic sensor 112 (FIG. 1) at two or more temperatures, which may be the same two or more temperatures used to determine the response of the thermal conductivity sensor 114 (FIG. 1) described above with reference to FIG. 4. The method 600 may include act 602 including exposing a catalytic sensor to a gas while the catalytic sensor is at a first temperature; act 604 including determining a response of the catalytic sensor to exposure to the sample while the catalytic sensor is at the first temperature; act 606 including exposing the catalytic sensor to the sample while the catalytic sensor is at a second temperature; act 608 including determining a response of the catalytic sensor to exposure to the sample while the catalytic sensor is at the second temperature; and act 610 including determining at least one property of the sample based, at least in part, on the response of the catalytic sensor at one or both of the first temperature and the second temperature.

Act 602 may include exposing a catalytic sensor to a sample while the catalytic sensor is at a first temperature. In some embodiments, act 602 includes exposing the catalytic sensor to the sample while the catalytic sensor is at the first temperature, which may correspond to the same first temperature to which the thermal conductivity sensor 114 (FIG. 1) is exposed. In some embodiments, the catalytic sensor may be exposed to the sample while the catalytic sensor is at a temperature between about 200° C. and about 250° C.

Act 604 may include determining a response of the catalytic sensor to exposure to the sample while the catalytic sensor is at the first temperature. In some embodiments, act 604 includes determining the catalytic activity of the catalytic sensor and the exothermic response of the catalytic sensor, which may be determined according to, for example, Equation (7) and Equation (8), respectively, above. Act 606 may include exposing the catalytic sensor to the sample while the catalytic sensor is at a second temperature (e.g., about 700° C.) and act 608 may include determining a response of the catalytic sensor responsive to exposure to the sample while the catalytic sensor is at the second temperature. In some embodiments, act 608 may include determining the catalytic activity of the catalytic sensor and the exothermic response of the catalytic sensor to exposure to the sample at the second temperature. In some embodiments, the second temperature may be selected to be the same second temperature to which the thermal conductivity sensor 114 (FIG. 1) is exposed in act 406 described above with reference to FIG. 4.

In some embodiments, act 602 through act 608 may be performed simultaneously with act 402 through act 406 described above with reference to FIG. 4.

Act 610 may include determining at least one property of the sample based, at least in part, on the response of the catalytic sensor at one or both of the first temperature and the second temperature. In some embodiments, determining the at least one property may further include determining the at least one property based on the catalytic activity of the catalytic sensor at the first temperature, the catalytic activity of the catalytic sensor at the second temperature, the exothermic response at the first temperature (the reactivity of the sample at the first temperature), the exothermic response at the second temperature (the reactivity of the sample at the second temperature), a ratio of the catalytic activity at the first temperature to the catalytic activity at the second temperature, and a ratio of the exothermic response at the first temperature to the exothermic response at the second temperature. In some embodiments, the gas identity (e.g., a presence of at least one component in the sample) may be determined based, at least in part, on a ratio of the response of the catalytic sensor at the first temperature to the response at the second temperature. By way of nonlimiting example, the gas may be identified based, at least in part on the value of the Exo(new) at the first temperature to the value of Exo(new) at the second temperature.

Figure 7A:
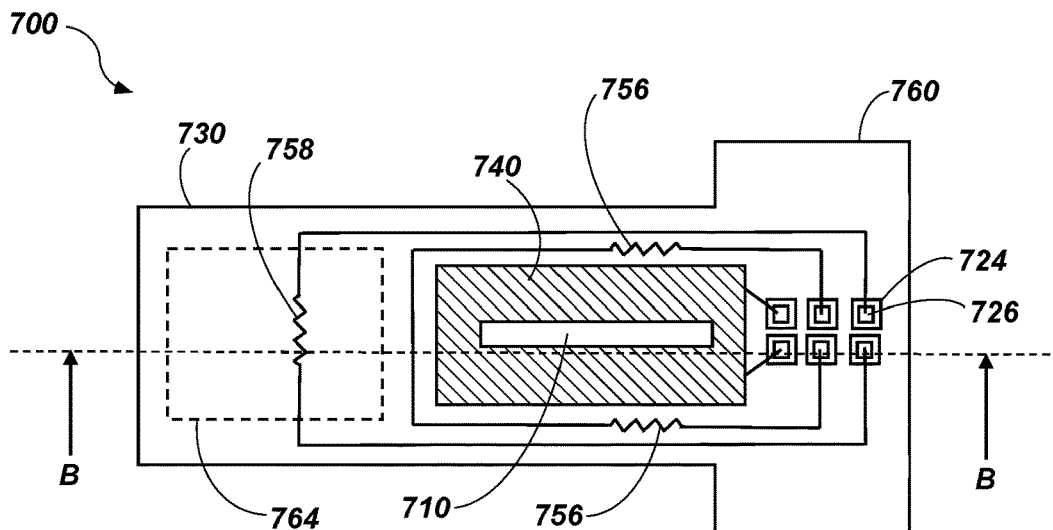
FIG. 7A is a top view of a microcantilever of a detector, in accordance with embodiments of the disclosure.
Figure 7B:
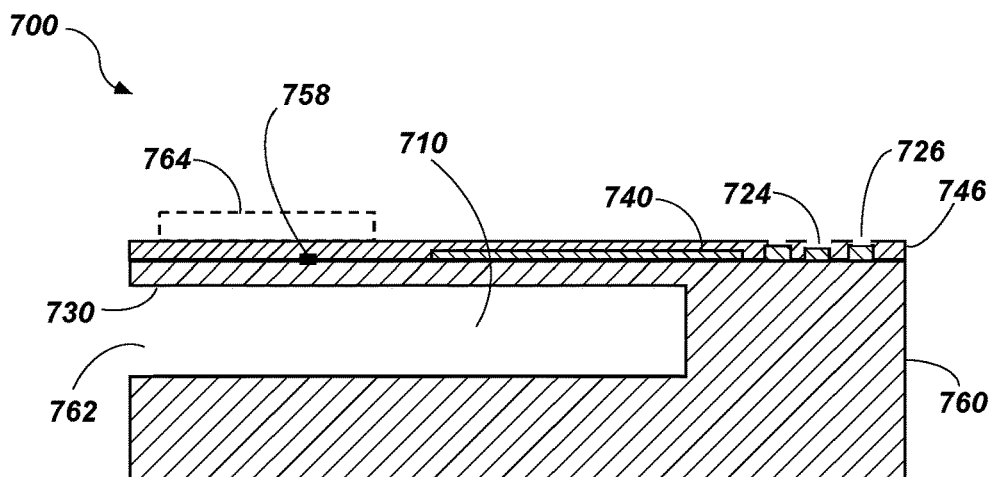
FIG. 7B illustrates a cutaway side view of FIG. 7A shown for clarity and taken along section line B-B of FIG. 7A.

With reference now to FIG. 1, FIG. 7A, and FIG. 7B, the detector 100 may further include the damping sensor (e.g., an inert microcantilever) 116 and a coated microcantilever sensor 115. As used herein, an "inert microcantilever" means and includes a microcantilever including either a substantially inert coating material (i.e., a coating material that does not substantially interact (e.g., react) with the sample) or a microcantilever without a coating material. Depending on the fabrication process, the damping sensor 116 and the coated microcantilever sensor 115 may be fabricated on the same silicon wafer as the thermal conductivity sensor 114 and the catalytic sensor 112, or on a separate substrate. Multiple microcantilevers of various sizes, shapes, and materials can be utilized for redundancy and response optimization for the environment in which they are designed to operate. To improve sensitivity to specific analytes, a coating material 364 may be applied to a free end 730 of the microcantilever.

FIG. 7A and FIG. 7B are a respective top down view and cross-sectional view of a microcantilever sensor 700. The microcantilever sensor 700 may correspond to the damping sensor 116 and the coated microcantilever sensor 115 described above with reference to FIG. 1. The microcantilever sensor 700 may be fabricated on a silicon substrate 760 (which may be the same as the silicon substrate 210 (FIG. 2A, FIG. 2B) on which the thermal conductivity sensor 114 and the catalytic sensor are formed) utilizing MEMS fabrication techniques. The microcantilever sensor 700 shown in FIG. 7A is a dual beam cantilever with a gap 710 in the substrate 760 near the base end to form the two beams that are connected at the free end 730. A base silicon material 762 (e.g., substrate) is also etched around and under the cantilever to suspend the free end 730 of the cantilever, allowing the free end 730 of the microcantilever 700 to move and vibrate responsive to interaction with a sample. Although FIG. 7A illustrates that the microcantilever 700 includes a gap 710, the disclosure is not so limited and in some embodiments, the microcantilever may not include a gap. Although FIG. 7A and FIG. 7B illustrate that the microcantilever 700 is a dual beam microcantilever, a single beam microcantilever or a different shaped microcantilever (not shown) can also be utilized. The microcantilever sensor 700 may be driven (e.g., vibrated) by applying a voltage through bond pads 724 connected to a piezoelectric element 740. The vibration or flexure may be sensed with the same piezoelectric element, or may be sensed with a piezoresistive element 756, which may be electrically coupled to another pair of bond pads 724. The piezoelectric element 740 may comprise a layer of silicon with a thin layer of aluminum nitride, zinc oxide or PZT disposed on one side of the silicon layer. Zinc oxide may be deposited on microcantilever sensor 700 using, for example, a sputtering process. PZT may be deposited on microcantilever sensor 700 using, for example, a sol-gel process. In another example, the piezoelectric element 740 comprises a layer of silicon nitride with a patterned piezoelectric film on one side of the silicon nitride layer. Two thin layers of a metal such as gold or platinum may be positioned on each side of the patterned piezoelectric element 740, providing electrical contact to the piezoelectric element 740.

In another example, the microcantilever sensor 700 includes the piezoresistive element 756 near the fixed end there thereof. The piezoresistive element 756 may be used to detect vibration in the microcantilever sensor 700 and can also be used to thermally excite vibration in the microcantilever sensor 700 instead of using a piezoelectric sense and drive (i.e., rather than using the piezoelectric element 740 as both a drive element and a sensing element). The piezoresistive element 756 may be formed on a layer of single-crystal silicon by depositing a polycrystalline silicon with a dielectric layer such as silicon dioxide positioned between the single-crystal silicon layer and the piezoresistive layer. In another example, a piezoresistor is formed in or near a surface of a single-crystal silicon cantilever. In another example, the piezoresistive element 756 comprises a thin film metal.

In some embodiments, the microcantilever sensor 700 includes a resistive heater 758 on or near the surface of the free end 730 of the microcantilever sensor 700. The resistive heater 758 may be formed using similar processes as described for the piezoresistive element 740. The resistive heater 758 may be used to heat the microcantilever sensor 700 for making measurements at an elevated temperature, to heat the microcantilever sensor 700 for cleaning, to sense the temperature of the microcantilever 700, and also be used to heat a coating material 764 to initiate an analyte reaction with between the coating material 764 and at least one analyte of interest in the sample. In some embodiments, the resistive heater 758 may be configured to clean the microcantilever sensor 700 and desorb analytes from the coating material 764. The resistive heater 758 can also be a piezoresistive element formed with doped silicon near the surface of the microcantilever 700 or a thin metal film deposited on the surface of the microcantilever 700. The resistive heater 758 can also be used to sense the temperature of the microcantilever 700.

Passivation layer 746 may be disposed over the resistive heater 758, the piezoresistive element 756, the piezoelectric element 740, and the interconnecting wiring to electrically isolate those elements from samples exposed to the microcantilever sensor 700. Voids in a passivation layer 726 over the bond pads 724 allow wire bonding to the bond pads 724. It is preferred that the surface of the microcantilever sensor 700 be chemically non-reactive with the gases under test when using the microcantilever to sense viscous damping.

In embodiments where the microcantilever sensor 700 comprises a coated microcantilever sensor 115 (FIG. 1), the coating material 764 may include a catalytic coating material formulated to interact with one or more analytes. In embodiments where the microcantilever sensor 700 comprises a damping sensor 116 (FIG. 1), the microcantilever sensor 700 may not include a coating material or may include a substantially inert coating material 764. In some such embodiments, the primary function of damping sensor 116 is to measure the damping (e.g., viscous damping) of the microcantilever sensor 700 in the sampled gas, which may be proportional to a density of the sampled gas, by detecting changes in the resonant characteristics of the damping sensor 116. In some embodiments, a size of the microcantilever sensor 700 may be minimized to reduce an amount of adsorption of the sample thereon.

A cantilever oscillating in a fluid such as air may be subject to dissipative forces that retard its motion and rob it of energy. These forces are known as damping, and affect the cantilever's resonant frequency, quality factor, series resistance, inductance, and other characteristic parameters of its resonance response (its oscillatory amplitude as a function of forcing frequency). For a cantilever resonating in air at standard conditions, the dominant damping mechanism is viscous damping (VD). The amount of damping (e.g., VD) varies to equal degrees with the density and the dynamic viscosity of the fluid through which the cantilever (e.g., beam) moves. As such, measuring the resonance response of a cantilever is a means of measuring the damping (e.g., VD) characteristic of a given sample, or of monitoring the presence of other gases and vapors in the sample, observed as changes in damping (e.g., viscous damping) compared to air alone. Moreover, the measurement and analysis of multiple resonance parameters can enable deconvolution of the two primary physical properties of the fluid that govern viscous damping (density and viscosity). In some embodiments, the damping sensor 116 may be configured to operate in a plurality of resonant modes, such as high frequency resonance modes beyond the fundamental mode. Higher-order flexural modes may have different sensitivities to damping effects, and may be useful in compensating for environmental effects (e.g., effects of one or more of temperature, pressure, relative humidity, and absolute humidity). Higher modes may also exhibit higher quality factors, for improved resolution of Q and resonant frequency.

Figure 7C:
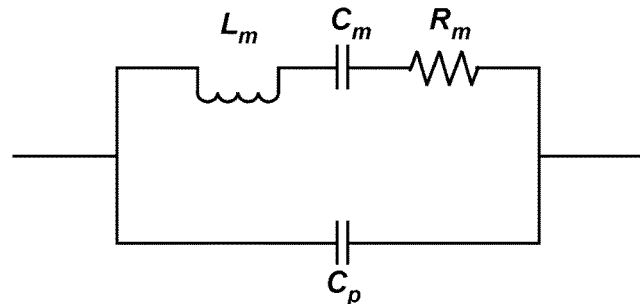
FIG. 7C is a schematic of an equivalent circuit model (ECM) of a microcantilever, in accordance with embodiments of the disclosure.

Referring to FIG. 7C, at least some of the resonant characteristics (resonant parameters) of the damping sensor 116 (FIG. 1) may be extracted from an equivalent circuit model (ECM) of the electrical response thereof. The equivalent circuit model may include a resonant frequency ($F_r$, also referred to as $\omega_r$), a series resistance ($R_m$), a series inductance ($L_m$), a series capacitance ($C_m$), and a parallel capacitance ($C_p$) shunting the series elements. As used herein, a "resonant property" of a microcantilever means and includes one or more elements of the equivalent circuit model (i.e., one or more of the series resistance, series inductance, series capacitance, and parallel capacitance), a resonant frequency (Fr, also referred to as $\omega_r$), a quality factor (Q), and a bandwidth (BW). The terms "resonant property," "resonant parameter," and "resonant characteristic" are used interchangeably herein.

In some embodiments, the damping sensor 116 (FIG. 1) is driven by a swept frequency voltage under control of the central processing unit 124 (FIG. 1). A numerically controlled oscillator or frequency synthesizer performs the digital-to-analog (D/A) 120 (FIG. 1) swept frequency drive to either the piezoelectric element 740 or the piezoresistive element 756. The CPU 124 reads back the sensed voltage amplitude and phase via the analog-to-digital (A/D) 120 converter to detect when the drive voltage frequency goes through the mechanical resonant frequency of the microcantilever 700. Accordingly, the damping sensor 116 may be driven by exciting the piezoelectric element 740 or the piezoresistive element 756 with a frequency synthesizer to perform a so-called frequency sweep of the damping sensor 116. During the frequency sweep, the voltage of the damping sensor 116 may be measured with a sense element (e.g., the piezoresistive element 756) thereof.

From the data obtained during the frequency sweep, a quality factor of the damping sensor 116 may be determined. For example, the quality factor may be related to the resonant frequency, inductance, and the series resistance (which may be proportional to the damping) of the oscillation, according to Equation (9) below:

$$Q = F_R/BW = R_m/L_m \quad (9),$$

wherein Q is the quality factor of the damping sensor 116, BW is the bandwidth of the curve of measured voltage versus frequency of the damping sensor 116 during the frequency sweep, $F_r$ is the resonant frequency of the damping sensor 116, $R_m$ is the series resistance of the damping sensor 116, and $L_m$ is the series capacitance of the damping sensor 116. In some embodiments, $Q_m$ and BW may be derived from the curve of the measured voltage versus frequency of the damping sensor 116 during the frequency sweep. Accordingly, $F_R$ and the ratio of $R_m/L_m$ may be determined from Q and BW. The resonant frequency $F_R$ may be determined according to Equation (10) below:

$$F_R = \frac{1}{2\pi(\sqrt{L_m C_m})}, \quad (10)$$

wherein $L_m$ and $C_m$ are as defined above.

The measured resonant frequency may be compensated for temperature, humidity (relative humidity, absolute humidity, or both), pressure, and flowrate of the sample with data measured using data from the environmental sensor 118 (FIG. 1). Increasing gas viscous damping decreases the resonant frequency of the damping sensor 116. The absolute resonant frequency of a microcantilever can drift with time, contamination and mechanical deterioration of the microcantilever (beam); however, the short-term stability of a microcantilever is excellent and can be compensated for pressure, temperature, humidity, and flowrate. To overcome drift and accuracy issues, the resonant frequency of the damping sensor 116 may be monitored periodically to store the historical baseline frequency data in the memory 128, a value representative of the frequency and viscous damping prior to detection of the exothermic trigger from the catalytic sensor. As used herein, a baseline resonant parameter means and includes a resonant parameter of a microcantilever (e.g., the damping sensor) when the microcantilever is exposed to a reference sample (e.g., air). In some embodiments, values of the resonant parameter may be stored in memory and may be based on data obtained during calibration of the microcantilever (e.g., in a factory). A shift in a resonant parameter of the microcantilever includes a change in the resonant parameter of the microcantilever responsive to exposure to a sample relative to the baseline resonant parameter (e.g., the value of the resonant parameter when the microcantilever is exposed to a reference sample).

In use and operation, responsive to a change in one or more of a response of the catalytic sensor 112 (FIG. 1) relative to a baseline catalytic response, a shift in a resonant parameter (e.g., a resonant frequency) of the damping sensor

116 (FIG. 1) (i.e., a difference in the resonant parameter of the damping sensor 116 when the damping sensor 116 is exposed to a sample and the resonant parameter of the damping sensor 116 when the damping sensor 116 is exposed to a baseline (e.g., a reference gas)), and a change in a thermal conductivity relative to a baseline thermal conductivity, changes in the resonant characteristics of the damping sensor 116 may be measured. A difference between the baseline resonant frequency and each subsequent resonant frequency measurement may correspond to changes in the damping (e.g., viscous damping) of the sample due to varying concentration of an analyte in the sample. In other words, the change in damping (e.g., viscous damping), which may be measured by changes in the resonant frequency of the damping sensor 116, may correspond to a presence of an analyte in the sample.

Figure 8A:
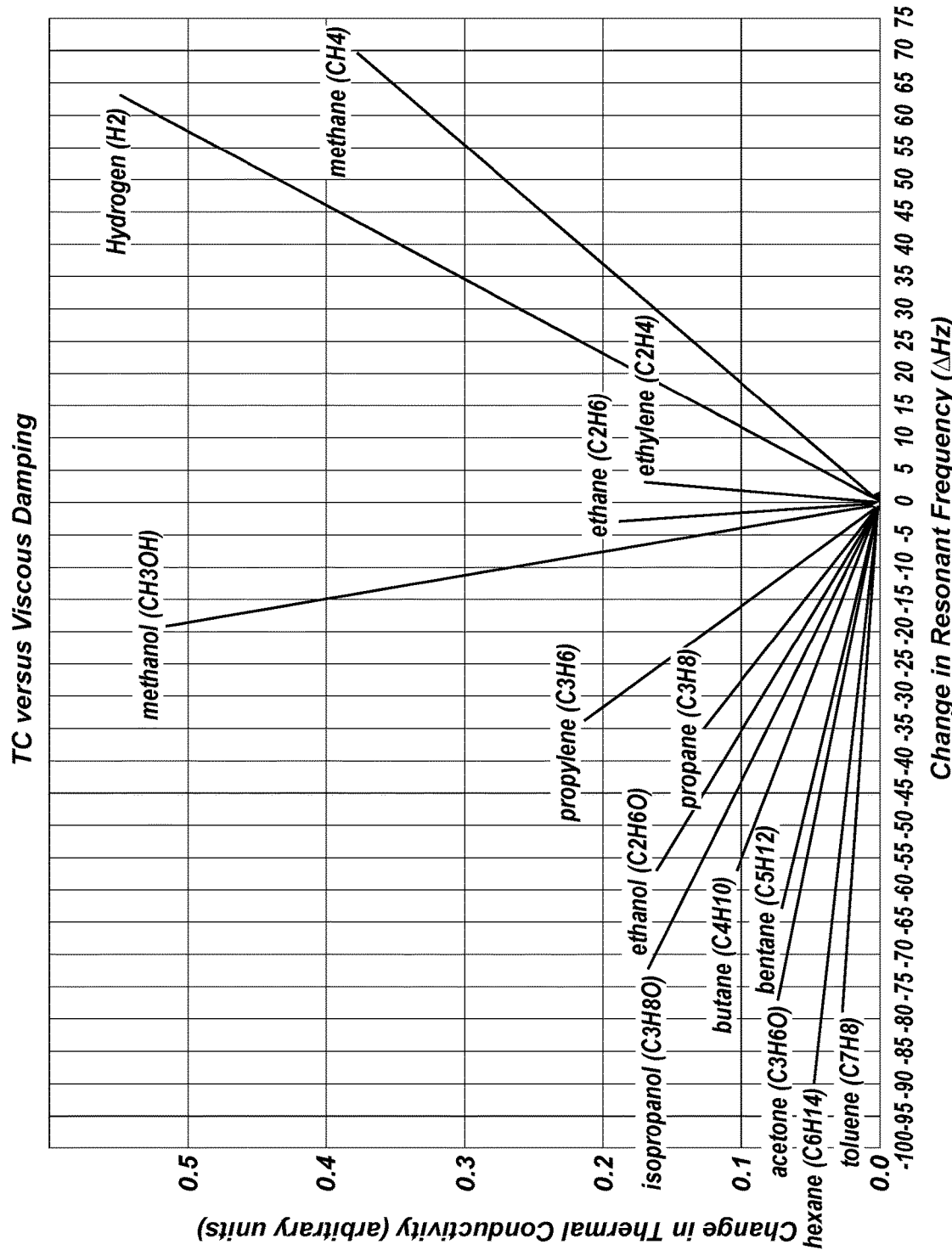
FIG. 8A illustrates a plot of thermal conductivity versus viscous damping for various gases.

Referring to FIG. 8A, the processed damping sensor 116 frequency data and the thermal conductivity sensor 114 power data may be used to form a two-dimensional vector of a change in TC relative to a baseline (e.g., air) (i.e., a ΔTC) versus a change in VD (a change in resonant frequency) relative to a baseline (e.g., air), whose magnitude is proportional to the concentration of one or more components of the sample and whose slope is an indicator of the composition of the sample. In other words, a presence of one or more components (e.g., gases) in the sample may be determined based on a ratio of a change in resonant frequency relative to the baseline (and hence, a change in viscous damping) of the damping sensor 116 to a change in the thermal conductivity of the sample. The change in resonant frequency may be relative to a baseline, such as a change relative to when the damping sensor 116 is exposed to air compared to when the damping sensor 116 is exposed to the sample. Similarly, the change in thermal conductivity may be relative to a baseline, such as a change relative to when the thermal conductivity sensor is exposed to air compared to when the thermal conductivity sensor is exposed to the sample. Accordingly, in some embodiments, one or more components in the sample may be identified using the thermal conductivity sensor 114 to determine changes in thermal conductivity and using the damping sensor 116 to determine changes in viscous damping (or at least one of resonant frequency, quality factor, series resistance, and bandwidth).

In addition, by subtracting the TC value measured at one point in the ramp (e.g., at 700° C.) from the value measured at another point (e.g., at 200° C.) the "slope" of a given gas' unique TC vs. temperature relationship (e.g., mW/C) can be determined; this slope can even serve as the "TC" value in data analysis techniques like the one shown in FIG. 8A. Further, because this slope tends to be relatively invariant across a wide temperature range, this technique can aid in compensating the TC measurement for environmental factors, especially temperature and pressure. Such environmental factors tend to shift (or translate) a gas' entire TC vs temperature curve upward or downward (i.e., affect the y-intercept of the traces on the plot), without substantially altering the slope of each curve.

Some gases, such as helium, hydrogen and methane, have very similar or overlapping viscous damping versus TC vectors (i.e., ratios of viscous damping to thermal conductivity). In some embodiments, helium and hydrogen can be differentiated by using the reaction onset temperature (light-off temperature) determined with the catalytic sensor 112 (FIG. 1), such as a temperature when the magnitude of the exothermic response is greater than a predetermined threshold value. In other words, in some such embodiments, helium and hydrogen may be differentiated by a temperature at which the magnitude of Exo(new) (Equation (8)) is greater than a predetermined threshold or is a non-zero value. The hydrogen reaction onset temperature is typically below 100° C. while the methane reaction onset temperature is typically above 400° C. The exact reaction onset temperatures may vary with the catalyst and transducer type used in the application. Helium is non-flammable, so it is differentiated by the fact that there is no exothermic response from the catalytic sensor 112. Utilizing light-off temperature, or lack thereof, in this example enables unambiguous differentiation of helium, hydrogen, and methane. Multiple reaction onset temperatures at multiple different temperatures indicate the presence of multiple flammable gases. The heat of combustion, or magnitude of the response of the catalytic sensor 112 at a reaction onset temperature, can also be used as a gas identifier-quantifier.

In some embodiments, the presence of one or more gases in the sample may be identified based on a ratio of one or more of a change in at least one resonant parameter (e.g., resonant frequency), a change in series resistance, a change in quality factor, a change in bandwidth, a change in inductance, and a change in parallel capacitance of the damping sensor 116 (FIG. 1) to another of the change in the at least one resonant parameter, the change in series resistance, the change in quality factor, the change in bandwidth, the change in inductance, and the change in parallel capacitance when the damping sensor 116 is exposed to the sample compared to when it is exposed to the baseline or reference gas. The change in the at least one resonant parameter may be relative to a baseline of the respective resonant parameter.

Figure 8B:
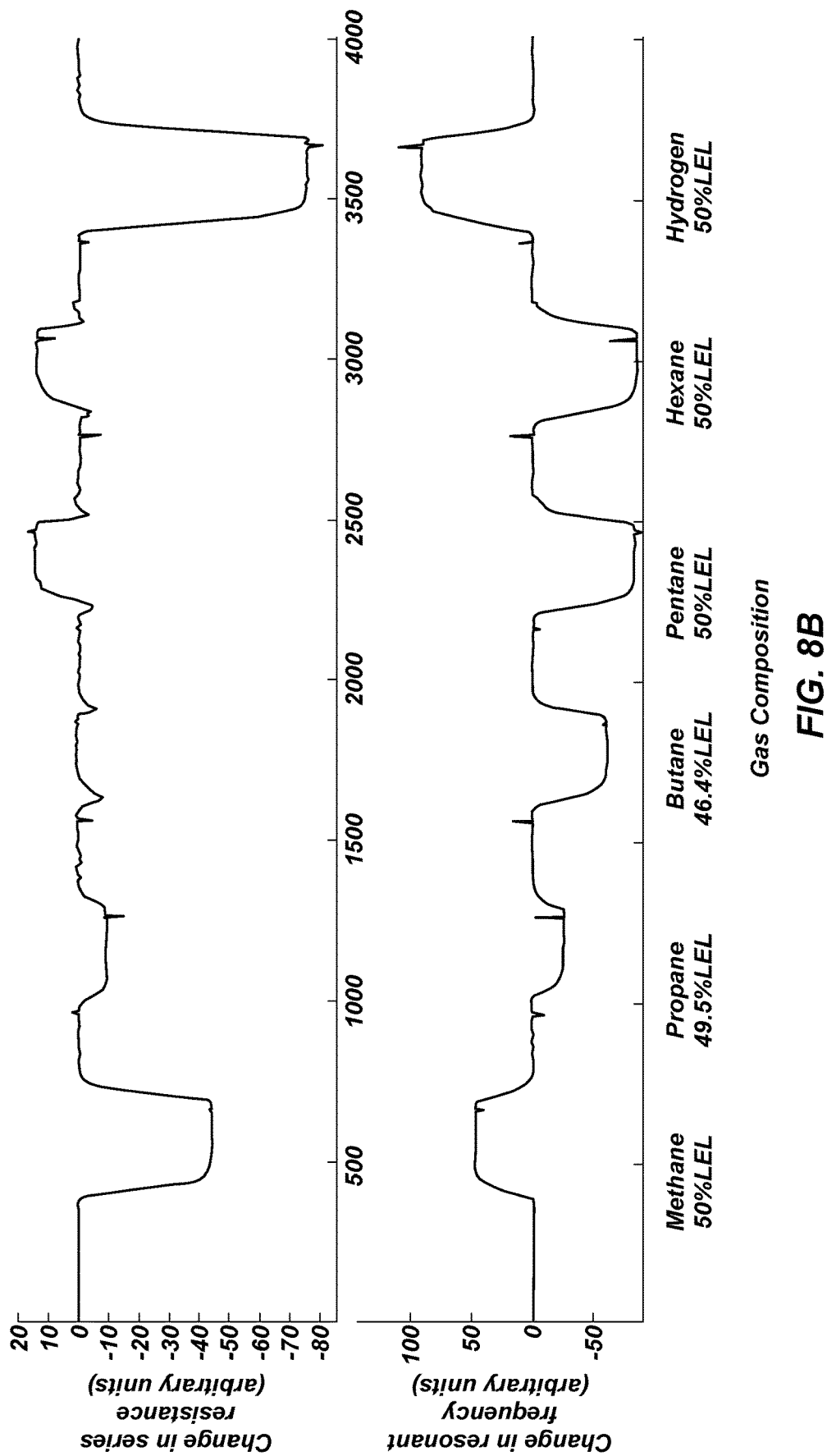
FIG. 8B is a graph illustrating a series resistance and a resonant frequency of a plurality of gases.
Figure 8C:
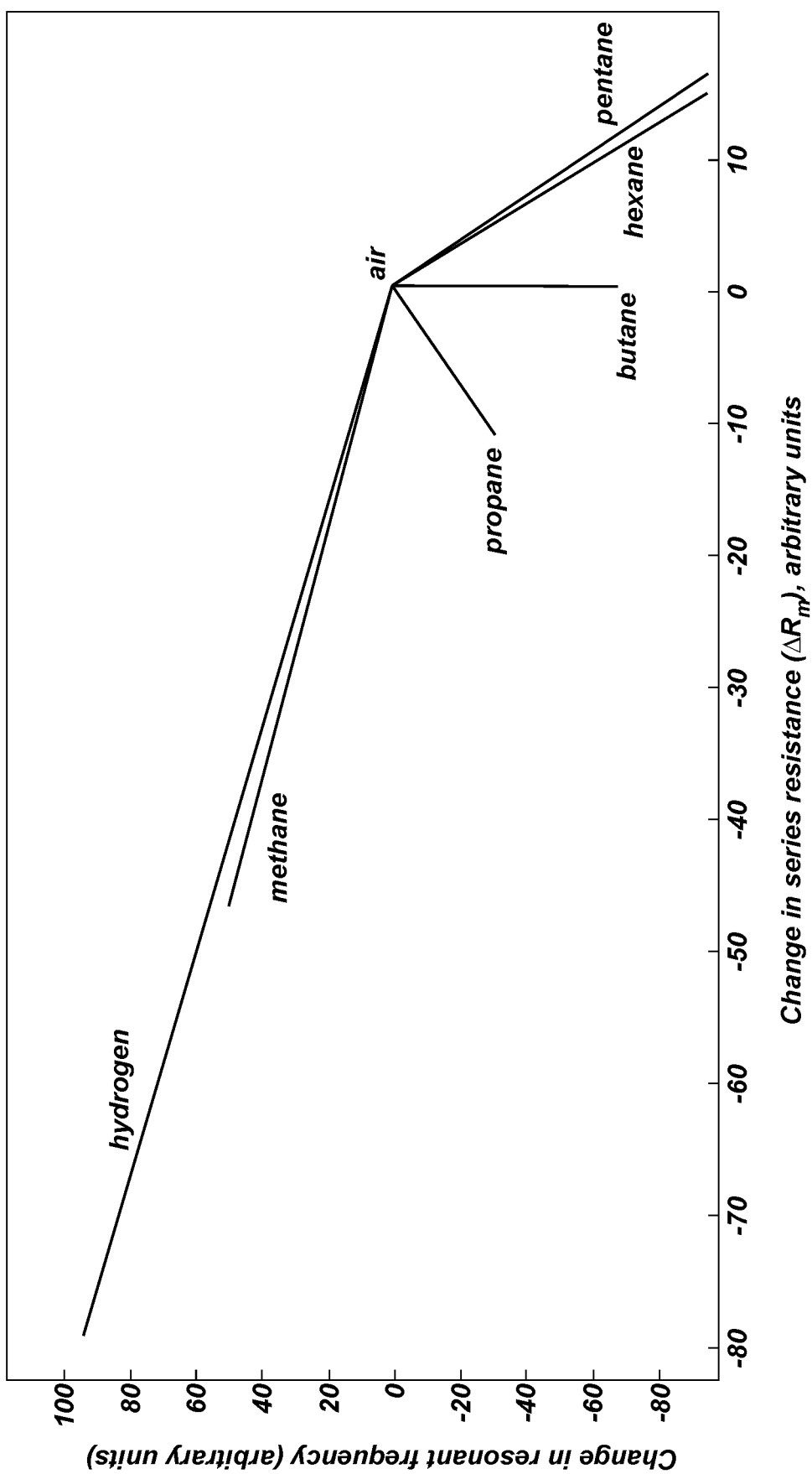
FIG. 8C is a graph illustrating a relationship between a change in resonant frequency to a change in series resistance of a microcantilever, in accordance with embodiments of the disclosure.

In some embodiments, a composition of the gas may be determined based on a ratio of the change in resonant frequency to a change in one of quality factor and series resistance. FIG. 8B is a graph showing a relationship between a change in resonant frequency to a change in series resistance ($R_m$) (which is proportional to quality factor) of the damping sensor 116. In some embodiments, different gases may exhibit a different relationship or ratio. FIG. 8C is a graph illustrating the relationship between the change in resonant frequency to the change in series resistance of a microcantilever when the microcantilever is exposed to different gases.

Although the damping sensor 116 (FIG. 1) has been described as comprising a microcantilever sensor 700 (FIG. 7A, FIG. 7B), the disclosure is not so limited. In other embodiments, the damping sensor 116 may include a resonant sensor such as a membrane sensor, a quartz crystal microbalance (QCM) sensor, a surface acoustic wave (SAW) sensor, or another resonant sensor. In addition, the at least one resonant parameter of the damping sensor 116 may be determined by methods such as the so-called "dashpot" method.

Although the microcantilever sensor 700 (FIG. 7A, FIG. 7B) has been described as being configured to determine a viscous damping or a resonant property of the sample, in some embodiments, the microcantilever sensor 700 may be configured to measure a thermal conductivity of the sample at one or more temperatures, a catalytic response at one or more temperatures, a catalytic activity of the sample at one or more temperatures, or a combination thereof. By way of nonlimiting example, the microcantilever sensor 700 may include a sense mechanism (e.g., sense circuitry) configured to determine a power to maintain the microcantilever sensor 700 at a first temperature and a second temperature such as according to Equations (1) through (3) above. Accordingly, in some such embodiments, the microcantilever sensor 700 may be used to determine a thermal conductivity of the sample at the first temperature and at least at a second temperature, and may further be configured to determine one or more resonant characteristics thereof. In some embodiments, the microcantilever sensor 700 may be vibrated to increase heat transfer from the microcantilever sensor 700 to a sample proximate the microcantilever sensor 700. Accordingly, in some embodiments, the thermal conductivity sensor 114 (FIG. 1) may comprise a microcantilever sensor 700. In some embodiments, the microcantilever sensor 700 may include a disk or paddle-shaped structure at an end thereof (e.g., at the free end 730). The disk or paddle-shaped structure may be configured to be heated and transfer heat to the sample proximate the free end 730 of the microcantilever sensor 700.

In some embodiments, one or more analytes may be identified by interacting with one or more coating materials formulated and configured to interact with one or more specific analytes. The coating materials may be associated with, for example, the coated microcantilevers 115 (FIG. 1), the metal oxide semiconductor microhotplate 115, or both. With reference again to FIG. 1, FIG. 7A, and FIG. 7B, in some embodiments, the detector 100 (FIG. 1) may further include one or more coated microcantilevers 115 (i.e., microcantilevers comprising a coating material). Coated microcantilevers can also be utilized with the addition of a coating 764 to the free end of the microcantilever. The one or more coated microcantilevers 115 may be substantially similar to the microcantilever sensor 700 described above with reference to FIG. 7A and FIG. 7B, wherein the coating material 764 comprises a selective coating material for adsorbing or otherwise interacting with specific analytes. The coating material 764 may include, for example, polymers, metallic, chemical, or biological coatings with specific analyte adsorptive properties. In some embodiments, coated microcantilevers 115 can achieve sensitivities below the thresholds detectable by a ΔTC versus ΔVD vector. Coated microcantilevers 115 may also be useful in detecting volatile organic compounds (VOCs). In addition to the specific examples discussed, the coated microcantilevers can provide additional sensitivity to specific analytes. An exemplary list of polymer microcantilever coatings include polydimethylsiloxane (PDMS; a non-polar polymer), poly(epichlorohydrin) (PECH; a dipolar, H-bond including polymer), poly (butyl methacrylate) (PBMA; a dipolar, basic polymer), OV275 (a polysiloxane polymer commercially available from Ohio Valley Specialty Company of Marietta, Ohio), poly(2-dimethylaminoethyl methacrylate (PDMAEMC; a strong basic polymer), BPS-3 (a bisphenol-containing polymer), PDZ (a polarizable phenyl), SCF101 (a hyperbranched fluoroalcohol polycarbosilane commercially available from Seacoast Science, Inc., of Carlsbad, Calif.) and fluoroalcoholpolysiloxane (SXFA; an acidic polymer), and the like. An exemplary list of metal microcantilever coatings include Mo, Au, Pd, and Pt, and the like. Other chemical and biological coatings can also be utilized.

Figure 9A:
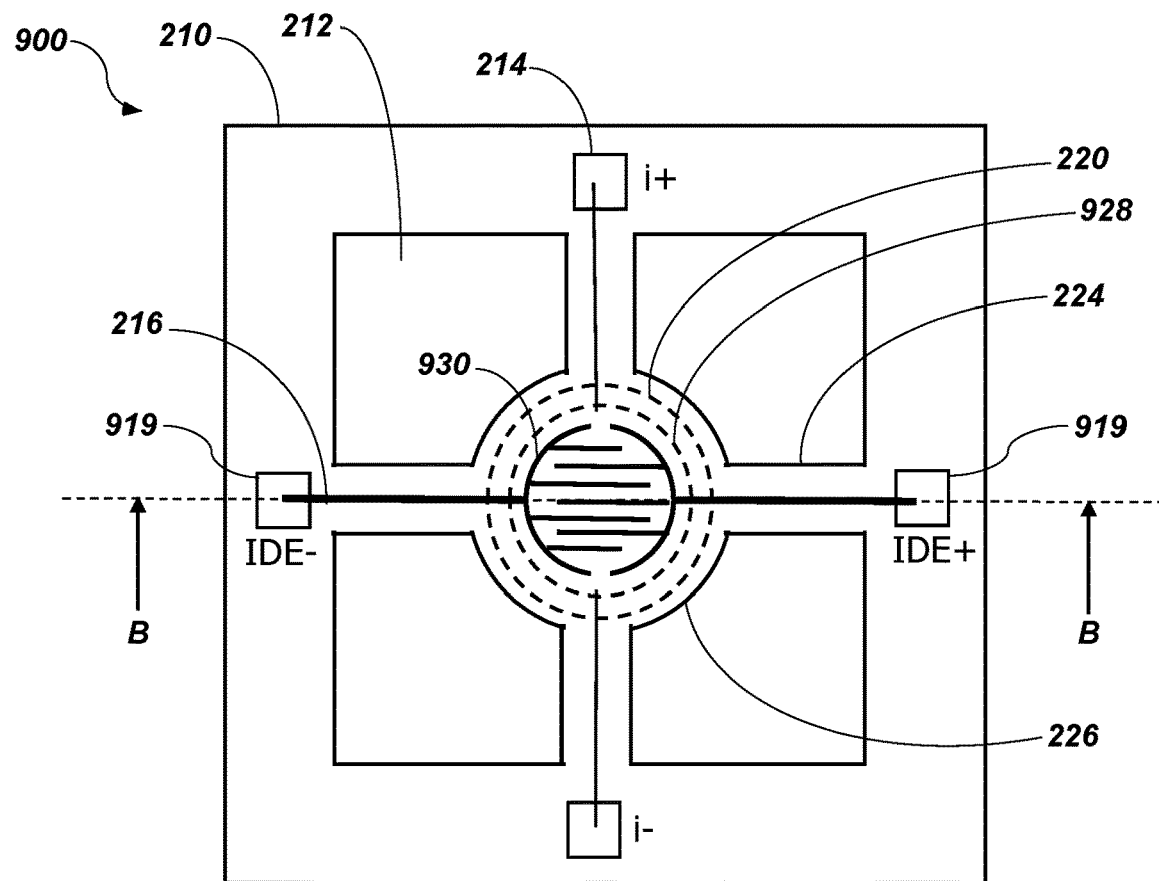
FIG. 9A is a top view of a microhotplate with interdigitated electrodes used for measuring electrical characteristics of a MOS sensor, in accordance with embodiments of the disclosure.
Figure 9B:
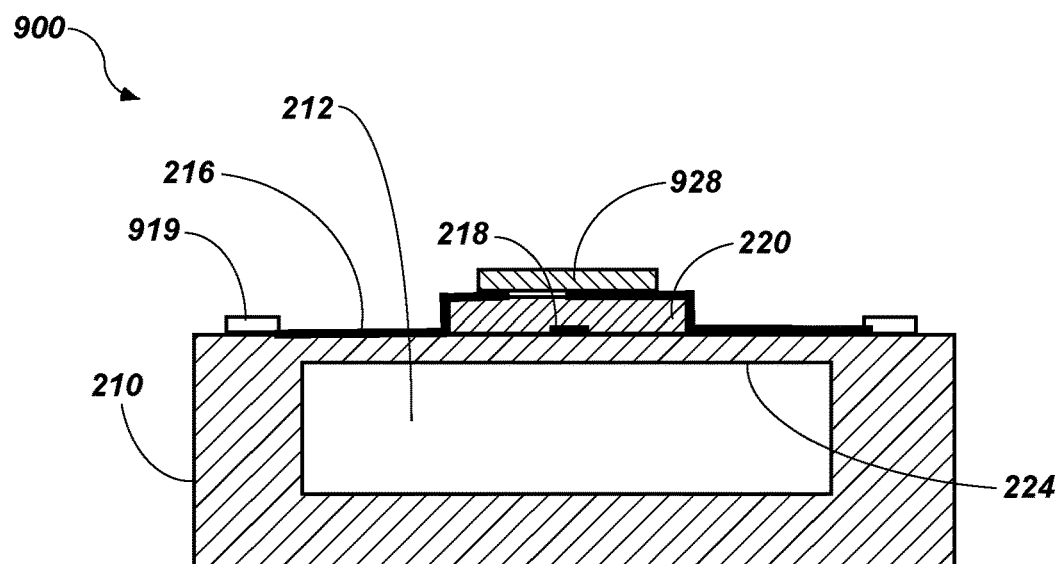
FIG. 9B illustrates a cutaway side view of FIG. 9A shown for clarity and taken along section line B-B of FIG. 9A.

FIG. 9A and FIG. 9B illustrate a microhotplate metal oxide semiconductor ("MOS") sensor 900 with interdigitated electrodes 930 above the heater 218 (not shown in FIG. 9A for clarity), which may be a resistive heater, and the passivation coating 220. The MOS sensor 900 may be substantially similar to the microhotplate sensor 200 described above with reference to FIG. 2A and FIG. 2B, except that the MOS sensor 900 may include a MOS coating 928 directly over electrodes 930 so that the electrical characteristics of the MOS coating can be measured through the bond pads 919 labeled IDE– and IDE+. The MOS coating 928 may comprise a metal oxide (e.g., tin oxide, zinc oxide, tungsten oxide (e.g., $WO_3$), a manganese oxide (e.g., MnO, $MnO_2$, $Mn_2O_3$), $LaCoO_3$, $LaNiO_3$, vanadium oxide (e.g., $V_2O_5$), phosphorous pentoxide (e.g., $P_2O_5$), molybdenum oxide ($MoO_2$), cesium oxide (e.g., $Cs_2O$), etc.), a doped metal oxide (e.g., platinum-doped tin oxide), a polymer material (e.g., an electrically conductive polymer material), an ionic conductor (e.g., an electrochemical coating (also referred to as an e-chem coating material), an n-type semiconductor material, a p-type semiconductor material, a thermoelectric material, another material, or combinations thereof. Precise temperature control is sometimes not required by MOS microhotplates, so the kelvin measurement points have been omitted. Temperature can be controlled and measured by computing resistance based on the current and voltage sourced to the heater on the I+ and I− terminals 214 shown on FIG. 9A.

The MOS sensor 900 may be configured to interact with one or more specific analytes of interest, such as, for example, carbon monoxide, oxygen, hydrogen disulfide, or another gas. A resistance as a function of temperature of the MOS sensor 900 may be measured. The MOS response chemical sensitivity varies with temperature and thus the temperature profile is useful as an additional chemical differentiator. In some embodiments, a presence of one or more analytes in the sample may be determined based on a resistance of the MOS sensor 900 at one or more temperatures.

Figure 10:
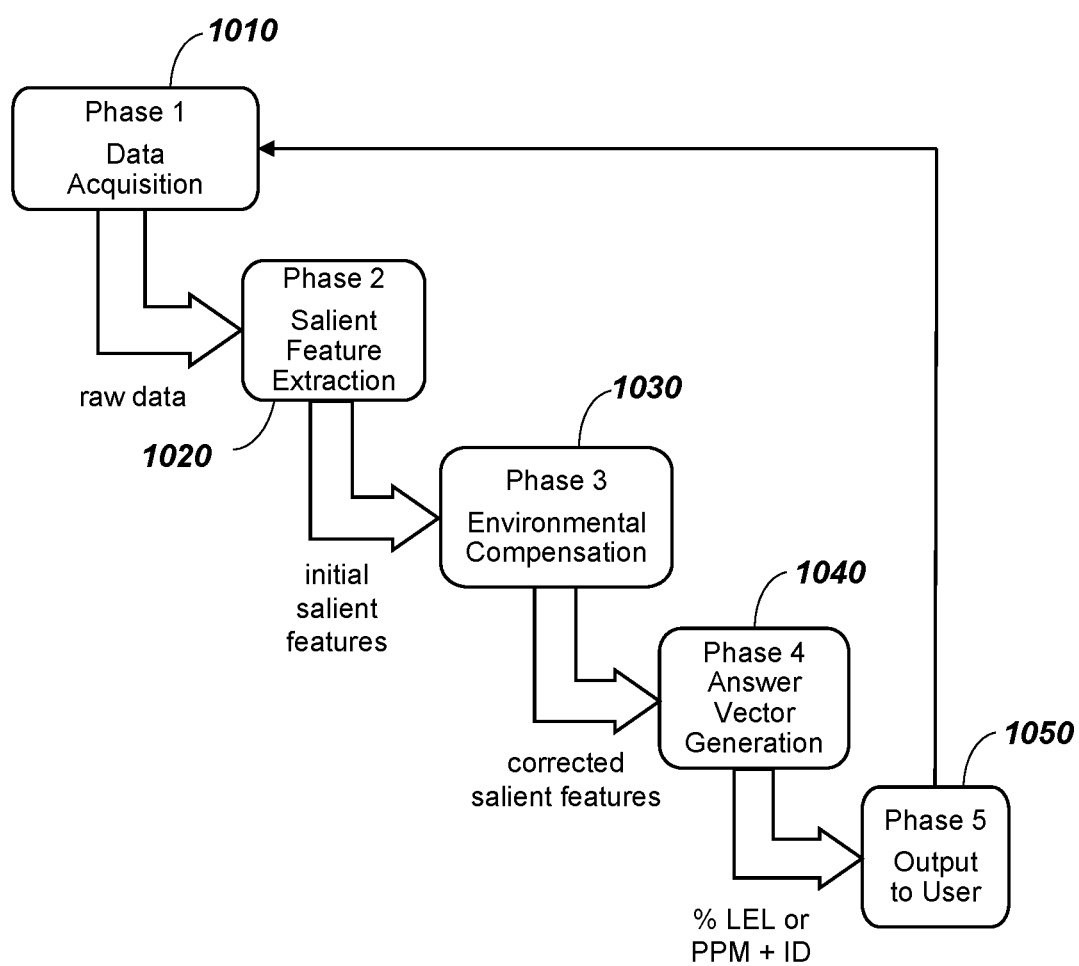
FIG. 10 illustrates a summary overview of a typical system process sequence, in accordance with embodiments of the disclosure.

FIG. 10 is an overview of data collection and analysis process. Raw data from the sensors (e.g., one or more of the thermal conductivity sensor 114 (FIG. 1), the catalytic sensor 112 (FIG. 1), the coated microcantilever sensor 115 (FIG. 1), the damping sensor 116 (FIG. 1), and the environmental sensors 118 (FIG. 1)) is collected in data acquisition act 1010. Salient features from the sensors are extracted from the raw data at act 1020. The salient features may include, by way of nonlimiting example, a power response of the thermal conductivity sensor 114 to exposure to the sample at one or more temperatures, a response of the catalytic sensor 112 to exposure to the sample at the one or more temperatures, a response of the damping sensor 116 to exposure to the sample, and a response of at least one of a coated microcantilever sensor 115 and a coated microhotplate sensor 115 to exposure to the sample. The salient features are compensated for environmental effects of temperature, pressure humidity, and/or flowrate at act 1030. After compensation, the data is further processed and compared to stored data to generate the answer vector at act 1040. The gas concentration (parts per million (ppm) or lower explosive limit (LEL) for flammables) and the gas identification is reported at act 1050, and then the process can be repeated. In some embodiments, compensation for environmental effects at act 1030 may be performed after act 1010, after act 1040, or anywhere in the process.

Although the detector 100 (FIG. 1) has been described as determining one or more properties of a gas using specific combinations of variables, such as the thermal conductivity at a first temperature (e.g., a change in the thermal conductivity relative to a baseline while the thermal conductivity sensor is at the first temperature), the thermal conductivity at a second temperature (e.g., a change in the thermal conductivity relative to a baseline while the thermal conductivity sensor is at the second temperature), the response of the catalytic sensor at the first temperature, the catalytic activity of the catalytic sensor at the first temperature (e.g., a change in a response of the catalytic sensor when the catalytic sensor is at the first temperature and exposed to the sample relative to a response of the catalytic sensor when the catalytic sensor is at the first temperature and exposed to the reference), the response of the catalytic sensor at the second temperature, the catalytic activity of the catalytic sensor at the second temperature (e.g., a change in a response of the catalytic sensor when the catalytic sensor is at the second temperature and exposed relative to a response of the catalytic sensor when the catalytic sensor is at the second temperature and exposed to the reference), the ratio of the catalytic activity at the first temperature to the catalytic activity at the second temperature, the exothermic response of the catalytic sensor at the first temperature, the exothermic response of the catalytic sensor at the second temperature, the ratio of the exothermic response at the first temperature to the exothermic response at the second temperature, a change in at least one resonant parameter of the damping sensor 116, etc., the disclosure is not so limited. In some embodiments, three or more variables may be measured and correlated to one or more properties of a gas (e.g., identification, concentration, etc.).

Figure 11:
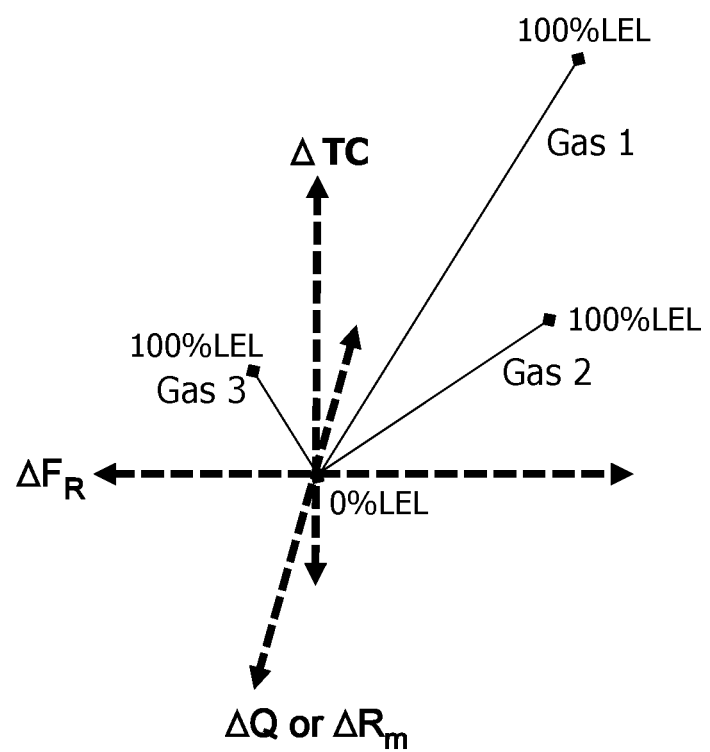
FIG. 11 is a graph illustrating a relationship between a change in quality factor of a microcantilever, a change in resonant frequency of the microcantilever, and a change in thermal conductivity of a sample, which may be used to determine one or more properties of a sample, in accordance with embodiments of the disclosure.

FIG. 11 is a three-dimensional plot showing $\Delta TC$ vs. $\Delta F_R$ vs. $\Delta Q$ or $\Delta R_m$ (since $\Delta Q$ is proportional to $\Delta R_m$). As described above, $\Delta TC$ may be determined based on the response of the thermal conductivity sensor 114 (FIG. 1) to exposure to the sample relative to the baseline thermal conductivity response, and $\Delta F_R$ and $\Delta Q$ (or $\Delta R_m$) may be determined based on the response of the damping sensor 116 (FIG. 1) to exposure to the sample. Referring to FIG. 11, a gas may exhibit a location on the graph with a unique direction (e.g., slope) and magnitude (i.e., a relationship between each of $\Delta TC$, $\Delta F_R$, and $\Delta Q$ (or $\Delta R_m$) and the other of the $\Delta TC$, $\Delta F_R$, and $\Delta Q$ (or $\Delta R_m$). For example, Gas 1, Gas 2, and Gas 3 may each include unique coordinates (i.e., directions) on the graph. Accordingly, gases may exhibit unique combinations and ratios of three parameters, which may be used to identify the composition of the gas. In some embodiments, the values of at least three parameters may be used to determine a composition of a sample and a concentration of gases in the sample. Although FIG. 11 has been described as including a change in quality factor or a change in series resistance, a change in thermal conductivity, and a change in resonant frequency, in other embodiments, the three parameters may include combinations of a change in quality factor, a change in resonant frequency, a change in thermal conductivity, a thermal conductivity at one or more temperatures, a catalytic sensor response at one or more temperatures, a ratio of a thermal conductivity at a first temperature to the thermal conductivity at a second temperature, a ratio of a catalytic response at the first temperature to the catalytic response at the second temperature, a ratio of a catalytic response at a given temperature to the thermal conductivity response at the given temperature, a ratio of a catalytic response at a temperature to the resonant frequency, a ratio of a catalytic response at a temperature to $R_m$, a ratio of a resonant frequency to thermal conductivity, a ratio of a catalytic activity at the first temperature to the catalytic activity at the second temperature, a ratio of a catalytic activity at a given temperature to the thermal conductivity response at the given temperature, a ratio of a catalytic activity at a temperature to the resonant frequency, a ratio of a catalytic activity at a temperature to $R_m$, a ratio of a resonant frequency to thermal conductivity, a ratio of a reactivity at the first temperature to the reactivity at the second temperature, a ratio of the reactivity at a given temperature to the thermal conductivity response at the given temperature, a ratio of a reactivity at a temperature to the resonant frequency, a ratio of a reactivity at a temperature to $R_m$, and a ratio of $R_m$ to thermal conductivity.

Figure 12A:
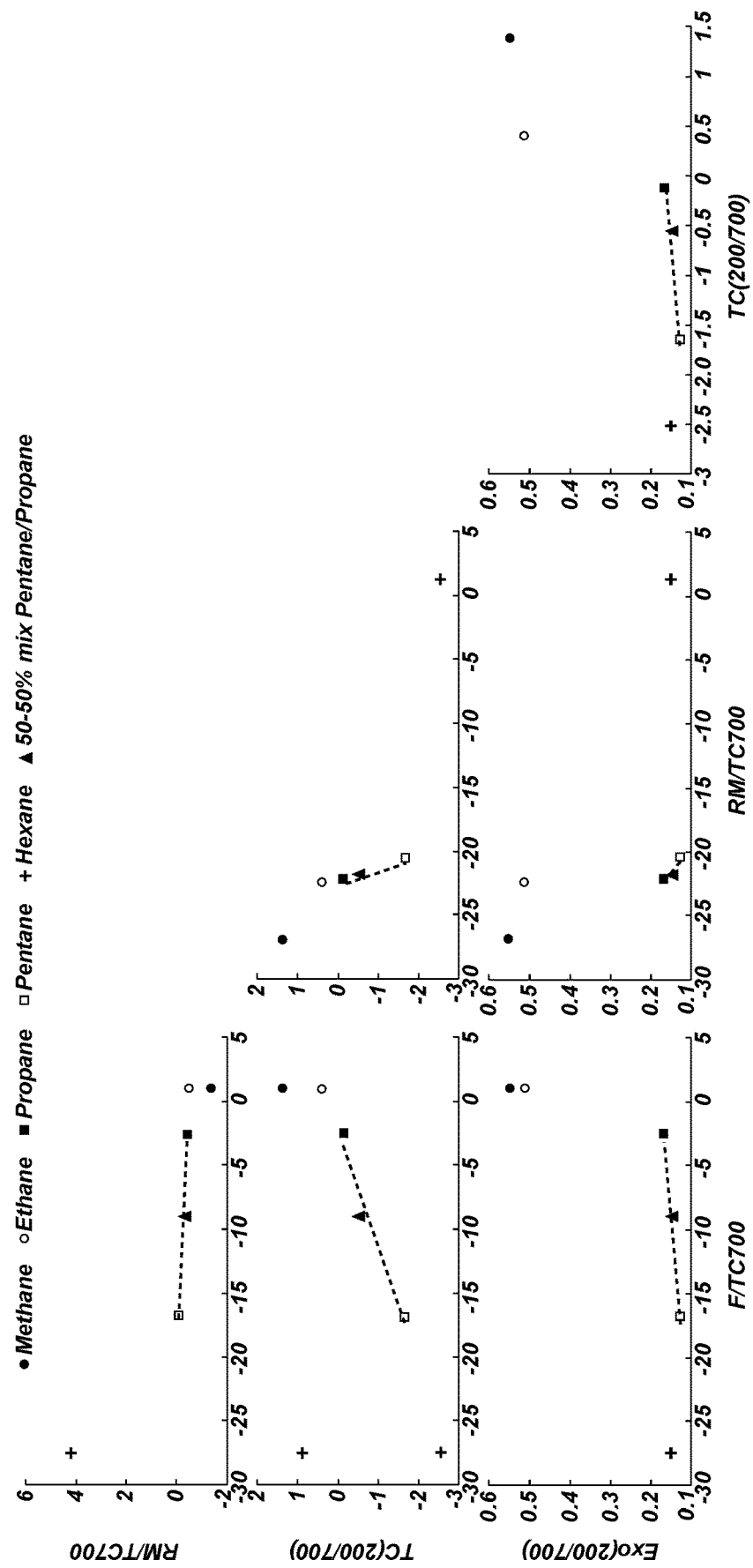
FIG. 12A is a graph illustrating a relationship between several parameters that may be obtained with individual sensors of a detector, in accordance with embodiments of the disclosure.

Although FIG. 11 has been described as identifying one or more gases in a sample with three parameters, the disclosure is not so limited. In other embodiments, a composition of a gas may be determined with more parameters. FIG. 12A is an illustration of how four parameters can be visualized as six two-dimensional projections in a multi-dimensional analysis. In other words, FIG. 12A illustrates how four individual parameters yields six distinct pairs of parameters. The four parameters illustrated in FIG. 12A are the ratios of: $F_R/TC_{T2}$, $R_m/TC_{T2}$, $TC_{T1}/TC_{T2}$, and $Exo_{T1}/Exo_{T2}$, wherein $TC_{T1}$ is the change in thermal conductivity at a first temperature, $TC_{T2}$ is the change in thermal conductivity of the sample at a second temperature, $Exo_{T1}$ is the reactivity at the first temperature (determined by Equation (8) at the first temperature), also referred to as the exothermic response at the first temperature, and $Exo_{T2}$ is the reactivity at the second temperature (determined by Equation (8) at the second temperature), also referred to as the exothermic response at the second temperature. The relationship between each parameter and the sample composition in FIG. 12A is approximately linear, and mixtures of gases appear as linear combinations. In other words, and by way of nonlimiting example, a mixture of 50% by volume pentane and 50% by volume propane is located at approximately a midpoint between a sample of 100% by volume pentane and a sample of 100% by volume propane. Orthogonality in the projections of FIG. 12A can predict multiple analyte identifications and concentrations. By way of nonlimiting example, methane and ethane may exhibit similar ratios of resonant frequency to each of series resistance, thermal conductivity, and reactivity. However, methane and ethane may be distinguished from each other based on at least one of a ratio of resonant frequency to a change in the thermal conductivity at a temperature, a ratio of change in the thermal conductivity at the first temperature to the change in the thermal conductivity at a second temperature, and the ratio of reactivity at the first temperature and to the reactivity at the second temperature.

Accordingly, various combinations of variables and ratios of variables may be used to determine a composition of a gas. The ratios may include a ratio of resonant frequency to a change in thermal conductivity at a temperature, a ratio of $R_m$ to a change in the thermal conductivity at a temperature, a ratio of a change in the thermal conductivity at a first temperature to the change in thermal conductivity at a second temperature, a ratio of the catalytic activity at the first temperature to the catalytic activity at the second temperature, a ratio of the reactivity at a first temperature to a reactivity at a second temperature, a ratio of the ratio of the change in thermal conductivity at the first temperature to the change in thermal conductivity at a second temperature to the ratio of the reactivity at the first temperature to the reactivity at the second temperature (e.g., (($\Delta TCT1/\Delta TCT1$)/($Exo_{T1}/Exo_{T2}$)), a ratio of a catalytic activity at a given temperature to the thermal conductivity response at the given temperature, a ratio of a catalytic activity at a temperature to the resonant frequency, a ratio of a catalytic activity at a temperature to $R_m$, a ratio of a reactivity at a temperature to the resonant frequency, and a ratio of a reactivity at a temperature to $R_m$.

Accordingly, a gas may be analyzed and determined based on one or more properties measured by one or more of the thermal conductivity sensor 114, the catalytic sensor 112, and the damping sensor 116. The one or more properties may include a change in thermal conductivity at a first temperature, a change in thermal conductivity at a second temperature, a response of the catalytic sensor 112 at the first temperature, a response of the catalytic sensor 112 at the second temperature, a catalytic activity at the first temperature, a catalytic activity at the second temperature, a reactivity (an exothermic response) at the first temperature, a reactivity (an exothermic response) at the second temperature, a quality factor (e.g., a quality factor shift) of the damping sensor 116 responsive to exposure to the sample, a resonant frequency (e.g., a resonant frequency shift) of the damping sensor 116 (such as at room temperature) responsive to exposure to the sample, a series resistance (damping) of the damping sensor 116, a resonant frequency of the damping sensor 116 at an elevated temperature, a quality factor of the damping sensor 116 at an elevated temperature, a higher-mode resonant frequency of the damping sensor 116, an equivalent circuit parameter shift of the damping sensor 116 responsive to exposure to the sample, a metal oxide semiconductor resistance shift at the first temperature responsive to exposure to the sample, a metal oxide semiconductor resistance shift at the second temperature responsive to exposure to the sample or another property, a ratio of one of the properties to at least another of the properties, and combinations thereof.

Figure 12B:
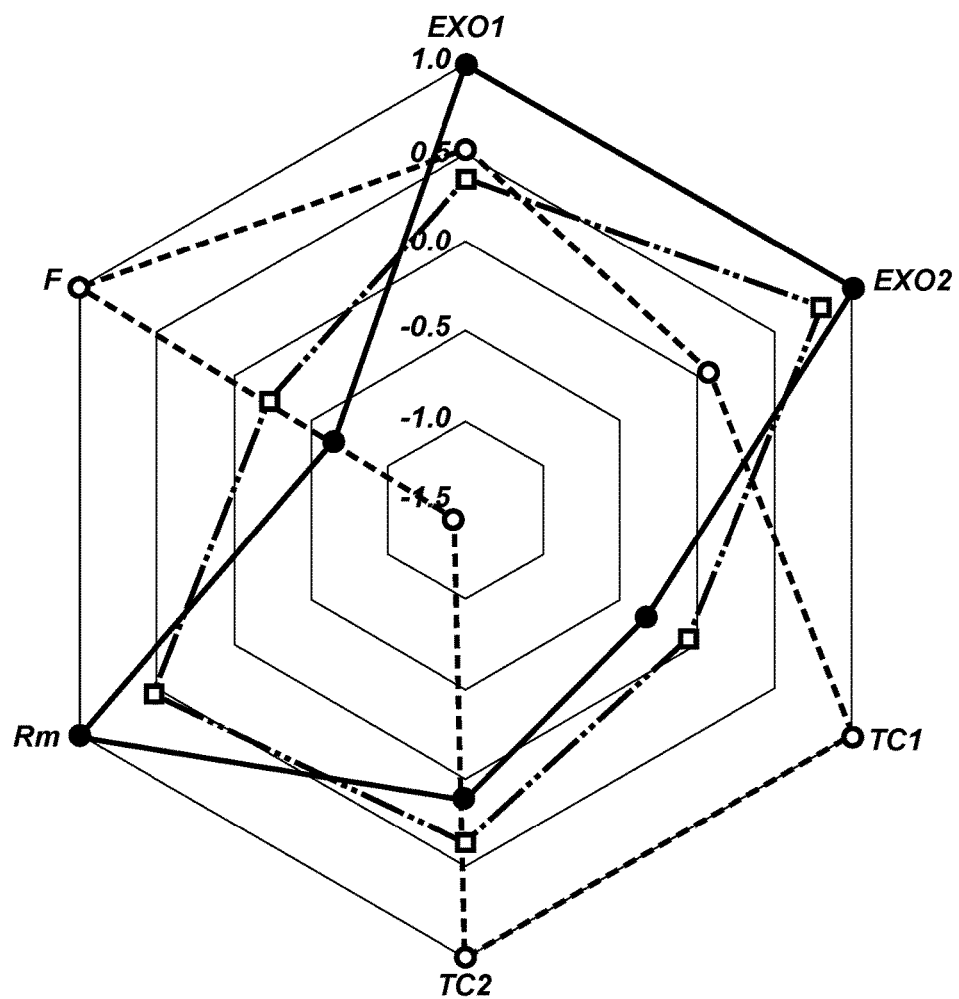
FIG. 12B is a radar plot of sensor responses used to create a fingerprint of the responses, in accordance with embodiments of the disclosure.

FIG. 12B illustrates another method of determining at least one property (e.g., an identity of at least one component) of a sample with a so-called "radar chart" or "radar plot" using the same data illustrated in FIG. 12A (i.e., using ratios of: $F_R/TC_{T2}$, $R_m/TC_{T2}$, $TC_{T1}/TC_{T2}$, and $Exo_{T1}/Exo_{T2}$). Different gases may exhibit different shapes or "fingerprints" in the plot illustrated in FIG. 12B since one or more properties of the gases may be different. Accordingly, an identity of one or more gases or analytes in a sample may be determined by plotting values of each of the parameters on the plot and recognizing the pattern or fingerprint, such as with the central processing unit 124 (FIG. 1) or the processing subsystem 140 (FIG. 1). In some embodiments, a concentration of one or more gases may be determined based on at least one of a shape and size of the fingerprint (e.g., an area within the fingerprint). In some embodiments, orthogonality in the projections of FIG. 12B and FIG. 12C can predict multiple analyte identifications and concentrations. By way of nonlimiting example, methane and ethane may exhibit one or more similar properties. However, methane and ethane may be distinguished from each other based on a difference between one or more properties, such as one or more of $Exo_{T1}$, $Exo_{T2}$, $TC_{T1}$, $TC_{T2}$, $R_m$, and $F_R$, or ratios thereof. Accordingly, one or more properties of the sample may be determined based on a multi-dimensional analysis of the sample based on one or more (e.g., two more more) sensor parameters selected from the group consisting of a change in thermal conductivity at a first temperature, a change in thermal conductivity at a second temperature, a change in a response of a catalytic sensor at the first temperature relative to a baseline (e.g., a catalytic activity at the first temperature), a change in a response of the catalytic sensor at the second temperature relative to a baseline (e.g., a catalytic activity at the second temperature), a reactivity at the first temperature, a reactivity at the second temperature, a quality factor (e.g., a quality factor shift) of the damping sensor 116 (FIG. 1) responsive to exposure to the sample, a resonant frequency (e.g., a resonant frequency shift) of the damping sensor 116 (such as at room temperature) responsive to exposure to the sample, a series resistance (damping) of the damping sensor 116, a resonant frequency of the damping sensor 116 at an elevated temperature, a quality factor of the damping sensor 116 at an elevated temperature, a higher-mode resonant frequency of the damping sensor 116, an equivalent circuit parameter shift of the damping sensor 116 to exposure to the sample, a metal oxide semiconductor resistance shift at the first temperature responsive to exposure to the sample, a metal oxide semiconductor resistance shift at the second temperature responsive to exposure to the sample or another property. In some embodiments, the one or more properties of the sample may be determined based on a relationship between each of the sensor parameters of the set of sensor parameters with each of the other sensor parameters of the set of sensor parameters.

Figure 12C:
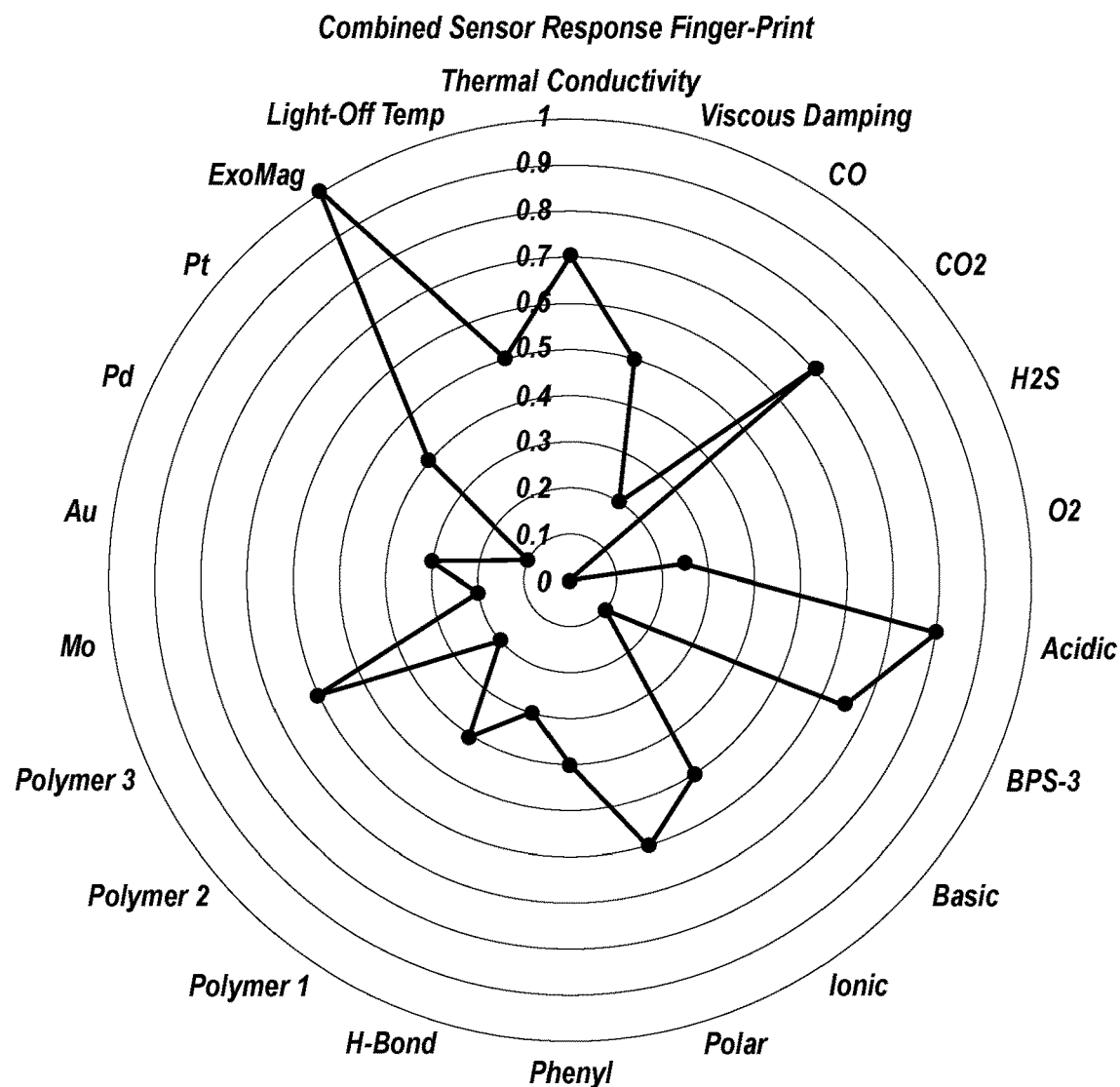
FIG. 12C is a radar plot of sensor responses used to create a "fingerprint" of the responses, in accordance with other embodiments of the disclosure.
Figure 12D:
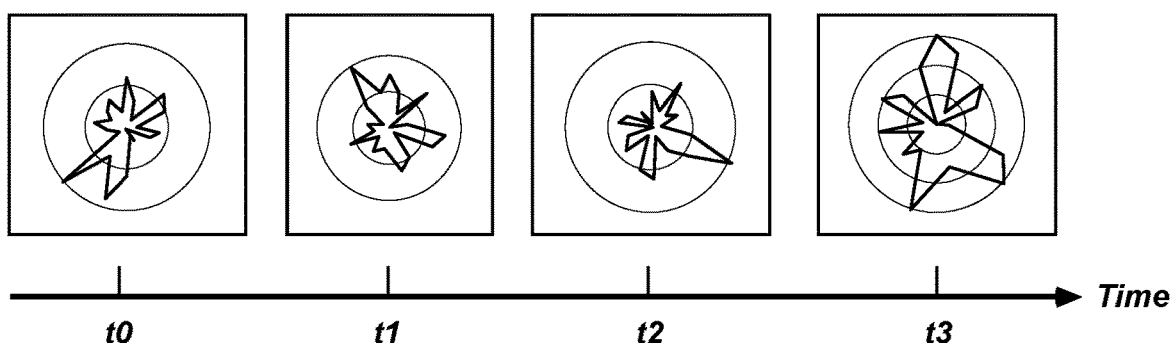
FIG. 12D illustrates how the radar plots can be analyzed in a time sequence when gases are separated (such as by a gas chromatograph) ahead of the gas sensors.

Although FIG. 12B illustrates the radar plot as including six variables, the disclosure is not so limited. In other embodiments, the radar plot may include fewer or more variables. By way of nonlimiting example, the radar plot may include three variables, four variables, or five variables. In other embodiments, the radar plot may include more than six variables, such as seven, eight, nine, ten, etc., variables. FIG. 12C and FIG. 12D illustrate another method of determining at least one property of a sample. Referring to FIG. 12C, a composition of a sample may be determined based on a combination of responses from a combination of sensors. By way of nonlimiting example, the detector 100 (FIG. 1) may include a catalytic sensor comprising a molybdenum catalyst, a catalytic sensor comprising a gold catalyst, a catalytic sensor comprising a palladium catalyst, a catalytic sensor comprising a platinum catalyst, a thermal conductivity sensor, a damping sensor, a coated microcantilever sensor comprising a first polymer, a coated microcantilever sensor comprising a second polymer, a coated microcantilever sensor comprising a third polymer, a coated microcantilever sensor comprising a BPS-3 polymer, a coated microcantilever sensor comprising a coating configured to interact with an acid, a coated microcantilever sensor comprising a coating configured to interact with hydrogen bonds, a coated microcantilever comprising a coating configured to interact with a phenyl group, a coated microcantilever comprising a coating configured to interact with a basic gas, a MOS sensor comprising a coating configured to interact with carbon monoxide, a MOS sensor comprising a coating formulated to interact with carbon dioxide, a MOS sensor comprising a coating formulated to interact with hydrogen sulfide. A magnitude of a response (or a change in a response relative to a baseline response) from each of the sensors responsive to exposure to the sample may be measured. The responses may be graphed to determine a composition of the sample. By way of nonlimiting example, each gas or analyte of interest may exhibit a different so-called "fingerprint." In some embodiments, a concentration of different analytes in the sample may be determined based on a size of the fingerprint. The composition of the sample may be determined by comparing the responses from each sensor to values stored in a look-up table, by pattern recognition techniques, or a combination thereof.

FIG. 12D is a time sequence showing how the radar plots (fingerprints) may change responsive to samples exiting a concentrator or separator, each sample with different compositions in the time sequence. A concentrator may contain a sorbent material that accumulates one or more analytes over time. When the sorbent material is heated, the analytes may be desorbed. Different analytes desorb at different temperatures, and therefore, at different times when the temperature is ramped over time. In some embodiments, the detector 100 (FIG. 1) may include a separator 110 (FIG. 1) positioned such that the sample is exposed to the separator 110 prior to the sensors. By way of nonlimiting example, the separator 110 may be located proximate the sensors (e.g., at a location such that the sample passes through the separator prior to being exposed to the thermal conductivity sensor, the catalytic sensor, and the damping sensor). The separator 110 may include a gas chromatograph (GC) or column that has different transit times for various gas analytes, hence yielding different analytes exiting the column at different times. The separator 110 may be configured to separate different components of the sample such that the sensors (e.g., the thermal conductivity sensor, the catalytic sensor, and the damping sensor) are exposed to different components of the sample at different times. Accordingly, different components (e.g., gases) of the sample may elute through the separator at different times, facilitating identification of more than one analyte in the sample. In some such embodiments, the processing subsystem may be configured to generate a different fingerprint for each component in the sample based on the time at which the particular component elutes through the separator.

Figure 13:
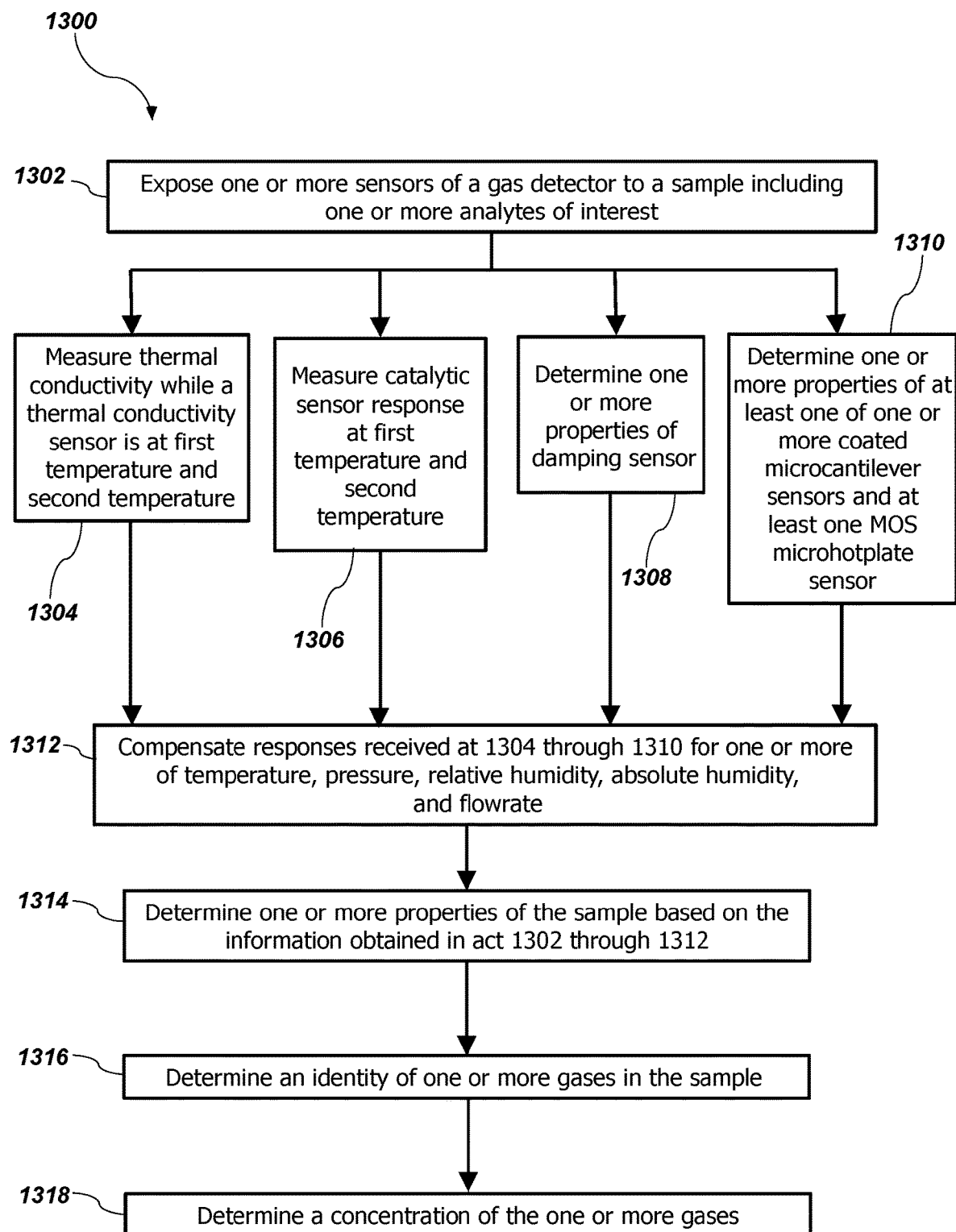
FIG. 13 is a simplified flow diagram illustrating a method of determining one or more properties of a sample, in accordance with embodiments of the disclosure.

FIG. 13 is a simplified flow diagram illustrating a method 1300 of determining one or more properties of a gas sample. The method 1300 includes act 1302 including exposing one or more sensors of a detector to a sample including one or more analytes of interest; act 1304 including measuring a thermal conductivity of the sample while a thermal conductivity sensor is at a first temperature and while the thermal conductivity sensor is at a second temperature; act 1306 including measuring a response of a catalytic sensor at the first temperature and at the second temperature; act 1308 including determining one or more properties of a damping sensor responsive to exposure to the sample; act 1310 including determining one or more properties of at least one of a coated microcantilever sensor and a MOS sensor; act 1312 including compensating responses received in acts 1304 through 1310 for one or more of temperature, pressure, relative humidity, absolute humidity, and flowrate; act 1314 including determining one or more properties of the sample based on the information obtained in acts 1302 through 1312; act 1316 including determining a presence (e.g., an identity) of one or more gases in the sample; and act 1318 including determining a concentration of the one or more gases in the sample.

Act 1302 may include exposing one or more sensors of the detector to a sample including one or more analytes of interest. In some embodiments, the detector may include at least a thermal conductivity sensor, a catalytic sensor, and a damping sensor. In some embodiments, the detector may further include at least one of a coated microcantilever sensor and a MOS sensor.

Act 1304 may include measuring a thermal conductivity of the sample while a thermal conductivity sensor is at a first temperature and a second temperature responsive to exposure to a sample. The thermal conductivity at each of the first temperature and the second temperature may be determined according to the method 400 described above with reference to FIG. 4. In some embodiments, the change in the thermal conductivity of the sample when the thermal conductivity sensor is at each of the first temperature and the second temperature relative to a baseline thermal conductivity at each of the respective first temperature and second temperature may be determined. In other words, in some embodiments, a value of $\Delta TC$ (Equation (3)) may be determined at each of the first temperature and the second temperature.

Act 1306 may include measuring a response of the catalytic sensor at the first temperature and at the second temperature to exposure to the sample. In some embodiments, act 1306 may be performed substantially simultaneously with act 1304. The response of the catalytic sensor at the first temperature and at the second temperature may be determined as described above with reference to the method 600 described above with reference to FIG. 6. In some embodiments, act 1306 may include determining a catalytic activity (i.e., Delta Cat (Equation (7))) at each of the first temperature and the second temperature.

Act 1308 may include determining one or more properties of a damping sensor responsive to exposure to the sample. In some embodiments, act 1308 may be performed substantially simultaneously with acts 1304 and 1306. The one or more properties may be selected from the group consisting of a resonant frequency, a series resistance, a series inductance, a series capacitance, a parallel capacitance, a quality factor, and a bandwidth of the damping sensor. The one or more properties may be determined as described above with reference to FIG. 8A and FIG. 8B and Equation (9) and Equation (10).

Act 1310 may include determining one or more properties of the at least one of a coated microcantilever sensor and a metal oxide semiconductor sensor, which may be measured, such as a resistance of the sensor as a function of temperature or a change in at least one resonant parameter of the coated microcantilever sensor. The at least one of the coated microcantilever sensor and the metal oxide semiconductor sensor may be exposed to the sample. The resistance may be an indication of interaction of the at least one of a metal oxide semiconductor sensor with one or more analytes in the sample. A change in the at least one resonant parameter of the coated microcantilever sensor may be an indication of interaction of the coated microcantilever sensor with one or more analytes in the sample.

Act 1312 may include compensating responses received in acts 1304 through 1310 for one or more of temperature, pressure, relative humidity, absolute humidity, and flowrate. The compensation may be based on the temperature, pressure, relative humidity, absolute humidity, and/or flowrate of the sample measured with, for example, the one or more environmental sensors 118 (FIG. 1).

Act 1314 may include determining one or more properties of the sample based on the information obtained in acts 1304 through 1312. The one or more properties may include, by way of nonlimiting example, a change in thermal conductivity of the sample when the thermal conductivity sensor is at the first temperature responsive to exposure to the sample relative to a baseline thermal conductivity at the first temperature, the change in thermal conductivity of the sample when the thermal conductivity sensor is at the second temperature responsive to exposure to the sample relative to the baseline thermal conductivity at the second temperature, a catalytic response of the catalytic sensor when the catalytic sensor is at the first temperature, a catalytic response of the catalytic sensor when the catalytic sensor is at the second temperature, a catalytic activity of the catalytic sensor when the catalytic sensor is at the first temperature, the catalytic activity of the catalytic sensor when the catalytic sensor is at the second temperature, an exothermic response at the first temperature, an exothermic response at the second temperature, the change in resonant frequency of the damping sensor, the change in bandwidth or quality factor of the damping sensor, a resistance of the MOS sensor at one or more temperatures, or another property.

Act 1316 may include determining an identity (e.g., a presence) of one or more gases in the sample. The presence of the one or more gases may be determined based on any of the methods described herein. In some embodiments, the identity of one or more gases in the sample may be determined based on one or more of a ratio of the change in thermal conductivity at a first temperature to the change in thermal conductivity at a second temperature, the ratio of the change in reactivity at the first temperature to the change in reactivity at the second temperature, the ratio of the catalytic activity at the first temperature to the catalytic activity at the second temperature, the ratio of the change in thermal conductivity at a temperature to the change in reactivity at the same temperature, the ratio of quality factor of a damping sensor exposed to the sample to the change in thermal conductivity, the ratio of the quality factor to the resonant frequency, the ratio of the ratio of change in thermal conductivity at two temperatures to the ratio of change in reactivity at the two temperatures (i.e., $(TC_{T1}/TC_{T2})/(Exo_{T1}/Exo_{T2})$, or combinations thereof.

Act 1318 may include determining a concentration of the one or more gases in the sample. The concentration of the one or more gases may be determined based on any of the methods described herein.

Although FIG. 13 is illustrated as including a particular order, the disclosure is not so limited. In some embodiments, a method of determining one or more properties of a gas may not include all of the acts illustrated and described with reference to FIG. 13. In some embodiments, the acts 1302 through 1318 may be performed in any order.

Figure 14:
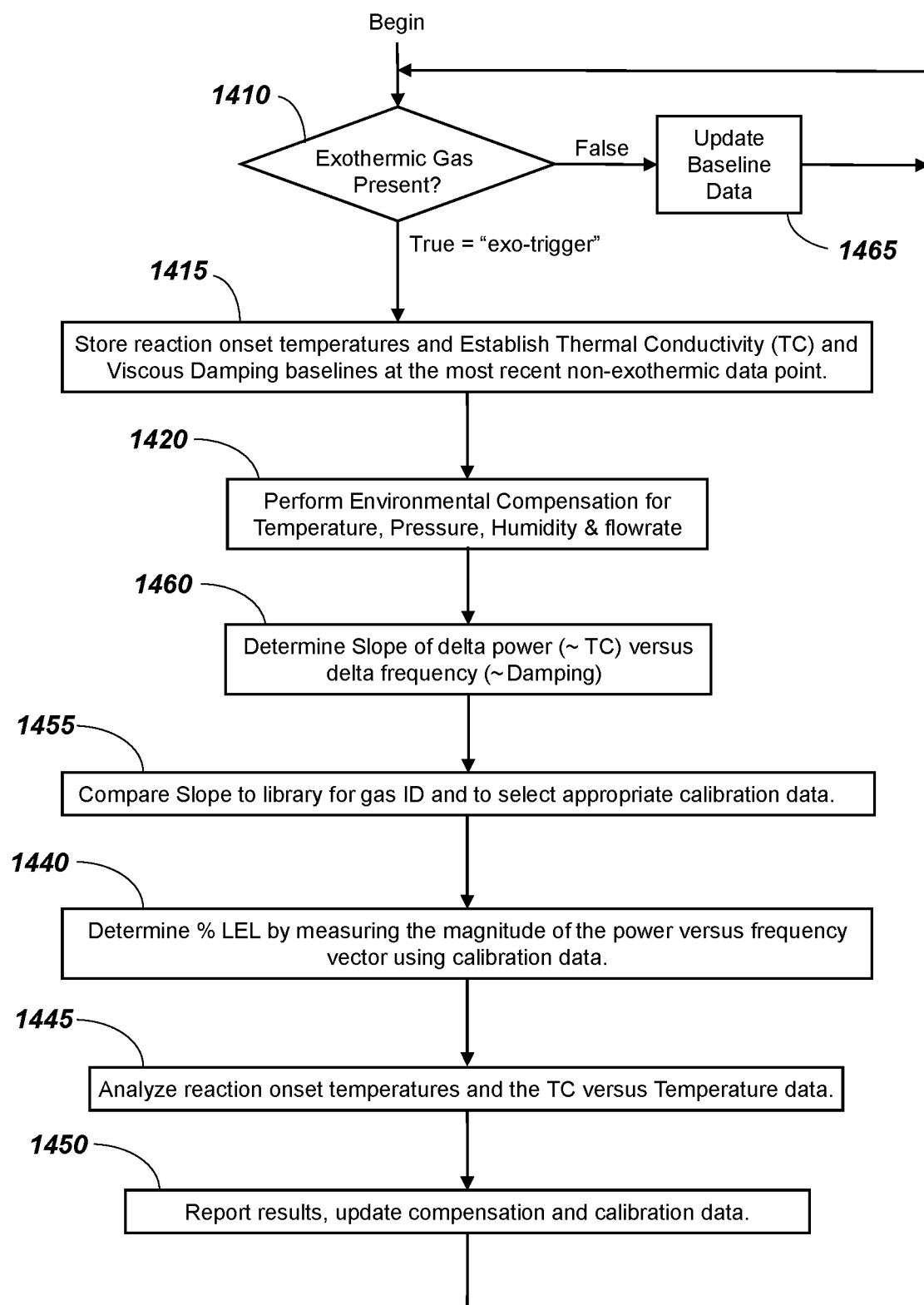
FIG. 14 is a simplified flowchart of processing for detecting, quantifying, and identifying a flammable gas, in accordance with embodiments of the disclosure.

A simplified process flowchart according to one embodiment suitable for identification of one or more flammable gases is illustrated in FIG. 14. At act 1410, the catalytic sensor and the thermal conductivity sensor are utilized to determine if an exothermic gas is present. Act 1465 includes updating baseline data if a presence of an exothermic gas is not detected. A presence of an exothermic gas may be detected responsive to a non-zero value of Exo(new) (e.g., an Exo(new) value having a magnitude greater than a predetermined threshold) according to Equation (8) above. If no reaction onset is detected, the baseline data for the catalytic sensor and the thermal conductivity sensor is updated. If an exothermic gas is detected, the last stored baseline is used as the baseline values at act 1415 and the process can be repeated without baseline updates until the exothermic reaction is no longer detected. The measured results are compensated for the environmental effects of temperature, pressure, humidity (relative humidity, absolute humidity, or both), and flowrate at act 1420.

The slope of the vector delta power (proportional to TC change) versus the delta frequency (proportional to viscous damping or density change) is computed at 1460. Stated another way, act 1460 includes determining a ratio of the change in Delta TC, according to Equation (4) above, to the change in resonant frequency of the damping sensor. The slope, and hence, the ratio, may be used to determine the gas ID and appropriate calibration at act 1455 to be used in subsequent processing. The calibration may be determined in a laboratory and may be used to determine a concentration of the identified gas based on the calibration value and the magnitude of the Delta TC value and the resonant frequency value. Once the calibration data is applied, the magnitude of the delta power versus delta frequency vector can be used to determine the gas concentration at act 1440, sometimes expressed as percent lower explosive limit (LEL) for flammable gases, but also expressed as parts per million (ppm) if the gas' identity is determined and the relationship between % LEL and ppm is known. The magnitude may be determined based on Equation (11) below:

$$\text{Magnitude} = (VD^2 + TC^2)^{1/2} \quad (11),$$

wherein VD is the viscous damping and TC is the thermal conductivity.

Note that, in some embodiments, the gas concentration cannot be accurately quantified without first identifying the gas so that the appropriate calibration can be applied, as the magnitude varies with gas type.

Further gas data differentiation analysis utilizes the TC data collected at multiple temperatures from the thermal conductivity sensor at act 1445. The TC for various gases increases with increasing temperature. Since the rate and magnitude of the TC increase with temperature are unique by gas type, the magnitude and slope of the TC versus temperature vector can be utilized in the analysis as an additional gas concentration and identity discriminator.

At the completion of the analysis, results are reported and the processed data can be used to update compensation and calibration data at act 1450. For instance, the magnitude of the catalytic sensor response can be compared to the magnitude of the delta power versus delta frequency vector. If the catalytic response has diminished due to poisoning or aging, the appropriate compensation can be applied to the catalytic response. If the response of the catalytic sensor cannot be compensated or calibrated for within preset limits, or has degraded below an acceptable threshold of performance, a fault is reported.

Figure 15A:
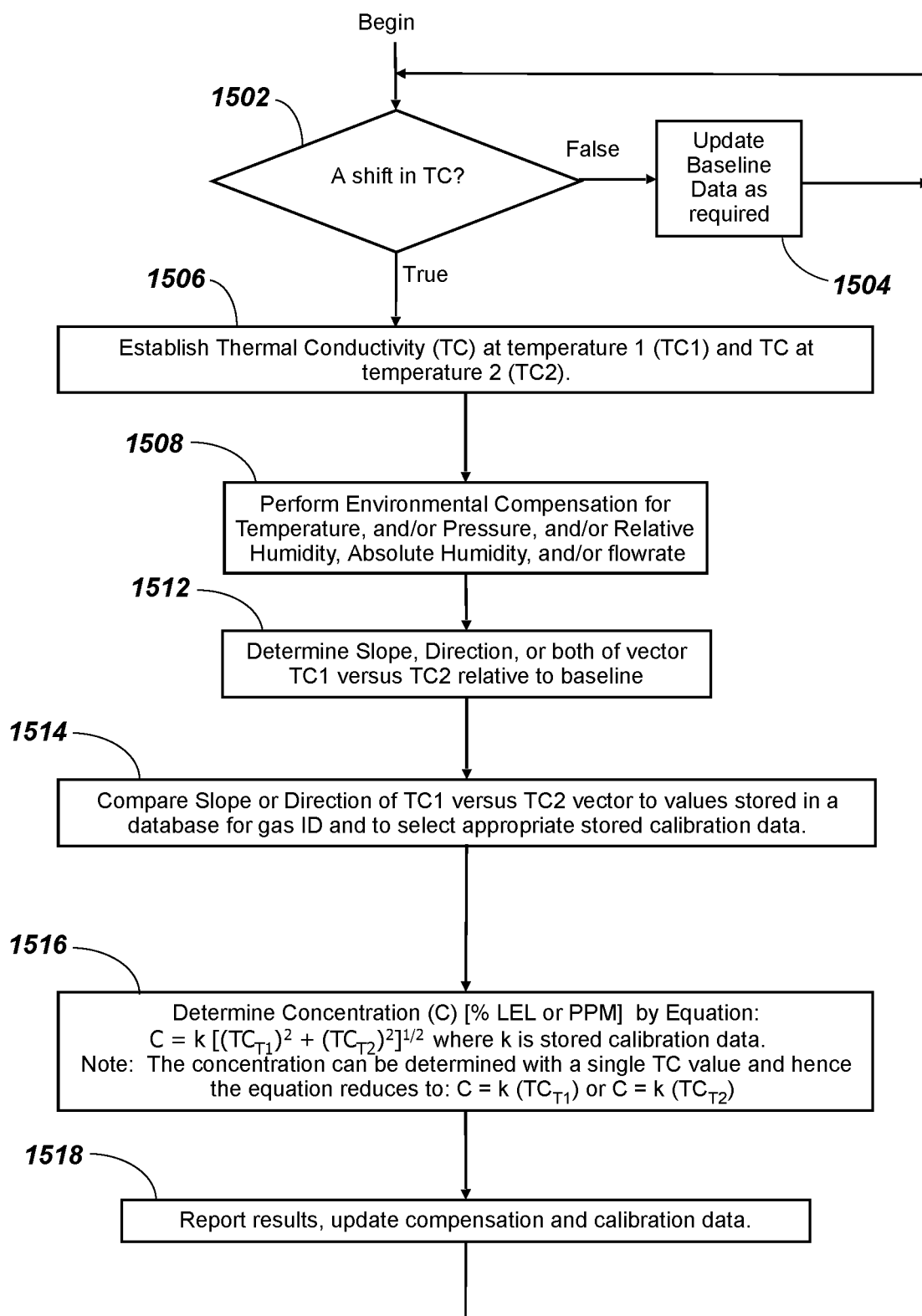
FIG. 15A is a simplified flowchart for an embodiment for determining at least one property of a sample using a thermal conductivity sensor.

FIG. 15A is a simplified flow diagram of another embodiment of determining one or more properties of a sample, in accordance with embodiments of the disclosure and is suitable in both flammable and non-flammable gas detection and identification applications. The method includes determining whether there is a shift (e.g., a change) in thermal conductivity of the sample relative to a baseline thermal conductivity (i.e., whether a value of ΔTC is greater than a predetermined number or is a non-zero value) at act 1502. If there is no change in thermal conductivity of the sample at act 1502, the method includes updating baseline values, as necessary, received from one or more sensors at act 1504. Act 1506 includes establishing a thermal conductivity of the sample at a first temperature (i.e., when the thermal conductivity sensor is at the first temperature) and the thermal conductivity of the sample at the second temperature (i.e., when the thermal conductivity sensor is at the second temperature). Act 1508 may include performing environmental compensation for at least one of temperature, pressure, relative humidity, absolute humidity, and flowrate. Act 1512 may include determining a slope, a direction, or both of a vector of the thermal conductivity at the first temperature to the thermal conductivity at the second temperature. In some embodiments, determining the slope of the vector may include determining a ratio of the thermal conductivity of the sample at the first temperature (e.g., a response of the sensor at the first temperature) to the thermal conductivity of the sample at the second temperature (e.g., a response of the sensor at the second temperature). Act 1514 may include comparing a slope, a direction, or both of the vector to values stored in a database (e.g., memory) to determine an identity of one or more gases in the sample and to select appropriate calibration data (e.g., a k-factor). Act 1516 may include determining a concentration (C) (such as a percent lower explosive limit (% LEL) or ppm) of one or more gases according to Equation (5) above. In some embodiments, the concentration may be determined based on the thermal conductivity at a single temperature. In some such embodiments, the concentration may be determined based on Equation (12) below:

$$C = k(TC_{T1}) \quad (12),$$

Act 1518 may include reporting results to the processor, and updating compensation and calibration data in the database.

Figure 15B:
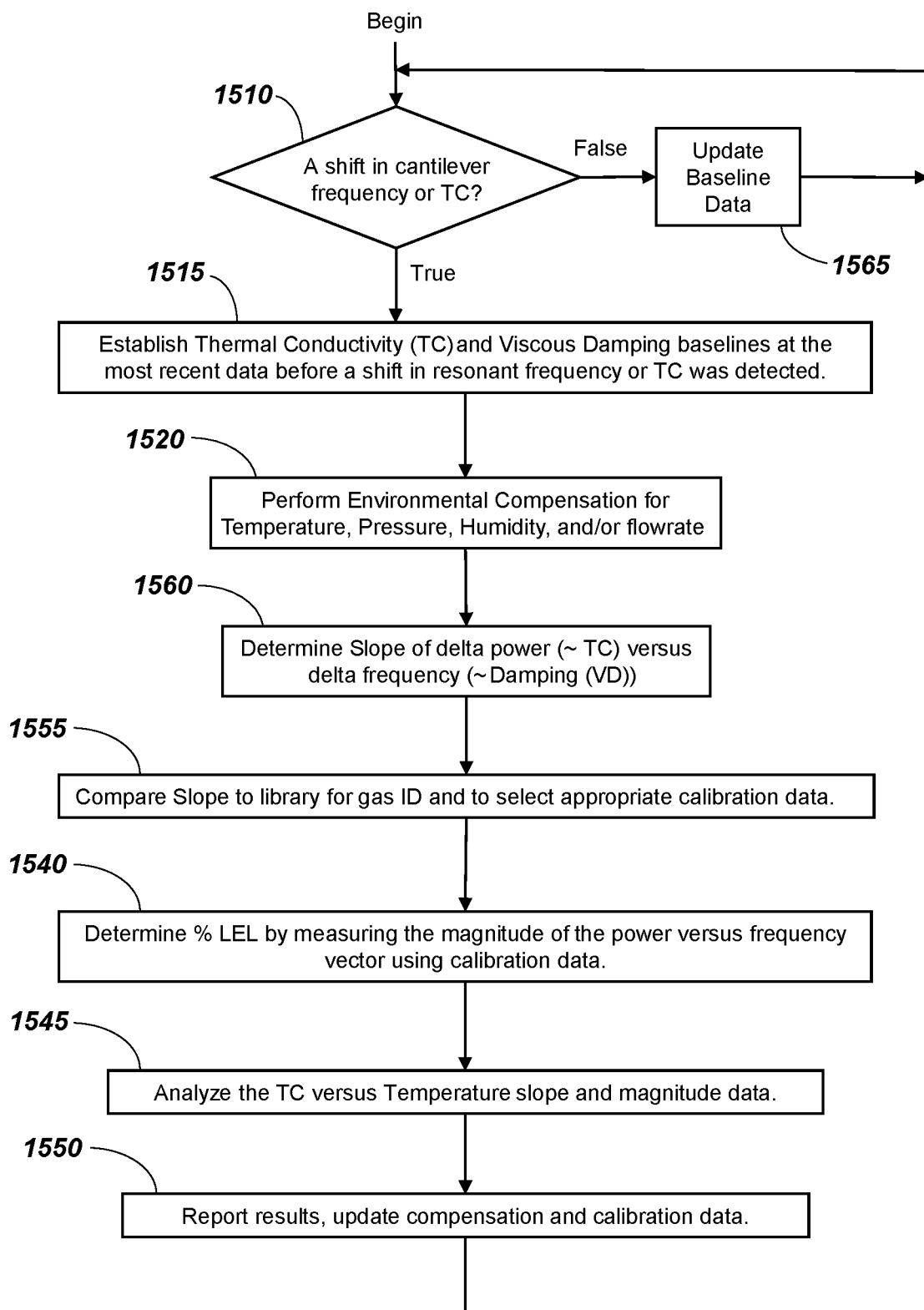
FIG. 15B is a simplified flowchart for an alternate implementation for detecting, quantifying, and identifying non-flammable gases, in accordance with embodiments of the disclosure.

FIG. 15B is a simplified flow diagram of another embodiment of determining at least one property of a sample that does not utilize a catalytic sensor (i.e., the catalytic sensor 112) and thus is suitable for use in both flammable and non-flammable gas detection and identification applications. In FIG. 15B, reference numerals may correspond to the reference numerals of FIG. 14, except that the reference numerals begin with "15" rather than "14." Accordingly, reference numeral 1520, 1560, 1555, 1540, 1545, 1550, 1565 may correspond to reference numerals 1420, 1460, 1455, 1440, 1445, 1450, and 1465, respectively. In this embodiment, the resonant frequency of a damping sensor and the thermal conductivity sensor are monitored to detect a shift in VD or TC at act 1510 ($\Delta$VD or $\Delta$TC). If a shift is VD or TC is not detected in act 1510, the baseline values for TC and VD are updated at act 1565 and act 1510 is repeated. Subsequent processing at act 1515 is initiated when a shift from the baseline data is detected. Other sensors, such as MOS and coated microcantilever sensors, could also be used in the processing to provide added gas type selectivity, as illustrated in FIG. 16.

Figure 16:
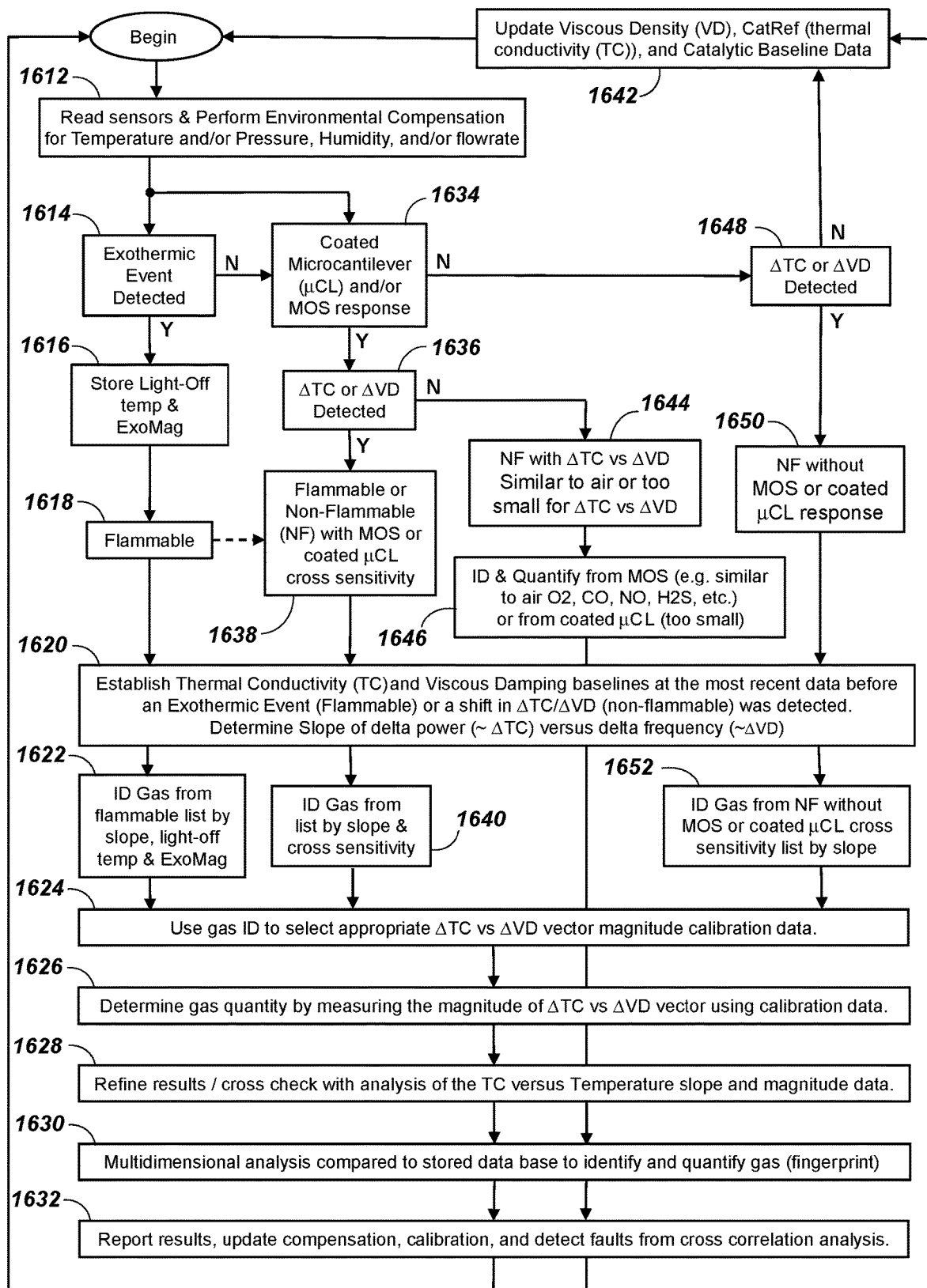
FIG. 16 is a flowchart for an embodiment of the disclosure.

FIG. 16 shows a process flow diagram that utilizes aspects of the present disclosure. One should appreciate that the exact ordering of the processes could be altered, and some processes shown operating in parallel could be executed sequentially. To best appreciate the processing potential illustrated by FIG. 16, consider its operation with the following gases: helium (He), Hydrogen ($H_2$), Methane ($CH_4$), hydrogen sulfide ($H_2S$), carbon monoxide (CO) and carbon dioxide ($CO_2$).

The method may include act 1612, including reading the sensors (e.g., the catalytic sensor, the thermal conductivity sensor, the damping sensor, the MOS sensor, the coated microcantilever sensor, etc.) and compensating them for the environmental effects of temperature, pressure, relative humidity, absolute humidity, and a flowrate of the sample. Helium, hydrogen, and methane have similar TC and VD properties making them hard to distinguish using these properties alone. Helium is non-flammable, so an exothermic reaction (e.g., an exothermic event) would not be detected at act 1614. Depending on the mix of MOS and coated microcantilevers used at act 1634, helium may or may not have a cross sensitivity, in this example it is assumed there is no cross sensitivity to the MOS or coated microcantilevers, and processing would proceed to check for a $\Delta$TC or $\Delta$VD change at act 1648. Helium would trigger a detected change in both $\Delta$TC and $\Delta$VD, thus it would be classified as a non-flammable without cross sensitivity at act 1650 and processing would proceed to establishing baseline responses for TC and VD while also determining the slope of the TC versus VD vector at act 1620. Helium would next be identified by its slope from a stored list of slopes for non-flammables without cross sensitivities at act 1652. With helium being properly identified, the concentration can now be determined using calibration data and the magnitude of the TC versus VD vector at act 1624. The magnitude of the TC versus VD vector may be proportional to the gas concentration, but varies by the gas type, hence it is necessary to apply calibration data unique to the gas identification to determine the proper concentration. At this point in the process, helium has been differentiated from hydrogen and methane and has been properly identified and quantified.

The TC versus temperature is also unique by gas type and can be further utilized to refine the analysis results, and as a system validation/confidence check of overall sensor performance or fault detection at act 1628. Data from all the sensors can be compared at act 1630 in a multi-dimensional analysis. An example of such a multi-dimensional "fingerprint" analysis is illustrated in FIG. 12B and FIG. 12C. FIG. 12D illustrates how this analysis can be applied in a time sequence when a separator 110 (FIG. 1) or gas chromatograph is used ahead of (proximate) the system sensors. Results are reported, compensation values are updated, calibration values are updated, and any faults detected are reported in act 1632. The processing then repeats without updating the baseline data value. If no gas was detected by an exothermic event at act 1614, $\Delta$TC or $\Delta$VD at acts 1636 or 1648, then the baseline data is updated before repeating the process.

Next consider the flow with $H_2$ or $CH_4$, both flammable gases with similar $\Delta$TC versus $\Delta$VD vectors. An exothermic reaction (event) (such as a reactivity or an exothermic response, as determined by a Exo(new) value greater than a predetermined threshold) at act 1614 would be detected and the reaction onset (light-off) temperature and magnitude of the exothermic reaction (event) would be saved at act 1616. In the event that a MOS or coated microcantilever response was also detected, the flammable detection at act 1618 information is shared with the MOS/coated microcantilever processing at act 1638 so appropriate sensor cross sensitivity can be analyzed. The $\Delta$TC versus $\Delta$VD vector compared to the baseline values is determined at act 1620 and the flammable gas is identified by the vector slope and reaction onset (light-off) temperature at act 1622. $H_2$ is differentiated from $CH_4$ by its lower reaction onset (light-off) temperature. The gas being properly identified, the appropriate $\Delta$TC versus $\Delta$VD magnitude calibration data is applied to determine the gas concentration at act 1626. The remaining processing is the same as previously described for He, and the process is repeated without updating the baseline values until an exothermic event is no longer detected. If multiple flammable gases were present, multiple light-off temperatures would be observed and can be used to identify the individual gas components. With reference again to FIG. 3C, multiple gases in the sample may be determined based on the ratio of the thermal conductivity at the first temperature and the thermal conductivity at the second temperature. A concentration thereof may be determined based on the k-factor. In some embodiments, mixtures of gases may exhibit a ratio depending on a composition of the mixture. By way of example only, a mixture including 50% hexane and 50% hydrogen may have a ratio of thermal conductivity at the first temperature to the thermal conductivity at the second temperature equal to about the average ratio for the individual components.

The next gas in the list to consider is $H_2S$. In some embodiments, $H_2S$ MOS sensors can detect $H_2S$ at concentrations much lower than can be detected by $\Delta$TC or $\Delta$VD. In this case, $H_2S$ would be detected by the $H_2S$ MOS sensor at act 1634, but not detected by with a $\Delta$TC or $\Delta$VD shift at act 1636. Processing would proceed to identify the gas as having a MOS response with a $\Delta$TC or $\Delta$VD similar to air or, in the case of $H_2S$, a $\Delta$TC or $\Delta$VD may be too small to detect at act 1644. The gas would be identified as $H_2S$ at act 1646 and the processing would proceed to the multi-dimensional analysis at act 1630. After the results are reported at act 1632, the baselines would be updated at act 1642 since no $\Delta$TC or $\Delta$VD shift was detected. The whole process would then repeat.

Carbon monoxide (CO) is a gas that is also readily detectable with a MOS sensor. The CO $\Delta$TC and $\Delta$VD shift is similar to that of a standard air composition, and hence would not produce a significant ΔTC or ΔVD shift. In the case of both $H_2S$ and CO, the multi-dimensional analysis at act 1630 is useful in properly identifying and quantifying gases absent a ΔTC or ΔVD shift.

Carbon dioxide ($CO_2$) is a gas that is not readily detected by a MOS sensor. Being non-flammable, it would not be detected by an exothermic event at act 1614, nor would it be detected by a MOS sensor at act 1634. $CO_2$ would produce a ΔTC or ΔVD shift at act 1648, and would be identified from the non-flammable without a MOS response list at act 1650 by the ΔTC versus ΔVD vector slope at act 1620. The concentration would be determined from the ΔTC versus ΔVD magnitude with the appropriate calibration data applied at act 1624. Processing would proceed as in previous examples. The MOS and coated microcantilevers can also be used to parse the identification of any TC versus VD vector ambiguities by analyzing cross sensitivities at act 1640 prior to selection of the magnitude calibration selection at act 1624.

The multi-dimensional analysis that combines the responses at act 1630 and as illustrated in FIG. 12B and FIG. 12C can identify and quantify a plurality of gases and volatile organic compounds (VOCs) at very low concentration levels.

Figure 17:
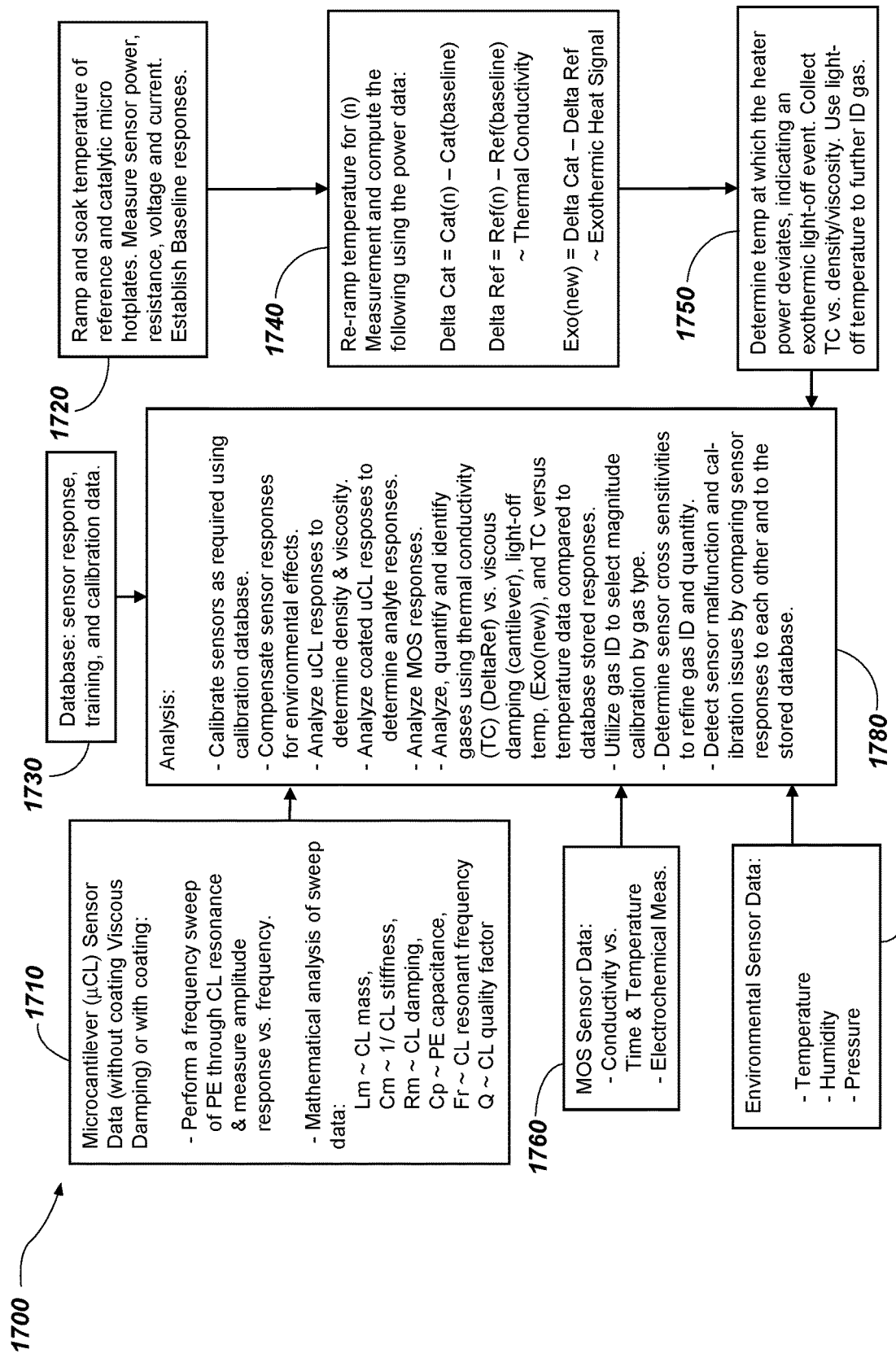
FIG. 17 is an overview of the individual system processes used in some embodiments of the disclosure.

FIG. 17 is a flow diagram illustrating a method of determining one or more properties of a sample, according to some embodiments of the disclosure. Method 1700 may include act 1710 including performing a frequency sweep of a piezoelectric element of a microcantilever sensor (e.g., a damping sensor 116 (FIG. 1)) without a coating (or with a substantially inert coating) and measuring an amplitude response and resonant frequency of the inert microcantilever sensor. The microcantilever sensor is driven by a swept frequency voltage under control of the central processing unit (CPU) 124 (FIG. 1). A numerically controlled oscillator or frequency synthesizer performs the digital-to-analog (D/A) converter 120 (FIG. 1) swept frequency drive to either the piezoelectric or piezoresistive element. The CPU 124 reads back the sensed voltage amplitude and phase via the analog-to-digital (A/D) converter 120 to detect when the drive voltage frequency goes through the mechanical resonant frequency of the microcantilever. One or more of the inductance, series capacitance, parallel capacitance, series resistance, resonant frequency, quality factor, and bandwidth of the microcantilever sensor may be determined from the data obtained during the frequency sweep using, for example, an equivalent circuit model, as described above with reference to Equation (9) and Equation (10).

Act 1720 may include exposing a reference microhotplate sensor (e.g., thermal conductivity sensor 112 (FIG. 1)) and a catalytic microhotplate sensor (e.g., catalytic sensor 112 (FIG. 1)) to a reference (e.g., air) and ramping a temperature thereof. The power, resistance, voltage, and current to each of the reference microhotplate sensor (e.g., thermal conductivity sensor) and the catalytic microhotplate sensor may be measured at each temperature, as described above with reference to Equations (1) through (3), (7), and (8). Act 1730 may include storing the sensor responses and calibration data in a database. At act 1730, the database stores the sensor responses, training data, and calibration data used in the analysis.

Act 1740 includes re-ramping the temperature of the thermal conductivity sensor and the catalytic microhotplate sensor and determining each of ΔTC, Delta Cat, and Exo (new) according to Equations (3), (7), and (8), respectively, described above. If the power in the resultant exothermic signal, Exo(new) deviates from its nominal value, an exothermic reaction is detected at act 1750, hereinafter referred to as a light-off event. The temperature of the light-off is another identifier of the gas type detected. Multiple light-offs at differing temperatures is an indication of multiple flammable gases present in the sample. Accordingly, act 1750 includes determining one or more temperatures where Exo (new) deviates from its nominal value (e.g., zero). The one or more temperatures where Exo(new) deviates from a nominal value may be used to identify a presence of one or more gases in the sample.

Act 1760 may include exposing a MOS sensor to the sample. The MOS sensor data includes the conductivity versus temperature and the MOS electrochemical measurements that are used in the analysis.

The measured resonant frequency can be compensated for temperature, humidity and pressure conditions with data measured by environmental sensor 118. Act 1770 may include compensating one or more of the resonant frequency, the response of the thermal conductivity microcantilever, and the response of the catalytic microcantilever for one or more of temperature, relative humidity, absolute humidity, and pressure.

Act 1780 may include analyzing the data received from each of the sensors. The analysis may include calibrating sensors using the data in the database. Act 1780 may include determining one or more properties of the sample based on the responses of the sensors responsive to exposure to the sample.

Additional nonlimiting example embodiments of the disclosure are set forth below.

Embodiment 1

A system for detecting, identifying and quantifying gases, the system comprising: a microhotplate sensor that senses the gas' thermal conductivity; a microcantilever probe sensor that senses the gas' viscous damping; and a subsystem that measures, compensates and analyzes thermal conductivity versus viscous damping vector compared to stored baseline responses, determines the gas identification from the resultant vector slope, and determines the gas concentration from the resultant vector magnitude calibrated to the specific gas identification.

Embodiment 2

A system for detecting, identifying and quantifying flammable gases, the system comprising: a microhotplate catalytic sensor that detects a gas' exothermic reaction and light-off temperature(s); a microhotplate reference sensor that senses the gas' thermal conductivity and is also used to compensate the catalytic sensor; a microcantilever probe sensor that senses viscous damping; and a subsystem that utilizes detection of an exothermic reaction to trigger additional processing, and measures, compensates and analyzes thermal conductivity versus viscous damping vector relative to stored baseline responses, wherein the thermal conductivity, viscous damping, and light-off temperature data are analyzed to determine the flammable gas' identification, and wherein the gas' concentration is determined from the resultant vector magnitude calibrated based upon the gas identification.

Embodiment 3

A system for detecting, identifying and quantifying gases, the system comprising: a microhotplate catalytic sensor that detects a gas' exothermic reaction and light-off temperature(s); a microhotplate reference sensor that senses the gas' thermal conductivity and is also used to compensate the catalytic sensor; a microcantilever probe sensor that senses viscous damping; a plurality of microhotplate MOS sensors; and a subsystem that parses flammable from non-flammable gases, measures, compensates and analyzes thermal conductivity versus viscous damping vector relative to stored baseline responses, identifies flammable gases by light-off temperature and the slope of thermal conductivity versus viscous damping vector, identifies non-flammable gases by the slope of thermal conductivity versus viscous damping vector, utilizes the MOS sensor responses to parse gas identification ambiguities to identify and to quantify gases that are not detectable with a thermal conductivity versus viscous damping vector, and quantifies gases having detected changes in thermal conductivity and viscous damping by applying a stored gas specific calibration to the magnitude of the thermal conductivity versus viscous damping vector.

Embodiment 4

A system for detecting, identifying and quantifying gases, the system comprising: a microhotplate catalytic sensor that detects a gas' exothermic reaction and light-off temperature(s); a microhotplate reference sensor that senses the gas' thermal conductivity and is used to compensate the catalytic sensor; a microcantilever probe sensor that senses viscous damping; a plurality of microhotplate MOS sensors; a plurality of coated microcantilever sensors; and a subsystem that parses flammable from non-flammable gases, measures, compensates and analyzes thermal conductivity versus viscous damping vector compared to stored baseline responses, identifies flammable gases by light-off temperature, the slope of thermal conductivity versus viscous damping vector, identifies non-flammable gases by the slope of thermal conductivity versus viscous damping vector, utilizes the MOS sensor responses and coated microcantilever responses to parse gas identification ambiguities and to identify and quantify gases that are not detectable with a thermal conductivity versus viscous damping vector, and quantifies gases having detected changes in thermal conductivity and viscous damping by applying a stored gas specific calibration to the magnitude of the thermal conductivity versus viscous damping vector.

Embodiment 5

A system for detecting, identifying, and quantifying gases, the system comprising: a microhotplate sensor that senses the gas' thermal conductivity; a microcantilever probe sensor that senses the gas' viscous damping; and a subsystem that measures, compensates and analyzes thermal conductivity versus viscous damping vector compared to stored baseline responses, determines the gas identification from the resultant vector slope, and determines the gas concentration from the resultant vector magnitude calibrated to the specific gas identification.

Embodiment 6

A system for detecting, identifying and quantifying flammable gases, the system comprising: a microhotplate catalytic sensor that detects a gas' exothermic reaction and light-off temperature(s); a microhotplate reference sensor that senses the gas' thermal conductivity and is also used to compensate the catalytic sensor; a microcantilever probe sensor that senses viscous damping; and a subsystem that utilizes detection of an exothermic reaction to trigger additional processing, and measures, compensates and analyzes thermal conductivity versus viscous damping vector relative to stored baseline responses, wherein the thermal conductivity, viscous damping, and light-off temperature data are analyzed to determine the flammable gas' identification, and wherein the gas' concentration is determined from the resultant vector magnitude calibrated based upon the gas identification.

Embodiment 7

A system for detecting, identifying and quantifying gases, the system comprising: a microhotplate catalytic sensor that detects a gas' exothermic reaction and light-off temperature(s); a microhotplate reference sensor that senses the gas' thermal conductivity and is also used to compensate the catalytic sensor; a microcantilever probe sensor that senses viscous damping; a plurality of microhotplate MOS sensors; and a subsystem that parses flammable from non-flammable gases, measures, compensates and analyzes thermal conductivity versus viscous damping vector relative to stored baseline responses, identifies flammable gases by light-off temperature and the slope of thermal conductivity versus viscous damping vector, identifies non-flammable gases by the slope of thermal conductivity versus viscous damping vector, utilizes the MOS sensor responses to parse gas identification ambiguities to identify and to quantify gases that are not detectable with a thermal conductivity versus viscous damping vector, and quantifies gases having detected changes in thermal conductivity and viscous damping by applying a stored gas specific calibration to the magnitude of the thermal conductivity versus viscous damping vector.

Embodiment 8

A system for detecting, identifying and quantifying gases, the system comprising: a microhotplate catalytic sensor that detects a gas' exothermic reaction and light-off temperature(s); a microhotplate reference sensor that senses the gas' thermal conductivity and is used to compensate the catalytic sensor; a microcantilever probe sensor that senses viscous damping; a plurality of microhotplate MOS sensors; a plurality of coated microcantilever sensors; and a subsystem that parses flammable from non-flammable gases, measures, compensates and analyzes thermal conductivity versus viscous damping vector compared to stored baseline responses, identifies flammable gases by light-off temperature, the slope of thermal conductivity versus viscous damping vector, identifies non-flammable gases by the slope of thermal conductivity versus viscous damping vector, utilizes the MOS sensor responses and coated microcantilever responses to parse gas identification ambiguities and to identify and quantify gases that are not detectable with a thermal conductivity versus viscous damping vector, and quantifies gases having detected changes in thermal conductivity and viscous damping by applying a stored gas specific calibration to the magnitude of the thermal conductivity versus viscous damping vector.

Embodiment 9

The system of any one of Embodiments 1 through 8 that further measures the thermal conductivity at multiple temperatures and utilizes the resultant thermal conductivity versus temperature vector as an additional measure of the gas concentration and identification.

Embodiment 10

The system of any one of Embodiments 1 through 8, wherein the gas' thermal conductivity is measured at a temperature greater than an ambient temperature.

Embodiment 11

The system of any one of Embodiments 1 through 8, that parses gases by those that are less dense than air and those that are denser than air.

Embodiment 12

The system of any one of Embodiments 1 through 8, further comprising a temperature sensor that is used to compensate the microhotplate and microcantilever sensor measurements for temperature variations.

Embodiment 13

The system of any one of Embodiments 1 through 8, further comprising a humidity sensor that is used to compensate the microhotplate and microcantilever sensor measurements for humidity variations.

Embodiment 14

The system of any one of Embodiments 1 through 8, further comprising a pressure sensor that is used to compensate the microhotplate and microcantilever sensor measurements for pressure variations.

Embodiment 15

The system of any one of Embodiments 1 through 8, wherein the reference sensor response is subtracted from the catalytic sensor response to compensate the catalytic sensor for temperature, pressure, humidity, and flow variations.

Embodiment 16

The system of any one of Embodiments 1 through 8, wherein a baseline response from each of the sensors is stored prior to detection of a gas and subsequently subtracted from each sensors' response to produce a delta response that is used in further analysis.

Embodiment 17

The system of any one of Embodiments 1 through 8, further comprising a filter that selectively restricts gas flow to the microhotplates from the external gas environment.

Embodiment 18

The system of any one of Embodiments 1 through 8, further comprising a flame arrestor between the microhotplates and the external gas environment.

Embodiment 19

The system of any one of Embodiments 1 through 8, wherein the quality factor of the microcantilever is derived and used to parse the individual contributions of viscous damping components of density and viscosity, wherein the combined analysis of density, viscosity, and thermal conductivity are utilized to identify gas component identification and its concentration.

Embodiment 20

The system of any one of Embodiments 2 through 4 or 6 through 8, wherein the measured responses from the microhotplate reference sensor, the microhotplate catalytic sensor and the microcantilever sensor responses are compared with each other to compensate for sensor drift and to detect malfunctions.

Embodiment 21

The system of any one of Embodiments 1 through 8, wherein the circuitry is operated at reduced power between measurements.

Embodiment 22

The system of any one of Embodiments 1 through 8, wherein calibration data for the sensors is stored in a non-volatile memory and used to calibrate the sensor measurements.

Embodiment 23

The system of any one of Embodiments 1 through 8, wherein calibration data for quantifying the gas concentration is stored in non-volatile memory and selected based on the gas identity.

Embodiment 24

The system of any one of Embodiments 1 through 8, wherein sensor response profiles for different gases are stored in a non-volatile memory.

Embodiment 25

The system of any one of Embodiments 1 through 8, wherein the microcantilever vibration is driven and sensed with a single piezoelectric element.

Embodiment 26

The system of any one of Embodiments 1 through 8, wherein the microcantilever vibration is driven with a piezoelectric element and sensed with a piezoresistive element.

Embodiment 27

The system of any one of Embodiments 1 through 8, wherein a piezoresistive element is used to thermally drive vibration in the microcantilever.

Embodiment 28

The system of any one of Embodiments 1 through 8, wherein a piezoresistive element is used to sense vibration in the microcantilever.

Embodiment 29

The system of Embodiment 27 or Embodiment 28, wherein the piezoresistive element is formed on a layer of single-crystal silicon by depositing polycrystalline silicon with a dielectric layer positioned between the single-crystal silicon layer and the piezoresistive layer.

Embodiment 30

The system of Embodiment 27 or Embodiment 28, wherein the piezoresistive element comprises a thin film metal layer.

Embodiment 31

The system of any one of Embodiments 1 through 8, wherein a resistive heater is included on the surface of the microcantilever for setting and sensing temperature of the microcantilever.

Embodiment 32

The system of any one of Embodiments 1 through 8, wherein the data collected from all sensors is compared to a stored database of fingerprints to detect, identify, and quantify the sampled gas.

Embodiment 33

The system of any one of Embodiments 1 through 8, wherein the gas is concentrated prior to being exposed to the sensors.

Embodiment 34

The system of any one of Embodiments 1 through 8, wherein the gas is passed through a separator prior to being exposed to the sensors.

Embodiment 35

The system of Embodiment 34, wherein the gas transit time through the separator varies by gas type.

Embodiment 36

The system of Embodiment 35, wherein the separator is a gas chromatograph.

Embodiment 37

The system of Embodiment 35, wherein the gas is periodically sampled over a time and correlated to the stored data base of fingerprints and known gas transit times for the separator.

Embodiment 38

The system of any one of Embodiments 2 through 4 or 6 through 8, wherein the temperature is ramped in predetermined temperature steps on both the catalytic and catalytic reference microhotplates and the power required to achieve each temperature step is monitored by measuring the voltage and current to the resistive heater on the microhotplate.

Embodiment 39

The system of Embodiment 38, wherein the power required to achieve each temperature step of a previously measured baseline temperature ramp is subtracted from the current temperature ramp to produce a delta catalytic and delta catalytic reference signal.

Embodiment 40

The system of Embodiment 39, wherein the delta catalytic reference signal is subtracted from the delta catalytic signal to produce a measurement proportional to exothermic heat signal produced by the catalytic sensor.

Embodiment 41

A method of detecting, identifying, and quantifying gases, the method comprising: detecting the gas' thermal conductivity; detecting the gas' viscous damping; compensating the thermal conductivity and viscous damping for the effects of temperature, pressure, and humidity; determining the slope and magnitude of the thermal conductivity versus viscous damping vector relative to a stored baseline; identifying the gas by the slope of the thermal conductivity versus viscous damping vector; and quantifying the gas by applying a stored gas specific calibration to the magnitude of the thermal conductivity versus viscous damping vector.

Embodiment 42

A method of detecting, identifying, and quantifying gases, the method comprising: detecting a gas' exothermic reaction and light-off temperature(s); detecting the gas' thermal conductivity; detecting the gas' viscous damping; compensating the thermal conductivity and viscous damping for the effects of temperature, pressure, and humidity; determining the slope and magnitude of the thermal conductivity versus viscous damping vector relative to a stored baseline; identifying the gas by the slope of the thermal conductivity versus viscous damping vector and the light-off temperature(s); and quantifying the gas by applying a stored gas specific calibration to the magnitude of the thermal conductivity versus viscous damping vector.

Embodiment 43

A method for detecting, identifying and quantifying gases, the method comprising: detecting the gas' exothermic reaction and light-off temperature(s); detecting the gas' thermal conductivity; detecting the gas' viscous damping; collecting responses from a plurality of MOS sensors; compensating the detected responses for temperature, pressure, and humidity, parsing flammable from non-flammable gases; identifying flammable gases by the light-off temperature and the slope of thermal conductivity versus viscous damping vector relative to a stored baseline; identifying non-flammable gases by the slope of thermal conductivity versus viscous damping vector relative to a stored baseline; utilizing the MOS sensor responses to parse gas identification ambiguities and to identify and quantify gases that are not detectable with a thermal conductivity versus viscous damping vector; and quantifying gases with detected changes to thermal conductivity and viscous damping by applying a stored gas specific calibration to the magnitude of the thermal conductivity versus viscous damping vector.

Embodiment 44

A method for detecting, identifying and quantifying gases, the method comprising: detecting the gas' exothermic reaction and light-off temperature(s); detecting the gas' thermal conductivity; detecting the gas' viscous damping: collecting responses from a plurality of MOS sensors; collecting responses from a plurality of microcantilever sensors; compensating all the sensor responses for temperature, pressure, and humidity, parsing flammable from non-flammable gases; identifying flammable gases by the light-off temperature and the slope of thermal conductivity versus viscous damping vector relative to a stored baseline; identifying non-flammable gases by the slope of thermal conductivity versus viscous damping vector relative to a stored baseline; utilizing the MOS sensor responses and coated microcantilever responses to parse gas identification ambiguities and to identify and quantify gases that are not detectable with a thermal conductivity versus viscous damping vector; and quantifying gases with detected changes to thermal conductivity and viscous damping by applying a stored gas specific calibration to the magnitude of the thermal conductivity versus viscous damping vector.

Embodiment 45

A method of detecting, identifying, and quantifying gases, the method comprising: detecting the gas' thermal conductivity; detecting the gas' viscous damping; compensating the thermal conductivity and viscous damping for the effects of temperature, pressure, and humidity; determining the slope and magnitude of the thermal conductivity versus viscous damping vector relative to a stored baseline; identifying the gas by the slope of the thermal conductivity versus viscous damping vector; and quantifying the gas by applying a stored gas specific calibration to the magnitude of the thermal conductivity versus viscous damping vector.

Embodiment 46

A method of detecting, identifying, and quantifying gases, the method comprising: detecting a gas' exothermic reaction and light-off temperature(s); detecting the gas' thermal conductivity; detecting the gas' viscous damping; compensating the thermal conductivity and viscous damping for the effects of temperature, pressure, and humidity; determining the slope and magnitude of the thermal conductivity versus viscous damping vector relative to a stored baseline; identifying the gas by the slope of the thermal conductivity versus viscous damping vector and the light-off temperature(s); and quantifying the gas by applying a stored gas specific calibration to the magnitude of the thermal conductivity versus viscous damping vector.

Embodiment 47

A method for detecting, identifying and quantifying gases, the method comprising: detecting the gas' exothermic reaction and light-off temperature(s); detecting the gas' thermal conductivity; detecting the gas' viscous damping; collecting responses from a plurality of MOS sensors; compensating the detected responses for temperature, pressure, and humidity, parsing flammable from non-flammable gases; identifying flammable gases by the light-off temperature and the slope of thermal conductivity versus viscous damping vector relative to a stored baseline; identifying non-flammable gases by the slope of thermal conductivity versus viscous damping vector relative to a stored baseline; utilizing the MOS sensor responses to parse gas identification ambiguities and to identify and quantify gases that are not detectable with a thermal conductivity versus viscous damping vector; and quantifying gases with detected changes to thermal conductivity and viscous damping by applying a stored gas specific calibration to the magnitude of the thermal conductivity versus viscous damping vector.

Embodiment 48

A method for detecting, identifying and quantifying gases, the method comprising: detecting the gas' exothermic reaction and light-off temperature(s); detecting the gas' thermal conductivity; detecting the gas' viscous damping collecting responses from a plurality of MOS sensors; collecting responses from a plurality of microcantilever sensors; compensating all the sensor responses for temperature, pressure, and humidity, parsing flammable from non-flammable gases; identifying flammable gases by the light-off temperature and the slope of thermal conductivity versus viscous damping vector relative to a stored baseline; identifying non-flammable gases by the slope of thermal conductivity versus viscous damping vector relative to a stored baseline; utilizing the MOS sensor responses and coated microcantilever responses to parse gas identification ambiguities and to identify and quantify gases that are not detectable with a thermal conductivity versus viscous damping vector; and quantifying gases with detected changes to thermal conductivity and viscous damping by applying a stored gas specific calibration to the magnitude of the thermal conductivity versus viscous damping vector.

Embodiment 49

The method of any one of Embodiments 41 through 48, that further measures the thermal conductivity at multiple temperatures and utilizes the resultant thermal conductivity versus temperature vector as an additional measure of the gas concentration and identification.

Embodiment 50

The method of any one of Embodiments 41 through 48, wherein the gas' thermal conductivity is measured at a temperature greater than an ambient temperature.

Embodiment 51

The method of any one of Embodiments 41 through 48, that parses gases by those that are less dense than air and those that are denser than air.

Embodiment 52

The method of any one of Embodiments 41 through 48, further utilizing a temperature sensor that is used to compensate the microhotplate and microcantilever sensor measurements for temperature variations.

Embodiment 53

The method of any one of Embodiments 41 through 48, further utilizing a humidity sensor that is used to compensate the microhotplate and microcantilever sensor measurements for humidity variations.

Embodiment 54

The method of any one of Embodiments 41 through 48, further utilizing a pressure sensor that is used to compensate the microhotplate and microcantilever sensor measurements for pressure variations.

Embodiment 55

The method of any one of Embodiments 42 through 44 or 46 through 48, wherein the reference sensor response is subtracted from the catalytic sensor response to compensate the catalytic sensor for temperature, pressure, humidity and flow variations.

Embodiment 56

The method of any one of Embodiments 41 through 48, wherein a baseline response from each of the sensors is stored prior to detection of a gas and subsequently subtracted from each sensors' response to produce a delta response that is used in further analysis.

Embodiment 57

The method of any one of Embodiments 41 through 48, further utilizing a filter that selectively restricts gas flow to the microhotplates from the external gas environment.

Embodiment 58

The method of any one of Embodiments 41 through 48, further utilizing a flame arrestor between the microhotplates and the external gas environment.

Embodiment 59

The method of any one of Embodiments 41 through 48, wherein the quality factor of the micro cantilever is derived and used to parse the individual contributions of viscous damping components of density and viscosity, wherein the combined analysis of density, viscosity, and thermal conductivity are utilized to identify gas component identification and its concentration.

Embodiment 60

The method of any one of Embodiments 42 through 44 or 46 through 48, wherein the measured responses from the microhotplate reference sensor, the microhotplate catalytic sensor and the microcantilever sensor responses are compared with each other to compensate for sensor drift and to detect malfunctions.

Embodiment 61

The method of any one of Embodiments 41 through 48, wherein the circuitry is operated at reduced power between measurements.

Embodiment 62

The method of any one of Embodiments 41 through 48, wherein calibration data for the sensors is stored in a non-volatile memory and used to calibrate the sensor measurements.

Embodiment 63

The method of any one of Embodiments 41 through 48, wherein the calibration data for quantifying the gas concentration is stored in non-volatile memory and selected based on the gas identity.

Embodiment 64

The method of any one of Embodiments 41 through 48, wherein sensor response profiles for different gases are stored in a non-volatile memory.

Embodiment 65

The method of any one of Embodiments 41 through 48, wherein a microcantilever is used to sense viscous damping and a single piezoelectric element is used to drive and detect the microcantilever vibration.

Embodiment 66

The method of any one of Embodiments 41 through 48, wherein a microcantilever is used to sense viscous damping and the microcantilever vibration is driven with a piezoelectric element and sensed with a piezoresistive element.

Embodiment 67

The method of any one of Embodiments 41 through 48, wherein a microcantilever is used to sense viscous damping and a piezoresistive element is used to thermally drive vibration in the microcantilever.

Embodiment 68

The method of any one of Embodiments 41 through 48, wherein a microcantilever is used to sense viscous damping and a piezoresistive element is used to sense vibration in the microcantilever.

Embodiment 69

The method of Embodiment 67 or Embodiment 68, wherein the piezoresistive element is formed on a layer of single-crystal silicon by depositing polycrystalline silicon with a dielectric layer positioned between the single-crystal silicon layer and the piezoresistive layer.

Embodiment 70

The method of Embodiment 67 or Embodiment 68, wherein the piezoresistive element is formed by a thin film metal layer.

Embodiment 71

The method of any one of Embodiments 41 through 48, wherein the data collected from all sensors is compared to a stored database of fingerprints to detect, identify and quantify the sampled gas.

Embodiment 72

The method of any one of Embodiments 41 through 48, wherein the gas is concentrated prior to being exposed to the sensors.

Embodiment 73

The method of any one of Embodiments 41 through 48, wherein the gas is passed through a separator prior to being exposed to the sensors.

Embodiment 74

The method of Embodiment 73, wherein the gas transit time through the separator varies by gas type.

Embodiment 75

The method of Embodiment 73, wherein the separator is a gas chromatograph.

Embodiment 76

The method of Embodiment 73, wherein the gas is periodically sampled over a time and correlated to the stored data base of fingerprints and known gas transit times for the separator.

Embodiment 77

The method of any one of Embodiments 42 through 44 or 46 through 48, wherein the temperature is ramped in predetermined temperature steps on both the catalytic and catalytic reference microhotplates and the power required to achieve each temperature step is monitored by measuring the voltage and current to the resistive heater on the microhotplate.

Embodiment 78

The method of Embodiment 77, wherein the power required to achieve each temperature step of a previously measured baseline temperature ramp is subtracted from the current temperature ramp to produce a delta catalytic and delta catalytic reference signal.

Embodiment 79

The method of Embodiment 78, wherein the delta catalytic reference signal is subtracted from the delta catalytic signal to produce a measurement proportional to exothermic heat signal produced by the catalytic sensor.

Embodiment 80

A system for determining one or more properties of one or more samples, the system comprising: a thermal conductivity sensor configured to measure a response of the thermal conductivity sensor to exposure to a sample at two or more temperatures; and a processing subsystem configured to: determine a thermal conductivity of the sample at each of the two or more temperatures responsive to an output of the thermal conductivity sensor; and determine a presence of at least one component of the sample based at least in part on the thermal conductivity of the sample at each of the two or more temperatures.

Embodiment 81

The system of Embodiment 80, wherein the processing subsystem is configured to determine the thermal conductivity of the sample at each of the two or more temperatures by subtracting a baseline response of the thermal conductivity sensor from a response of the thermal conductivity sensor at each of the two or more respective temperatures to exposure to the sample.

Embodiment 82

The system of Embodiment 80 or Embodiment 81, wherein the processing subsystem is configured to determine an identity of the sample based on a ratio of the thermal conductivity of the sample at a first temperature of the two or more temperatures to the thermal conductivity of the sample at a second temperature of the two or more temperatures.

Embodiment 83

The system of any one of Embodiments 80 through 82, wherein the processing subsystem is further configured to determine a concentration of the sample based on at least one of the thermal conductivity of the sample at a first temperature and the thermal conductivity of the sample at a second temperature.

Embodiment 84

The system of any one of Embodiments 80 through 83, further comprising a catalytic microhotplate sensor, wherein the processing subsystem is further configured receive an output of the catalytic microhotplate sensor responsive to exposing the catalytic microhotplate sensor to the sample at each of the two or more temperatures.

Embodiment 85

The system of Embodiment 84, wherein the catalytic microhotplate sensor is located to be exposed to the sample at each of the two or more temperatures at the same time as the thermal conductivity sensor is exposed to the sample at each of the two or more temperatures.

Embodiment 86

The system of Embodiment 84 or Embodiment 85, wherein the processing subsystem is configured to determine a ratio of the output of the catalytic microhotplate sensor at a first temperature to exposure to the sample at the first temperature to the output of the catalytic microhotplate sensor at a second temperature to exposure to the sample at the second temperature.

Embodiment 87

The system of any one of Embodiments 84 through 86, wherein the processing subsystem is configured to compensate the output of the catalytic microhotplate sensor based on the output of the thermal conductivity sensor.

Embodiment 88

The system of any one of Embodiments 84 through 87, wherein the processing subsystem is configured to determine a temperature of one of an exothermic reaction and a reaction onset based on the output of the catalytic microhotplate sensor.

Embodiment 89

The system of any one of Embodiments 84 through 88, wherein the processing subsystem is further configured to determine a concentration of the at least one component of the sample based on at least one of a magnitude of the output of the catalytic microhotplate sensor and a magnitude of the output of the thermal conductivity sensor at one or more of the two more temperatures.

Embodiment 90

The system of any one of Embodiments 84 through 89, further comprising a microcantilever sensor configured to be exposed to the gas sample, wherein the processing subsystem is configured to determine at least one property of the microcantilever sensor, the at least one property of the microcantilever sensor selected from the group consisting of a quality factor, a resonant frequency, a series capacitance, a series inductance, a series resistance, a viscous damping and a bandwidth of the microcantilever sensor, wherein the processing subsystem is configured to determine the presence of the at least one component of the sample based, at least in part, on the at least one property of the microcantilever sensor.

Embodiment 91

The system of Embodiment 90, wherein the processing subsystem is configured to determine a concentration of the at least one component of the sample based on a viscous damping of the sample and the thermal conductivity of the sample at one or more of the two or more temperatures.

Embodiment 92

The system of any one of Embodiments 80 through 91, further comprising at least one of a coated microcantilever sensor and a metal oxide semiconductor sensor configured to interact with one or more specific analytes present in the sample.

Embodiment 93

A system for determining at least one property of a sample, the system comprising: an inert microcantilever located to be exposed to a sample comprising an analyte of interest; and a processing subsystem comprising: a memory including baseline data comprising a resonant frequency of the inert microcantilever and at least one of a quality factor and a series resistance of the inert microcantilever responsive to exposure to a reference sample; and a processor configured to determine a presence of the analyte of interest based, at least in part, on a change in resonant frequency and at least one of a change in quality factor and series resistance of the inert microcantilever responsive to exposure to the sample.

Embodiment 94

The system of Embodiment 93, further comprising a thermal conductivity sensor, wherein the processing subsystem is further configured to determine the presence of the analyte of interest based on a thermal conductivity of the sample at one or more temperatures.

Embodiment 95

The system of Embodiment 93 or Embodiment 94, wherein the processing subsystem is configured to determine a concentration of the analyte of interest based on at least one of a magnitude of the change in resonant frequency, a magnitude of the change in quality factor, and a magnitude of the change in series resistance of the inert microcantilever responsive to exposure to the sample.

Embodiment 96

A method of determining at least one property of a sample, the method comprising: exposing a thermal conductivity sensor of a detector to a sample; determining a thermal conductivity of the sample at a first temperature and at a second temperature; and determining a presence of one or more analytes in the sample based, at least in part, on a ratio of the thermal conductivity of the sample at the first temperature to the thermal conductivity of the sample at the second temperature.

Embodiment 97

The method of Embodiment 96, further comprising selecting the first temperature to be between about 50° C. and about 250° C. and selecting the second temperature to be between about 300° C. and about 800° C.

Embodiment 98

The method of Embodiment 96 or Embodiment 97, further comprising determining a concentration of the one or more analytes based on the thermal conductivity of the sample at the first temperature and the thermal conductivity of the sample at the second temperature.

Embodiment 99

The method of any one of Embodiments 96 through 98, further comprising selecting the first temperature and the second temperature to be greater than a boiling point of water at a selected atmospheric pressure.

Embodiment 100

The method of any one of Embodiments 96 through 99, further comprising selecting at least one of the first temperature and the second temperature to be a temperature at which a thermal conductivity of air is substantially the same as a thermal conductivity of water.

Embodiment 101

The method of any one of Embodiments 96 through 100, further comprising exposing a catalytic microhotplate sensor to the sample at the first temperature and the second temperature and measuring a response of the catalytic microhotplate sensor at each of the first temperature and the second temperature to exposure to the sample.

Embodiment 102

The method of Embodiment 101, wherein determining a presence of one or more analytes further comprises determining the presence of the one or more analytes based on a ratio of the response of the catalytic microhotplate sensor at the first temperature to the response of the catalytic microhotplate sensor at the second temperature.

Embodiment 103

The method of Embodiment 101 or Embodiment 102, wherein determining a presence of one or more analytes further comprises determining the presence of the one or more analytes based on a ratio of the response of the catalytic microhotplate sensor at one or more temperatures to a response of the thermal conductivity sensor at the one or more temperatures.

Embodiment 104

The method of any one of Embodiments 96 through 103, further comprising determining a resonant frequency and at least one of a quality factor and a series resistance of an inert microcantilever exposed to the sample.

Embodiment 105

The method of Embodiment 104, wherein determining a presence of one or more analytes in the sample further comprises determining a presence of one or more analytes in the sample based on a ratio of the resonant frequency to the at least one of a quality factor and a series resistance of the inert microcantilever.

Embodiment 106

The method of any one of Embodiments 96 through 105, further comprising measuring a response of at least one of a metal oxide semiconductor sensor and a coated microcantilever to exposure to the sample.

Embodiment 107

The method of Embodiment 106, wherein determining a presence of one or more analytes in the sample further comprises determining a presence of one or more analytes in the sample based, at least in part, on a resistance of the metal oxide semiconductor sensor responsive to exposure to the sample.

Embodiment 108

A gas analysis system, comprising: at least one sensor; a processing subsystem in operable communication with the at least one sensor, the processing subsystem configured to create one or more vectors based on two or more sensor parameters of a set of sensor parameters, the set of sensor parameters including: a thermal conductivity of a sample at a first temperature; a thermal conductivity of the sample at a second temperature; an exothermic response at the first temperature; an exothermic response at the second temperature; a resonant frequency shift of a microcantilever responsive to exposure to the sample; a qualify factor shift of the microcantilever responsive to exposure to the sample; at least one equivalent circuit parameter shift of the microcantilever responsive to exposure to the sample; a metal oxide semiconductor resistance shift at the first temperature responsive to exposure to the sample; a metal oxide semiconductor resistance shift at the second temperature responsive to exposure to the sample; wherein the processing subsystem is further configured to: compensate a response of the at least one sensor for effects of one or more of temperature, pressure, and humidity; determine an identity of one or more gases in the sample based on a direction of the one or more vectors; and determine a concentration of the one or more gases in the sample based on a magnitude of the one or more vectors.

Embodiment 109

The gas analysis system of Embodiment 108, wherein the processing subsystem is configured to determine an identity and concentration of one or more gases in the sample based on a multi-dimensional vector formed from three or more sensor parameters of the set of sensor parameters.

Embodiment 110

The gas analysis system of Embodiment 108 or Embodiment 109, wherein the processing subsystem is configured to determine an identity of one or more gases in the sample based on a relationship between at least two sensor parameters of the set of sensor parameters with each of at least two other of the sensor parameters of the set of sensor parameters.

Embodiment 111

The gas analysis system of any one of Embodiments 108 through 110, wherein the processing subsystem is configured to determine an identity of one or more gases in the sample based on a relationship between the thermal conductivity of the sample at the first temperature, the thermal conductivity of the sample at the second temperature, the exothermic response at the first temperature, and the exothermic response at the second temperature.

Embodiment 112

The gas analysis system of any one of Embodiments 108 through 111, wherein the processing subsystem is further configured to determine an identity of one or more gases in the sample based on the resonant frequency shift of the microcantilever responsive to exposure to the sample and the at least one equivalent circuit parameter shift of the microcantilever responsive to exposure to the sample.

Embodiment 113

A system for determining one or more properties of one or more samples, the system comprising: at least one thermal conductivity sensor configured to measure a response of the at least one thermal conductivity sensor to exposure to a sample while the at least one thermal conductivity sensor is at a first temperature and while the at least one thermal conductivity sensor is at at least at a second temperature; and a subsystem configured to determine a presence of at least one component of the sample based, at least in part, on the response of the at least one thermal conductivity sensor to exposure to the sample while the at least one thermal conductivity sensor is at the first temperature and the response of the at least one thermal conductivity sensor to exposure to the sample while the at least one thermal conductivity sensor is at the at least a second temperature.

Embodiment 114

The system of Embodiment 113, wherein the subsystem is configured to: determine a first difference between the response of the at least one thermal conductivity sensor to exposure to the sample while the at least one thermal conductivity sensor is at the first temperature and a baseline response of the at least one thermal conductivity sensor while the at least one thermal conductivity sensor is at the first temperature; and determine a second difference between the response of the at least one thermal conductivity sensor to exposure to the sample while the at least one thermal conductivity sensor is at the at least a second temperature and a baseline response of the at least one thermal conductivity sensor while the at least one thermal conductivity sensor is at the at least a second temperature.

Embodiment 115

The system of Embodiment 114, wherein the subsystem is configured to determine an identity of the sample based on a ratio of the first difference to the second difference.

Embodiment 116

The system of Embodiment 114, wherein the subsystem is configured to determine a concentration of the sample based on at least one of a magnitude of a combined vector of the first difference, the second difference, a magnitude of the first difference, and a magnitude of the second difference.

Embodiment 117

The system of any one of Embodiments 114 through 116, wherein the baseline response while the at least one thermal conductivity sensor is at the first temperature and at the at least a second temperature comprises a response of the at least one thermal conductivity sensor to exposure to air while the at least one thermal conductivity sensor is at each of the respective first temperature and the at least a second temperature.

Embodiment 118

The system of any one of Embodiments 114 through 116, wherein the baseline response while the at least one thermal conductivity sensor is at the first temperature and the at least a second temperature comprises a response of the at least one thermal conductivity sensor to exposure to a reference gas while the at least one thermal conductivity sensor is at each of the respective first temperature and the at least a second temperature.

Embodiment 119

The system of Embodiment 118, wherein the subsystem is configured to: determine a difference between the thermal conductivity of the sample and the thermal conductivity of the reference gas while the at least one thermal conductivity sensor is at the first temperature; and determine a difference between the thermal conductivity of the sample and the thermal conductivity of the reference gas while the at least one thermal conductivity sensor is at the at least a second temperature.

Embodiment 120

The system of any one of Embodiments 113 through 119, wherein the at least one thermal conductivity sensor comprises a first thermal conductivity sensor configured to be exposed to the sample while the first thermal conductivity sensor is at the first temperature and a second thermal conductivity sensor configured to be exposed to the sample while the second thermal conductivity sensor is at the at least a second temperature.

Embodiment 121

The system of any one of Embodiments 113 through 119, wherein the at least one thermal conductivity sensor comprises a single thermal conductivity sensor configured to be exposed to the sample while the single thermal conductivity sensor is at the first temperature and the at least a second temperature.

Embodiment 122

The system of any one of Embodiments 113 through 121, further comprising a controller configured to ramp a temperature of the at least one thermal conductivity sensor to a predetermined temperature while the at least one thermal conductivity sensor is exposed to the sample.

Embodiment 123

The system of any one of Embodiments 113 through 122, wherein the subsystem is configured to determine an identity of the sample based on a ratio of the response of the at least one thermal conductivity sensor to exposure to the sample while the at least one thermal conductivity sensor is at the first temperature to the response of the at least one thermal conductivity sensor to exposure to the sample while the at least one thermal conductivity sensor is at the at least a second temperature.

Embodiment 124

The system of any one of Embodiments 113 through 123, wherein the subsystem is further configured to determine at least one of an average molecular weight and a concentration of the sample, based on a relationship between a concentration of the sample and the response of the at least one thermal conductivity sensor to exposure to the sample while the at least one thermal conductivity sensor is at the first temperature or while the at least one thermal conductivity sensor is at the at least a second temperature.

Embodiment 125

The system of any one of Embodiments 113 through 124, wherein the subsystem is configured to determine an identity of the sample based on a temperature at which a thermal conductivity of the sample is equal to a thermal conductivity of air.

Embodiment 126

The system of any one of Embodiments 113 through 125, wherein the subsystem is further configured to determine a thermal conductivity of the sample at a temperature at which a thermal conductivity of air is equal to a thermal conductivity of humid air.

Embodiment 127

The system of any one of Embodiments 113 through 126, wherein the subsystem is further configured to determine a concentration of the sample based on at least one of a magnitude of a vector of the response of the at least one thermal conductivity sensor to exposure to the sample while the at least one thermal conductivity sensor is at the first temperature versus the response of the at least one thermal conductivity sensor to exposure to the sample while the at least one thermal conductivity sensor is at the at least a second temperature and a magnitude of the response of the at least one thermal conductivity sensor to exposure to the sample while the at least one thermal conductivity sensor is at one or both of the first temperature and the at least a second temperature.

Embodiment 128

The system of any one of Embodiments 113 through 127, further comprising at least one environmental sensor configured to measure at least one of a temperature, a pressure, a humidity, and a flowrate, wherein the subsystem is further configured to compensate an output of the at least one thermal conductivity sensor for the at least one of temperature, pressure, humidity, and flowrate.

Embodiment 129

The system of any one of Embodiments 113 through 128, wherein the subsystem is configured to determine the response of the at least one thermal conductivity sensor to exposure to the sample while the at least one thermal conductivity sensor is at a first temperature between about 50° C. and about 250° C. and the response of the at least one thermal conductivity sensor to exposure to the sample while the at least one thermal conductivity sensor is at a second temperature between about 300° C. and about 800° C.

Embodiment 130

The system of any one of Embodiments 113 through 129, further comprising a catalytic sensor, wherein the subsystem is configured to determine the presence of the at least one component based on a difference between a response of the catalytic sensor to exposure to the sample while the catalytic sensor is at one of the first temperature and the at least a second temperature and the response of the at least one thermal conductivity sensor to exposure to the sample while the at least one thermal conductivity sensor is at the respective one of the first temperature and the at least a second temperature.

Embodiment 131

The system of any one of Embodiments 113 through 130, further comprising a damping sensor, wherein the subsystem is further configured to determine a presence of the at least one component based on a relationship between a response of the damping sensor to exposure to the sample relative to a baseline response of the damping sensor to exposure to a reference gas.

Embodiment 132

The system of Embodiment 131, wherein the subsystem is configured to determine the presence of the at least one component based on a relationship between a change in at least one resonant parameter of the damping sensor relative to a baseline of the at least one resonant parameter.

Embodiment 133

The system of Embodiment 130 or Embodiment 131, wherein the damping sensor comprises a microcantilever.

Embodiment 134

The system of any one of Embodiments 113 through 133, further comprising a metal oxide semiconductor sensor configured to interact with one or more specific analytes in the sample, wherein the subsystem is further configured to determine the presence of the at least one component of the sample based on a response of the metal oxide semiconductor sensor to exposure to the sample.

Embodiment 135

The system of any one of Embodiments 113 through 134, further comprising a microcantilever sensor comprising a coating formulated to interact with one or more specific analytes present in the sample, wherein the subsystem is further configured to determine the presence of the at least one component of the sample based on one or more resonant parameters of the microcantilever sensor responsive to exposure to the sample.

Embodiment 136

A system for determining at least one property of a sample, the system comprising: at least one thermal conductivity sensor; at least one damping sensor; and a subsystem configured to: while the at least one thermal conductivity sensor is at a temperature greater than about 50° C., determine a response of the at least one thermal conductivity sensor to exposure to a sample; determine a response of the at least one damping sensor to exposure to the sample; and determine a presence of at least one component of the sample based, at least in part, on a relationship between the response of the at least one thermal conductivity sensor to exposure to the sample while the at least one thermal conductivity sensor is at the temperature greater than about 50° C. and the response of the damping sensor to exposure to the sample.

Embodiment 137

The system of Embodiment 136, wherein the subsystem is configured to: determine a response of the at least one thermal conductivity sensor to exposure to the sample relative to a baseline response of the at least one thermal conductivity sensor; and determine a response of the at least one damping sensor to exposure to the sample relative to a baseline response of the at least one damping sensor.

Embodiment 138

The system of Embodiment 136, wherein the subsystem is configured to: determine a change in thermal conductivity of the sample relative to a reference gas based on a difference between the thermal conductivity of the sample and the thermal conductivity of the reference gas; and determine a change in at least one resonant parameter of the at least one damping sensor based on a difference between the response of the at least one damping sensor to exposure to the sample and the baseline response of the at least one damping sensor.

Embodiment 139

The system of Embodiment 138, wherein the subsystem is configured to determine an identity of the sample based on a ratio of the difference between the thermal conductivity of the sample and the thermal conductivity of the reference gas and the difference between the response of the at least one damping sensor to exposure to the sample and the baseline response of the at least one damping sensor.

Embodiment 140

The system of Embodiment 138 or Embodiment 139, wherein the subsystem is configured to determine a concentration of the sample based on a magnitude of a vector of the change in the thermal conductivity versus the change in the at least one resonant parameter.

Embodiment 141

The system of any one of Embodiments 138 through 140, wherein the subsystem is configured to determine a presence of the at least one component of the sample based on a relationship between the change in the thermal conductivity of the sample relative to the reference gas, the change in the at least one resonant parameter of the at least one damping sensor, and a change in at least another resonant parameter of the at least one damping sensor.

Embodiment 142

The system of any one of Embodiments 136 through 141, wherein the at least one damping sensor comprises a microcantilever.

Embodiment 143

The system of any one of Embodiments 136 through 142, further comprising a controller configured to ramp a temperature of the at least one thermal conductivity sensor to a predetermined temperature while the at least one thermal conductivity sensor is exposed to the sample.

Embodiment 144

The system of any one of Embodiments 136 through 143, further comprising at least one environmental sensor configured to measure at least one of a temperature, a pressure, a humidity, and a flowrate, wherein the subsystem is further configured to compensate the output of the at least one thermal conductivity sensor and an output of the at least one damping sensor for the at least one of temperature, pressure, humidity, and flowrate.

Embodiment 145

The system of any one of Embodiments 136 through 144, further comprising a catalytic sensor, wherein the subsystem is further configured to receive an output from the catalytic sensor responsive to exposing the catalytic sensor to the sample and further configured to determine the presence of the at least one component based on the output of the catalytic sensor.

Embodiment 146

The system of Embodiment 145, wherein the catalytic sensor comprises one of a catalytic microhotplate sensor and a catalytic microcantilever sensor.

Embodiment 147

The system of Embodiment 145 or Embodiment 146, wherein the subsystem is configured to determine at least one of an identity and a concentration of at least one component of the sample based, at least in part, on a relationship between the response of the at least one thermal conductivity sensor to exposure to the sample and the response of the at least one damping sensor to exposure to the sample responsive to detecting an exothermic response from the catalytic sensor.

Embodiment 148

The system of any one of Embodiments 136 through 147, further comprising a metal oxide semiconductor sensor configured to interact with one or more specific analytes present in the sample, wherein the subsystem is further configured to determine the presence of the at least one component of the sample based on a response of the metal oxide semiconductor sensor to exposure to the sample.

Embodiment 149

The system of any one of Embodiments 136 through 148, further comprising a microcantilever sensor comprising a coating formulated to interact with one or more specific analytes present in the sample, wherein the subsystem is further configured to determine the presence of the at least one component of the sample based on one or more resonant parameters of the microcantilever sensor responsive to exposure to the sample.

Embodiment 150

A system for determining at least one property of a sample, the system comprising: at least one thermal conductivity sensor; at least one catalytic sensor; and a subsystem configured to: determine a response of the at least one thermal conductivity sensor to exposure to the sample while the at least one thermal conductivity sensor is at each of the first temperature and the at least a second temperature; determine a response of the at least one catalytic sensor to exposure to the sample while the at least one catalytic sensor is at each of the first temperature and the at least a second temperature; and determine a presence of at least one component of the sample based, at least in part, on the response of the at least one thermal conductivity sensor to exposure to the sample while the at least one thermal conductivity sensor is at each of the first temperature and the at least a second temperature and the response of the at least one catalytic sensor to exposure to the sample while the at least one catalytic sensor is at each of the first temperature and the at least a second temperature.

Embodiment 151

The system of Embodiment 150, wherein the subsystem is configured to determine a change in the response of the at least one thermal conductivity sensor to exposure to the sample while the at least one thermal conductivity sensor is at each of the first temperature and the at least a second temperature relative to a baseline thermal conductivity response at each of the first temperature and the at least a second temperature; determine a catalytic activity at each of the first temperature and the at least a second temperature by determining a change in the response of the at least one catalytic sensor to exposure to the sample while the at least one catalytic sensor is at each of the first temperature and the at least a second temperature relative to a baseline catalytic response at each of the respective first temperature and the at least a second temperature; and determine the presence of the at least one component based on: the change in the response of the at least one thermal conductivity sensor to exposure to the sample while the at least one thermal conductivity sensor is at each of the first temperature and the at least a second temperature; and the catalytic activity at the first temperature and the catalytic activity at the at least a second temperature.

Embodiment 152

The system of Embodiment 151, wherein the subsystem is configured to determine the presence of the at least one component based on: an exothermic response at the first temperature determined by a difference between the catalytic activity at the first temperature and the change in the response of the at least one thermal conductivity sensor at the first temperature; and an exothermic response at the at least a second temperature determined by a difference between the catalytic activity at the at least a second temperature and the change in the response of the at least one thermal conductivity sensor at the at least a second temperature.

Embodiment 153

The system of Embodiment 152, wherein the subsystem is configured to determine the presence of the at least one component based on a ratio of the exothermic response at the first temperature to the exothermic response at the at least a second temperature.

Embodiment 154

The system of any one of Embodiments 151 through 153, wherein the subsystem is configured to determine an identity of the at least one component of the sample responsive to determining a temperature at which a change in the response of the at least one thermal conductivity sensor and a catalytic activity of the at least one catalytic sensor to exposure to the sample is greater than a threshold value.

Embodiment 155

The system of any one of Embodiments 151 through 154, wherein the subsystem is further configured to determine an identity of the sample based on a ratio of the catalytic activity at the first temperature to the catalytic activity at the at least a second temperature.

Embodiment 156

The system of any one of Embodiments 151 through 155, wherein the subsystem is further configured to determine a concentration of one or more gases in the sample based on at least one of a magnitude of the catalytic activity at the first temperature and the magnitude of the catalytic activity at the at least a second temperature.

Embodiment 157

The system of any one of Embodiments 151 through 156, wherein the subsystem is configured to determine an identity of the sample based on a ratio of at least two of: the change in the response of the at least one thermal conductivity sensor to exposure to the sample while the at least one thermal conductivity sensor is at the first temperature; the change in the response of the at least one thermal conductivity sensor to exposure to the sample while the at least one thermal conductivity sensor is at the at least a second temperature; the catalytic activity at the first temperature; and the catalytic activity at the at least a second temperature.

Embodiment 158

The system of any one of Embodiments 151 through 157, wherein the subsystem is configured to determine a concentration of at least one component of the sample based on at least one of: a magnitude of the change in the response of the at least one thermal conductivity sensor to exposure to the sample while the at least one thermal conductivity sensor is at the first temperature; a magnitude of the change in the response of the at least one thermal conductivity sensor to exposure to the sample while the at least one thermal conductivity sensor is at the at least a second temperature; a magnitude of the catalytic activity at the first temperature; and a magnitude of the catalytic activity at the at least a second temperature.

Embodiment 159

The system of any one of Embodiments 150 through 158, wherein the catalytic sensor comprises a catalytic microhotplate sensor.

Embodiment 160

The system of any one of Embodiments 150 through 158, wherein the catalytic sensor comprises a microcantilever sensor comprising a heater.

Embodiment 161

The system of any one of Embodiments 150 through 160, further comprising a damping sensor, wherein the subsystem is further configured to determine an identity of at least one component of the sample based on a change in at least one resonant parameter of the damping sensor responsive to exposure to the sample relative to a baseline value of the at least one resonant parameter.

Embodiment 162

The system of any one of Embodiments 150 through 161, further comprising at least one environmental sensor configured to measure at least one of a temperature, a pressure, a humidity, and a flowrate, wherein the subsystem is further configured to compensate the response of the at least one thermal conductivity sensor and an output of the at least one catalytic sensor based on the measured at least one of the temperature, the pressure, the humidity, and the flowrate.

Embodiment 163

The system of any one of Embodiments 150 through 162, further comprising a metal oxide semiconductor sensor configured to interact with one or more specific analytes present in the sample, wherein the subsystem is further configured to determine the presence of at least one component of the sample based on a response of the metal oxide semiconductor sensor to exposure to the sample.

Embodiment 164

The system of any one of Embodiments 150 through 163, further comprising at least one microcantilever sensor comprising a coating formulated to interact with one or more specific analytes present in the sample, wherein the subsystem is further configured to determine the presence of at least one component of the sample based on one or more resonant parameters of the at least one microcantilever sensor responsive to exposure to the sample.

Embodiment 165

A system for determining an identity of a sample, the system comprising: at least one thermal conductivity sensor; at least one catalytic sensor; at least one damping sensor; and a subsystem configured to: determine a thermal conductivity of the sample while the at least one thermal conductivity sensor is at each of a first temperature and at a second temperature based on a response of the at least one thermal conductivity sensor to exposure to the sample while the at least one thermal conductivity sensor is at the first temperature and the second temperature; determine a response of the at least one catalytic sensor to exposure to the sample while the at least one catalytic sensor is at each of the first temperature at the second temperature; determine a catalytic activity at each of the first temperature and the second temperature by determining a change in the response of the at least one catalytic sensor to exposure to the sample while the at least one catalytic sensor is at each of the first temperature and the second temperature relative to a baseline catalytic response at each of the respective first temperature and the second temperature; and determine a response of the at least one damping sensor to exposure to the sample.

Embodiment 166

The system of Embodiment 165, wherein the subsystem is configured to determine a presence of at least one component of the sample based on: an exothermic response at the first temperature determined by a difference between the catalytic activity at the first temperature and a change in the response of the at least one thermal conductivity sensor to exposure to the sample at the first temperature relative to a baseline thermal conductivity response of the at least one thermal conductivity sensor at the first temperature; and an exothermic response at the second temperature determined by a difference between the catalytic activity at the second temperature and a change in the response of the at least one thermal conductivity sensor to exposure to the sample at the second temperature relative to a baseline thermal conductivity response of the at least one thermal conductivity sensor at the second temperature.

Embodiment 167

The system of Embodiment 165 or Embodiment 166, wherein the subsystem is configured to determine a presence of one or more analytes in the sample based on a multi-dimensional analysis of: a change in the thermal conductivity of the sample while the at least one thermal conductivity sensor is at the first temperature relative to a thermal conductivity of a reference gas while the at least one thermal conductivity sensor is at the first temperature; a change in the thermal conductivity of the sample while the at least one thermal conductivity sensor is at the second temperature relative to a thermal conductivity of the reference gas while the at least one thermal conductivity sensor is at the second temperature; the catalytic activity of the at least one catalytic sensor at the first temperature; the at least one catalytic activity of the at least one catalytic sensor at the second temperature; and a change in at least one resonant parameter of the at least one damping sensor relative to one or both of the change in the thermal conductivity and the catalytic activity of the at least one catalytic sensor at one or both of the first temperature and the second temperature.

Embodiment 168

The system of any one of Embodiments 165 through 167, further comprising a metal oxide semiconductor sensor configured to interact with one or more specific analytes present in the sample, wherein the subsystem is further configured to determine the presence of at least one component of the sample based on a response of the metal oxide semiconductor sensor to exposure to the sample.

Embodiment 169

The system of any one of Embodiments 165 through 168, further comprising at least one microcantilever sensor comprising a coating formulated to interact with one or more specific analytes present in the sample, wherein the subsystem is further configured to determine the presence of at least one component of the sample based on one or more resonant parameters of the at least one microcantilever sensor responsive to exposure to the sample.

Embodiment 170

The system of any one of Embodiments 165 through 169, further comprising a gas pre-concentrator positioned to be exposed to the sample before the at least one thermal conductivity sensor, the at least one catalytic sensor, and the at least one damping sensor, wherein desorption of analytes from the gas pre-concentrator is controlled by ramping a temperature of the gas pre-concentrator, wherein the subsystem is configured to determine an identity of different components based on at least one fingerprint produced at at least one temperature.

Embodiment 171

The system of Embodiment 170, further comprising at least one of a metal oxide semiconductor sensor and a coated microcantilever sensor located proximate the gas pre-concentrator.

Embodiment 172

The system of any one of Embodiments 165 through 171, further comprising a separator located proximate the at least one thermal conductivity sensor, the at least one catalytic sensor, and the at least one damping sensor, wherein the subsystem is configured to determine an identity of different components in the sample based on at least one fingerprint of each component during a time sequenced output from the separator.

Embodiment 173

The system of Embodiment 172, further comprising at least one of a metal oxide semiconductor sensor and coated microcantilever sensor located proximate the gas separator.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are embraced herein.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A system for determining one or more properties of one or more samples, the system comprising:
   at least one thermal conductivity sensor configured to measure a response of the at least one thermal conductivity sensor to exposure to a sample while the at least one thermal conductivity sensor and the sample are at a first temperature and while the at least one thermal conductivity sensor and the sample are at at least a second temperature; and
       a subsystem configured to determine a presence of at least one component of the sample based, at least in part, on the response of the at least one thermal conductivity sensor to exposure to the sample while the at least one thermal conductivity sensor and the sample are at the first temperature and the response of the at least one thermal conductivity sensor to exposure to the sample while the at least one thermal conductivity sensor and the sample are at the at least a second temperature.

2. The system of claim 1, wherein the subsystem is configured to:
   determine a first difference between the response of the at least one thermal conductivity sensor to exposure to the sample while the at least one thermal conductivity sensor and the sample are at the first temperature and a baseline response of the at least one thermal conductivity sensor while the at least one thermal conductivity sensor is at the first temperature; and
   determine a second difference between the response of the at least one thermal conductivity sensor to exposure to the sample while the at least one thermal conductivity sensor and the sample are at the at least a second temperature and a baseline response of the at least one thermal conductivity sensor while the at least one thermal conductivity sensor is at the at least a second temperature.

3. The system of claim 2, wherein the subsystem is configured to determine an identity of the sample based on a ratio of the first difference to the second difference.

4. The system of claim 2, wherein the subsystem is configured to determine a concentration of the sample based on at least one of a magnitude of a combined vector of the first difference, the second difference, a magnitude of the first difference, and a magnitude of the second difference.

5. The system of claim 2, wherein the baseline response while the at least one thermal conductivity sensor is at the first temperature and at the at least a second temperature comprises a response of the at least one thermal conductivity sensor to exposure to air while the at least one thermal conductivity sensor is at each of the respective first temperature and the at least a second temperature.

6. The system of claim 2, wherein the baseline response while the at least one thermal conductivity sensor is at the first temperature and the at least a second temperature comprises a response of the at least one thermal conductivity sensor to exposure to a reference gas while the at least one thermal conductivity sensor is at each of the respective first temperature and the at least a second temperature.

7. The system of claim 6, wherein the subsystem is configured to:
   determine a difference between the thermal conductivity of the sample and the thermal conductivity of the reference gas while the at least one thermal conductivity sensor is at the first temperature; and
   determine a difference between the thermal conductivity of the sample and the thermal conductivity of the reference gas while the at least one thermal conductivity sensor is at the at least a second temperature.

8. The system of claim 1, wherein the at least one thermal conductivity sensor comprises a first thermal conductivity sensor configured to be exposed to the sample while the first thermal conductivity sensor and the sample are at the first temperature and a second thermal conductivity sensor configured to be exposed to the sample while the second thermal conductivity sensor and the sample are at the at least a second temperature.

9. The system of claim 1, wherein the at least one thermal conductivity sensor comprises a single thermal conductivity sensor configured to be exposed to the sample while the single thermal conductivity sensor and the sample are at the first temperature and the at least a second temperature.

10. The system of claim 1, further comprising a controller configured to ramp a temperature of the at least one thermal conductivity sensor to a predetermined temperature while the at least one thermal conductivity sensor is exposed to the sample.

11. The system of claim 1, wherein the subsystem is configured to determine an identity of the sample based on a ratio of the response of the at least one thermal conductivity sensor to exposure to the sample while the at least one thermal conductivity sensor and the sample are at the first temperature to the response of the at least one thermal conductivity sensor to exposure to the sample while the at least one thermal conductivity sensor and the sample are at the second temperature.

12. The system of claim 1, wherein the subsystem is further configured to determine an average molecular weight of the sample based on a ratio of the response of the at least one thermal conductivity sensor to exposure to the sample while the at least one thermal conductivity sensor and the sample are at the first temperature to the response of the at least one thermal conductivity sensor to exposure to the sample while the at least one thermal conductivity sensor and the sample are at the second temperature.

13. The system of claim 1, wherein the subsystem is configured to determine an identity of the sample based on a temperature at which a thermal conductivity of the sample is equal to a thermal conductivity of air.

14. The system of claim 1, wherein the subsystem is further configured to determine a thermal conductivity of the sample at a temperature at which a thermal conductivity of air is equal to a thermal conductivity of humid air.

15. The system of claim 1, wherein the subsystem is further configured to determine a concentration of the sample based on at least one of a magnitude of a vector of the response of the at least one thermal conductivity sensor to exposure to the sample while the at least one thermal conductivity sensor and the sample are at the first temperature versus the response of the at least one thermal conductivity sensor to exposure to the sample while the at least one thermal conductivity sensor and the sample are at the at least a second temperature and a magnitude of the response of the at least one thermal conductivity sensor to exposure to the sample while the at least one thermal conductivity sensor and the sample are at one or both of the first temperature and the at least a second temperature.

16. The system of claim 1, further comprising at least one environmental sensor configured to measure at least one of a temperature, a pressure, a humidity, and a flowrate, wherein the subsystem is further configured to compensate an output of the at least one thermal conductivity sensor for the at least one of temperature, pressure, humidity, and flowrate.

17. The system of claim 1, wherein the subsystem is configured to determine the response of the at least one thermal conductivity sensor to exposure to the sample while the at least one thermal conductivity sensor and the sample are at a first temperature between 50° C. and 250° C. and the response of the at least one thermal conductivity sensor to exposure to the sample while the at least one thermal conductivity sensor and the sample are at a second temperature between 300° C. and 800° C.

18. The system of claim 1, further comprising a catalytic sensor, wherein the subsystem is configured to determine the presence of the at least one component based on a difference between a response of the catalytic sensor to exposure to the sample while the catalytic sensor is at one of the first temperature and the at least a second temperature and the response of the at least one thermal conductivity sensor to exposure to the sample while the at least one thermal conductivity sensor and the sample are at the respective one of the first temperature and the at least a second temperature.

19. The system of claim 1, further comprising a damping sensor, wherein the subsystem is further configured to determine a presence of the at least one component based on a relationship between a response of the damping sensor to exposure to the sample relative to a baseline response of the damping sensor to exposure to a reference gas.

20. The system of claim 19, wherein the subsystem is configured to determine the presence of the at least one component based on a relationship between a change in at least one resonant parameter of the damping sensor relative to a baseline of the at least one resonant parameter.

21. The system of claim 19, wherein the damping sensor comprises a microcantilever.

22. The system of claim 1, further comprising a metal oxide semiconductor sensor configured to interact with one or more specific analytes in the sample, wherein the subsystem is further configured to determine the presence of the at least one component of the sample based on a response of the metal oxide semiconductor sensor to exposure to the sample.

23. The system of claim 1, further comprising a microcantilever sensor comprising a coating formulated to interact with one or more specific analytes present in the sample, wherein the subsystem is further configured to determine the presence of the at least one component of the sample based on a relationship between a change in a resonant frequency of the microcantilever sensor and the response of the at least one thermal conductivity sensor at each of the first temperature and the at least a second temperature.

24. A system for determining at least one property of a sample, the system comprising:
   at least one thermal conductivity sensor;
   at least one catalytic sensor; and
   a subsystem configured to:
      determine a response of the at least one thermal conductivity sensor to exposure to the sample while the at least one thermal conductivity sensor and the sample are at each of the first temperature and the at least a second temperature;
      determine a response of the at least one catalytic sensor to exposure to the sample while the at least one catalytic sensor is at each of the first temperature and the at least a second temperature; and
      determine a presence of at least one component of the sample based, at least in part, on the thermal conductivity of the sample at the first temperature, the thermal conductivity of the sample at the second temperature, and the response of the at least one catalytic sensor to exposure to the sample while the at least one catalytic sensor is at each of the first temperature and the at least a second temperature.

25. The system of claim 24, wherein the subsystem is configured to:
   determine a change in the response of the at least one thermal conductivity sensor to exposure to the sample while the at least one thermal conductivity sensor and the sample are at each of the first temperature and the at least a second temperature relative to a baseline thermal conductivity response at each of the first temperature and the at least a second temperature;
   determine a catalytic activity at each of the first temperature and the at least a second temperature by determining a change in the response of the at least one catalytic sensor to exposure to the sample while the at least one catalytic sensor is at each of the first temperature and the at least a second temperature relative to a baseline catalytic response at each of the respective first temperature and the at least a second temperature; and
   determine the presence of the at least one component based on:
      the change in the response of the at least one thermal conductivity sensor to exposure to the sample while the at least one thermal conductivity sensor and the sample are at each of the first temperature and the at least a second temperature; and
      the catalytic activity at the first temperature and the catalytic activity at the at least a second temperature.

26. The system of claim 25, wherein the subsystem is configured to determine the presence of the at least one component based on:
   an exothermic response at the first temperature determined by a difference between the catalytic activity at the first temperature and the change in the response of the at least one thermal conductivity sensor at the first temperature; and
   an exothermic response at the at least a second temperature determined by a difference between the catalytic activity at the at least a second temperature and the change in the response of the at least one thermal conductivity sensor at the at least a second temperature.

27. The system of claim 26, wherein the subsystem is configured to determine the presence of the at least one component based on a ratio of the exothermic response at the first temperature to the exothermic response at the at least a second temperature.

28. The system of claim 25, wherein the subsystem is configured to determine an identity of the at least one component of the sample responsive to determining a temperature at which a change in the response of the at least one thermal conductivity sensor and a catalytic activity of the at least one catalytic sensor to exposure to the sample is greater than a threshold value.

29. The system of claim 25, wherein the subsystem is further configured to determine an identity of the sample based on a ratio of the catalytic activity at the first temperature to the catalytic activity at the at least a second temperature.

30. The system of claim 25, wherein the subsystem is further configured to determine a concentration of one or more gases in the sample based on at least one of a magnitude of the catalytic activity at the first temperature and the magnitude of the catalytic activity at the at least a second temperature.

31. The system of claim 25, wherein the subsystem is configured to determine an identity of the sample based on a ratio of at least two of:
the change in the response of the at least one thermal conductivity sensor to exposure to the sample while the at least one thermal conductivity sensor and the sample are at the first temperature;
the change in the response of the at least one thermal conductivity sensor to exposure to the sample while the at least one thermal conductivity sensor and the sample are at the at least a second temperature;
the catalytic activity at the first temperature; and
the catalytic activity at the at least a second temperature.

32. The system of claim 25, wherein the subsystem is configured to determine a concentration of at least one component of the sample based on at least one of:
a magnitude of the change in the response of the at least one thermal conductivity sensor to exposure to the sample while the at least one thermal conductivity sensor and the sample are at the first temperature;
a magnitude of the change in the response of the at least one thermal conductivity sensor to exposure to the sample while the at least one thermal conductivity sensor and the sample are at the at least a second temperature;
a magnitude of the catalytic activity at the first temperature; and
a magnitude of the catalytic activity at the at least a second temperature.

33. The system of claim 24, wherein the at least one catalytic sensor comprises a catalytic microhotplate sensor.

34. The system of claim 24, wherein the at least one catalytic sensor comprises a microcantilever sensor comprising a heater.

35. The system of claim 24, further comprising a damping sensor, wherein the subsystem is further configured to determine an identity of at least one component of the sample based on a change in at least one resonant parameter of the damping sensor responsive to exposure to the sample relative to a baseline value of the at least one resonant parameter.

36. The system of claim 24, further comprising at least one environmental sensor configured to measure at least one of a temperature, a pressure, a humidity, and a flowrate, wherein the subsystem is further configured to compensate the response of the at least one thermal conductivity sensor and an output of the at least one catalytic sensor based on the measured at least one of the temperature, the pressure, the humidity, and the flowrate.

37. The system of claim 24, further comprising a metal oxide semiconductor sensor configured to interact with one or more specific analytes present in the sample, wherein the subsystem is further configured to determine the presence of at least one component of the sample based on a response of the metal oxide semiconductor sensor to exposure to the sample.

38. The system of claim 24, further comprising at least one microcantilever sensor comprising a coating formulated to interact with one or more specific analytes present in the sample, wherein the subsystem is further configured to determine the presence of at least one component of the sample based on one or more resonant parameters of the at least one microcantilever sensor responsive to exposure to the sample.

39. A system for determining an identity of a sample, the system comprising:
at least one thermal conductivity sensor;
at least one catalytic sensor;
at least one damping sensor; and
a subsystem configured to:
determine a thermal conductivity of the sample while the at least one thermal conductivity sensor and the sample are at each of a first temperature and at a second temperature based on a response of the at least one thermal conductivity sensor to exposure to the sample while the at least one thermal conductivity sensor and the sample are at the first temperature and the second temperature;
determine a response of the at least one catalytic sensor to exposure to the sample while the at least one catalytic sensor is at each of the first temperature and at the second temperature;
determine a catalytic activity at each of the first temperature and the second temperature by determining a change in the response of the at least one catalytic sensor to exposure to the sample while the at least one catalytic sensor is at each of the first temperature and the second temperature relative to a baseline catalytic response at each of the respective first temperature and the second temperature; and
determine a response of the at least one damping sensor to exposure to the sample.

40. The system of claim 39, wherein the subsystem is configured to determine a presence of at least one component of the sample based on:
an exothermic response at the first temperature determined by a difference between the catalytic activity at the first temperature and a change in the response of the at least one thermal conductivity sensor to exposure to the sample at the first temperature relative to a baseline thermal conductivity response of the at least one thermal conductivity sensor at the first temperature; and
an exothermic response at the second temperature determined by a difference between the catalytic activity at the second temperature and a change in the response of the at least one thermal conductivity sensor to exposure to the sample at the second temperature relative to a baseline thermal conductivity response of the at least one thermal conductivity sensor at the second temperature.

41. The system of claim 39, wherein the subsystem is configured to determine a presence of one or more analytes in the sample based on a multi-dimensional analysis of:
a change in the thermal conductivity of the sample while the at least one thermal conductivity sensor and the sample are at the first temperature relative to a thermal conductivity of a reference gas while the at least one thermal conductivity sensor is at the first temperature;
a change in the thermal conductivity of the sample while the at least one thermal conductivity sensor is sensor and the sample are at the second temperature relative to a thermal conductivity of the reference gas while the at least one thermal conductivity sensor is at the second temperature;
the catalytic activity of the at least one catalytic sensor at the first temperature;
the catalytic activity of the at least one catalytic sensor at the second temperature; and
a change in at least one resonant parameter of the at least one damping sensor relative to one or both of the change in the thermal conductivity and the catalytic activity of the at least one catalytic sensor at one or both of the first temperature and the second temperature.

42. The system of claim 39, further comprising a metal oxide semiconductor sensor configured to interact with one or more specific analytes present in the sample, wherein the subsystem is further configured to determine the presence of at least one component of the sample based on a response of the metal oxide semiconductor sensor to exposure to the sample.

43. The system of claim 39, further comprising at least one microcantilever sensor comprising a coating formulated to interact with one or more specific analytes present in the sample, wherein the subsystem is further configured to determine the presence of at least one component of the sample based on one or more resonant parameters of the at least one microcantilever sensor responsive to exposure to the sample.

44. The system of claim 39, further comprising a gas pre-concentrator positioned to be exposed to the sample before the at least one thermal conductivity sensor, the at least one catalytic sensor, and the at least one damping sensor, wherein desorption of analytes from the gas pre-concentrator is controlled by ramping a temperature of the gas pre-concentrator, wherein the subsystem is configured to determine an identity of different components based on at least one fingerprint produced at at least one temperature.

45. The system of claim 44, further comprising at least one of a metal oxide semiconductor sensor and a coated microcantilever sensor located proximate the gas pre-concentrator.

46. The system of claim 39, further comprising a separator located proximate the at least one thermal conductivity sensor, the at least one catalytic sensor, and the at least one damping sensor, wherein the subsystem is configured to determine an identity of different components in the sample based on at least one fingerprint of each component during a time sequenced output from the separator.

47. The system of claim 46, further comprising at least one of a metal oxide semiconductor sensor and coated microcantilever sensor located proximate the gas separator.

* * * * *

UNITED STATES PATENT AND TRADEMARK OFFICE
CERTIFICATE OF CORRECTION

PATENT NO. : 10,724,976 B2
APPLICATION NO. : 15/674305
DATED : July 28, 2020
INVENTOR(S) : Benjamin S. Rogers et al.

Page 1 of 1

It is certified that error appears in the above-identified patent and that said Letters Patent is hereby corrected as shown below:

In the Claims

Claim 41, Column 72, Line 56, change "conductivity sensor is sensor and" to --conductivity sensor and--

Signed and Sealed this
Fifth Day of January, 2021

Andrei Iancu
*Director of the United States Patent and Trademark Office*